(12) United States Patent
Levy et al.

(10) Patent No.: US 7,082,418 B2
(45) Date of Patent: Jul. 25, 2006

(54) SYSTEM AND METHOD FOR NETWORK-BASED PERSONALIZED EDUCATION ENVIRONMENT

(75) Inventors: Jonathon D. Levy, Waltham, MA (US); Amelia Ellsworth, Cambridge, MA (US)

(73) Assignee: Monitor Company Group Limited Partnership, Cambridge, MA (US)

( * ) Notice: Subject to any disclaimer, the term of this patent is extended or adjusted under 35 U.S.C. 154(b) by 389 days.

(21) Appl. No.: 10/012,691

(22) Filed: Oct. 30, 2001

(65) Prior Publication Data

US 2002/0138456 A1   Sep. 26, 2002

Related U.S. Application Data

(60) Provisional application No. 60/244,267, filed on Oct. 30, 2000.

(51) Int. Cl.
*G06F 15/18* (2006.01)
(52) U.S. Cl. ............... 706/12; 706/14; 706/11
(58) Field of Classification Search ............ 706/12, 706/14, 11; 434/322
See application file for complete search history.

(56) References Cited

U.S. PATENT DOCUMENTS

| | | | |
|---|---|---|---|
| 5,310,349 A | 5/1994 | Daniels et al. | 434/350 |
| 5,788,504 A | 8/1998 | Rice et al. | 434/219 |
| 5,797,754 A | 8/1998 | Griswold et al. | 434/322 |
| 5,827,070 A * | 10/1998 | Kershaw et al. | 434/322 |
| 5,983,214 A | 11/1999 | Lang et al. | 707/1 |
| 5,987,443 A | 11/1999 | Nichols et al. | 706/12 |
| 6,021,403 A | 2/2000 | Horvitz et al. | 706/45 |
| 6,023,692 A | 2/2000 | Nichols | 706/14 |
| 6,026,386 A | 2/2000 | Lannert et al. | 706/45 |
| 6,039,575 A | 3/2000 | L'Allier et al. | 434/323 |
| 6,064,971 A | 5/2000 | Hartnett | 705/7 |
| 6,064,998 A | 5/2000 | Zabloudil et al. | 706/45 |
| 6,085,184 A | 7/2000 | Bertrand et al. | 706/45 |
| 6,125,358 A | 9/2000 | Hubbell et al. | 706/11 |
| 6,126,448 A | 10/2000 | Ho et al. | 434/219 |
| 6,134,539 A | 10/2000 | O'Connor et al. | 706/45 |
| 6,157,808 A | 12/2000 | Hollingsworth | 434/350 |
| 6,160,987 A | 12/2000 | Ho et al. | 434/350 |
| 6,195,665 B1 * | 2/2001 | Jarett | 715/500 |

(Continued)

FOREIGN PATENT DOCUMENTS

CA    2101094    1/1995

(Continued)

OTHER PUBLICATIONS

Lipton, CD-ROM: Search for tomorrow; Evaluating the educational and business implications of the medium; *Computerworld*; Oct. 26, 1987; pp. 14-16; vol. 21, No. 43.

(Continued)

*Primary Examiner*—Joseph P. Hirl
(74) *Attorney, Agent, or Firm*—Bromberg & Sunstein LLP

(57) ABSTRACT

A system and method of providing personalized information to an individual over a network includes accessing a competency profile of the individual, such profile accessible to a server on a network and comparing the individual's competency profile with an education template and behavioral scenario accessible to the server. The template defines a current desired standard for the individual's competencies, in order to identify target training or learning areas. Information content relevant to the individual's target training or learning areas is provided over the network via user-selectable items of information content that may collectively have a plurality of information product types.

23 Claims, 60 Drawing Sheets

U.S. PATENT DOCUMENTS

| | | | | |
|---|---|---|---|---|
| 6,199,034 | B1* | 3/2001 | Wical | 704/9 |
| 6,212,358 | B1 | 4/2001 | Ho et al. | 434/362 |
| 6,213,780 | B1 | 4/2001 | Ho et al. | 434/219 |
| 6,262,730 | B1 | 7/2001 | Horvitz et al. | 345/337 |
| 6,270,351 | B1 | 8/2001 | Roper | 434/118 |
| 6,275,812 | B1* | 8/2001 | Haq et al. | 705/11 |
| 6,386,883 | B1 | 5/2002 | Siefert | 434/322 |
| 6,592,379 | B1* | 7/2003 | Stuppy | 434/322 |
| 2001/0018178 | A1 | 8/2001 | Siefert | 434/322 |
| 2001/0055749 | A1* | 12/2001 | Siefert | 434/322 |
| 2002/0069189 | A1* | 6/2002 | Bertrand et al. | 706/45 |

FOREIGN PATENT DOCUMENTS

| | | |
|---|---|---|
| JP | 9222845 | 8/1987 |
| JP | 10230035 | 9/1998 |
| JP | 200051390 | 2/2000 |
| WO | WO 00/43972 | 7/2000 |
| WO | WO 01/15043 A1 | 3/2001 |
| WO | WO 01/27902 A1 | 4/2001 |

OTHER PUBLICATIONS

Rose, Taking a chance with on-line training, *Network VAR*, Feb. 1, 1998, pp. 2-12, vol. 6, No. 2.

Ubell, "Engineers turn to e-learning", IEEE Spectrum, Oct. 2, 2000, pp. 59-63, 0018-9235/00.

Alexander, "Learning curve", Professional Edge, www.infoworld.com.

"Hyperwave Launches Advanced Infrastructure for Combined Knowledge Management and Elearning" www.Distance-Educator.com.

International Search Report, International Application No. PCT/US01/47999, mailed May 14, 2002 (counterpart to above-patent application) which cites references AD, AE, AF, AG, AJ, AK, AL, and AN.

Retro Search, Question No. 1070397.009, Jan. 5, 2006 including the following citations: NDN 063-0038-5307-7: Interactive technology for education, (education marketplace) (Electronic Schools supplement).

NDN 135-0109-4374-9: Analysis of factors reported in the research literature that affect the effectiveness and efficiency of self-instrutional strategies (cai, distance learning, integrative research review)—*Citations from Engineering Index: EIX*.

NDN 0170245-2178-8: Learning style based innovations to improve retention of female engineering students in the synthesis coalitation—*Citations from INSPEC: INS*.

NDN 174-0691-2841-5: DVB/Internet interoperability and new possibilities in distance learning.

NDN 174-0686-5280-7: The Swiss Virtual Campus: present situation and challenges.

NDN 174-0685-8317-2: A connectionist approach for supporting personalized learning in a Web-based learning environment.

NDN 1740671-7087-8: Virtual seminars in European studies: a model for collaborative learning.

NDN 174-0670-2592-1: Virtual classroom model as a support for distance education.

NDN 174-0669-1624-8: Web-based Virtual Classroom.

NDN 174-0660-9066-8: Internet-activated multimedia as a distance learning alternative—*Citations from Internet & Personal Computing Abstracts: MCA*.

NDN 016-0028-1243-0: SIIA Report: Ubiquitous 'eLearning' is changing education.

NDN 0160020-6223-3; Distance education in Iowa.

NDN 016-0010-8521-3: Instructional alternatives for at-risk students; *Citations from USG/NTIS: USG*.

NDN 059-0132-1444-7: Guide to the Use of Individualized Learning Techniques, Teaching and Learning in Higher Education, 4.

NDN 059-0070-1205-8: Computer-Assisted Instruction in Surgery.

* cited by examiner

Scenario 1a - Microsoft Internet Explorer

Address: C:\MyDocuments\final\v2_code\code\scenario_1a\assessment_frameset.html

ONLINE MANAGER

Welcome, Joseph O'Donnell     Thursday, March 8

NAVIGATE THE SITE

Type a string to search .....

Advanced Search

*MANAGING WORK & PEOPLE*

Browse

KNOWLEDGE

- LEARNING MODULES ▷
- PERFORMANCE TOOLS ▷
- COLLABORATION ▷
- ASSESSMENTS FEEDBACK ▷
- RESEARCH & REFERENCE ▷
- EVENTS ▷

WEB SITES FOR MANAGERS
Forbes Annual Report on American Industry
Wall Street Journal Online

★ MESSAGES    HOME    PREFERENCES    HELP

AmProducts Incorporated

☐ MY RESOURCES

Assessments Results

Your assessment results suggest you may wish to focus in the following areas. Also, you can seek feedback from employees within your company.

- Managing direct reports
- Project management
- Analyzing new business opportunities

1801

Recommended Learning Opportunities

☐ Managing for Performance: Direct Reports, HBS Publishing learning module
☐ Managing Teams for Innovation and Success, Stanford Executive Education course
☐ Pro Form a Forecasting Tool, from HBS Toolkit performance tool
☐ Clay Chritensen! Managers, Processes, and Flexibility, from Burning Questions 2000 video
☐ "Assessing Project Management Maturity," by C. Williams Ibbs, *Project Management Journal* 3/00 article
☐ "Seizing the Model" by Amy Kirkpatrick, *Venture Capital Monthly* 1/01 article
☐ Preparing a Business Plan from Harvard ManageMentor performance tool

○ BACK    ○ SAVE IN MY RESOURCES    ○ FORWARD    ○ PRINT

HBS Publishing    HBS Interactive    Stanford University

Secondary - Microsoft Internet Explorer

PERSONAL LEARNING PROFILE

E-BUSINESS & THE INTERNET

| | ACHIEVEMENTS | WORK IN PROGRESS | PUSH TO HOME PAGE | PUSH TO EMAIL |
|---|---|---|---|---|
| D1, Business Strategies for a Digital Economy | ▨ | | | ▨ |
| D2, Web-Based Marketing, Sales & Services | | | | ▨ |
| D3, Converging & Restructuring Industries | ▨ | | | ▨ |
| D4, Communities, Ecosystems & Partnering | | | | |
| D5, Security & Privacy | ▨ | | | ▨ |
| D6, Law & Intellectual Propery | | | | |
| D7, The Promise of the Networked Enterprise | ▨ | | | ▨ |
| D8, Reorganizing & Reengineering Work | | | | |
| D9, Core IT Competencies & Outsourcing | ▨ | | | ▨ |

SEARCH BY: — 4601
[Collaboration ▼]
Ask Advisor (GO)

Collaboration:

Online Advisors

Discussions — 4602

Networking

Video Conferencing

Online Manager E-mail

Instant Messaging

- VIEW ACHIEVEMENTS HISTORY
- SAVE IN MY RESOURCES
- PRINT
- FORWARD

*Discussions* — 4603

Technology requirements for handheld devices
Marguerite Reed My CEO has asked me to put together a report on the coast, and time to offer our service through wireless handheld devices. Has anyone investigated these issues in depth? I know that the [more]

Distribution models for E-commerce vendors
Robert Montgomery I'm curious to know details about the distribution/delivery structure that currently services the growing number of e-vendors. I can't imagine that manufacturers are shipping directly to end [more]

WAP Standards

| USER ID | INFLUENCE CATEGORY | WEIGHT |
|---|---|---|
| 00721 | LEADERSHIP AND CHANGE | 0 |
| 00721 | MANAGING WORK AND PEOPLE | 34 |
| 00721 | KNOWLEDGE MANAGMENT AND THE LEARNING ORG | 0 |
| 00721 | SALES, MARKETING, AND CUSTOMERS | 0 |
| 00721 | PRODUCTS AND SERVICES | 12 |
| 00721 | E-BUSINESS AND THE INTERNET | 0 |
| 00721 | FINANCE, ACCOUNTING AND PROFITABILITY | 0 |
| 00721 | STRATEGY AND COMPETITION | 0 |
| 00721 | INNOVATION AND ENTREPRENEURSHIP | 0 |
| 00721 | GLOBALIZATION | 25 |
| 00721 | INFLUENCE, NEGOTIATION AND COMMUNICATION | 29 |
| 00721 | TECHNOLOGY AND OPERATIONS MANAGEMENT | 0 |
| 00721 | ETHICS | 0 |
| 00721 | LEARNING MODULES | 15 |
| 00721 | PERFORMANCE TOOLS | 27 |
| 00721 | COLLABORATION | 0 |
| 00721 | ASSESSMENT AND FEEDBACK | 13 |
| 00721 | RESEARCH AND REFERENCE | 0 |
| 00721 | EVENTS | 15 |
| 00721 | WEBLINKS | 28 |

SYSTEM AND METHOD FOR NETWORK-BASED PERSONALIZED EDUCATION ENVIRONMENT

The present application claims priority from provisional application, Ser. No. 60/244,267, filed Oct. 30, 2000, which is hereby incorporated herein, in its entirety, by reference.

TECHNICAL FIELD

The present invention relates to machine-learning systems and methods and particularly to systems and methods operative over a network.

BACKGROUND ART

It is known in the prior art to provide machine-learning systems.

SUMMARY OF THE INVENTION

In a first embodiment of the invention there is provided a method of providing personalized education to an individual over a network. (Definitions in the Detailed Description of Specific Embodiments apply to this summary.) The method of this embodiment includes:

accessing a competency profile of the individual, such profile accessible to a server on a network;

comparing the individual's competency profile with an education template accessible to the server, the template defining a current desired standard for the individual's competencies, to identify target learning areas; and offering, over the network, information content to the individual relevant to the target learning areas such content being provided via user-selectable items of information content that collectively have a plurality of information product types.

A further related embodiment includes deriving the template from an education genome. This method may optionally include utilizing competency data including testing results pertinent to the individual. Additionally, the network may be the internet. Optionally, the education genome may be updated from time to time by a group of designated experts.

Another related embodiment includes identifying the occurrence of an influence event, wherein a user is determined to be impelled to develop competency in a target subject, and supplying information to the user over the network pertinent to the subject.

In another embodiment, the invention provides a method of screening for individuals having a desired knowledge set. The method of this embodiment includes:

storing a representation of a relevant education genome in a digital computer system;

storing in the computer system the desired knowledge set as a representation of a target subset of the education genome;

characterizing knowledge sets of individuals to be screened as candidate subsets of the education genome and storing representations of the candidate subsets in the computer system; and using the computer system to identify candidate subsets having a sufficient match with the target subset.

In a further related embodiment, characterizing knowledge sets of individuals to be screened is performed implicitly in the course of providing personalized education to the individuals over a network. This process may optionally include determining an education template for each of the individuals to be screened.

In yet another embodiment, the invention provides an education knowledgebase resident on a digital computer system. The knowledgebase includes:

a data warehouse that stores educational content data in a relational database format, the data also being tagged with object tags associated with attributes of object-formatted data;

a content management system for managing the data content; and an object index that accesses data in the data warehouse utilizing object tags.

Optionally, the object-formatted data is in an XML format

In accordance with another embodiment of the invention, a method of providing personalized education to an individual over a network includes:

granting, to the individual, access to information content over the network, such content being provided via user-selectable items of information content;

updating an influence profile of the individual; and using the influence profile to determine, at least in part, information content items to be offered over the network to the individual.

In accordance with a related embodiment, updating the influence profile includes identifying events that would be expected to affect selection of content to be offered to the individual. In accordance with another related embodiment, the influence profile utilizes a taxonomy to define areas of information to be offered to the individual. The influence profile may also utilize a taxonomy to define areas of information to be offered to the individual and identifying events may include searching over the network for information associated with taxonomy terms in the influence profile. Further, the user-selectable items of information content may collectively have a plurality of information product types.

In accordance with a further related embodiment, searching over the network for information may include using as search terms those in a thesaurus corresponding to taxonomy terms in the influence profile. The network may include the internet. Similarly, the network may include the internet, and searching over the network may include searching a predetermined collection of web sites. The network may also include a path to an accessible content repository, and searching over the network may include searching the content repository.

In accordance with yet other related embodiments, updating the user profile may include responding to at least one of current events, user preference, collaborative filtering, and assessment. Further, the method may include using personal data of the individual, such data including the individual's job function, organization and user preferences as to information content, to determine, at least in part, information content items to be offered over the network to the individual. Updating the influence profile may include analyzing of information content previously accessed using collaborative filtering to identify areas of taxonomy and information product type selected in relation to patterns of other persons situated similarly to the individual. In addition, updating the influence profile may include analyzing information content previously accessed using rules-based personalization and in particular user preferences as to information content in relation to information content previously accessed by the individual over the network.

In accordance with a further embodiment of the invention, a method of providing personalized education to an individual over a network includes:

granting, to the individual, access to information content over the network, such content being provided via user-selectable items of information content that collectively have a plurality of information product types; and using personal data of the individual, such data including the individual's job function organization, and user preferences as to information content, to determine, at least in part, information content items to be offered over the network to the individual.

BRIEF DESCRIPTION OF THE DRAWINGS

The foregoing features of the invention will be more readily understood by reference to the following detailed description, taken with reference to the accompanying drawings, in which:

FIG. 13 shows the screen shot of FIG. 12 wherein hyperlinks that allow a first user to locate content through the interface are highlighted;

FIG. 14 shows the screen shot of FIG. 12 wherein links to external websites are highlighted;

FIG. 17 is a screen shot of an interface by which the first user my view a video in accordance with the embodiment of FIG. 12;

FIG. 18 is a screen shot of an interface by which the first user may view results of an assessment performed through the interface of FIG. 15;

FIG. 19 is a screen shot of an interface by which the first user may obtain information regarding courses offered through a partnership university in accordance with the embodiment of FIG. 12;

FIG. 20 is a screen shot of the interface of FIG. 12 under circumstances updated to reflect the fact that the first user has registered in a course in accordance with the embodiment of FIG. 19;

FIG. 21 is a screen shot of the interface of FIG. 12 updated in accordance with the first user's previous activity;

FIG. 31 is a screen shot of the interface of FIG. 28 updated in accordance with the second user's previous activity;

FIG. 34 is a screen shot of an interface by which the second user may view an article recovered in a search in accordance with the embodiments of FIGS. 32 and 33;

FIG. 46 shows the interface of FIG. 45 in which a level of subcategories associated with the second user's taxonomy may be accessed;

FIG. 48 is a screen shot of the interface of FIG. 12 configured for a third user;

FIG. 55 shows the interface of FIG. 48 updated in accordance with the third user's previous activity as well as activity of other corporate personnel;

FIG. 57 shows the interface of FIG. 56 in which a level of subcategories associated with the third user's taxonomy may be accessed;

FIG. 60 is a graphical illustration of an influence profile in accordance with a further embodiment of the invention.

DETAILED DESCRIPTION OF SPECIFIC EMBODIMENTS

Figure 1:
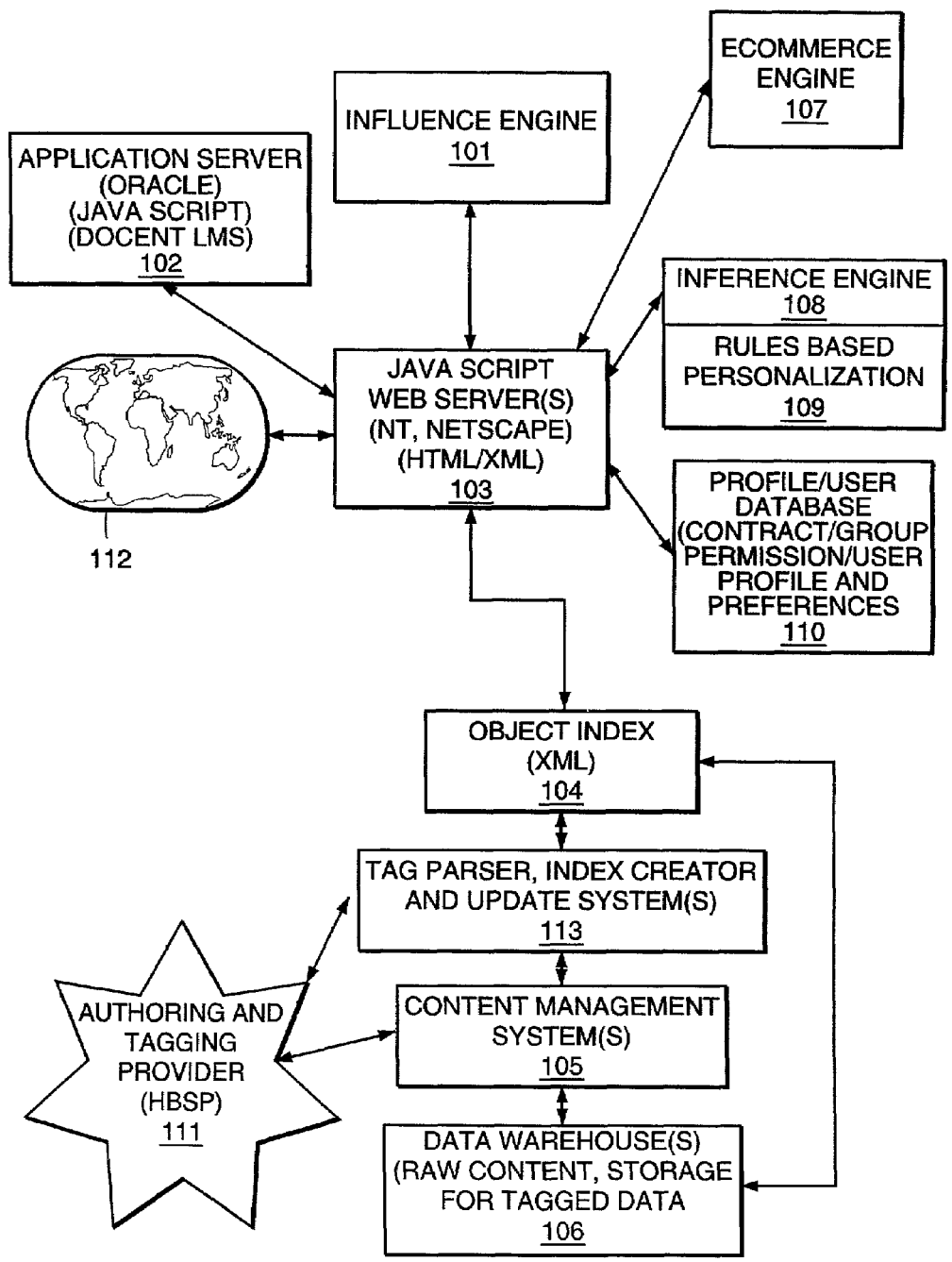
FIG. 1 is a block diagram of a system for providing a personalized educational environment in accordance with an embodiment of the present invention.

Definitions. As used in this description and the accompanying claims, the following terms shall have the meanings indicated, unless the context otherwise requires:

A "business customer" is an enterprise (which may be a business organization, an educational institution, or any other organization having members) that shall have made arrangements with the provider pursuant to which members of the enterprise may become users of a system embodied in accordance with the present invention.

A "competency profile" of an individual is a data set characterizing the competencies of an individual in relation to a relevant knowledgebase.

An "education genome" is a knowledgebase defining a universe of knowledge to be offered to individuals by an educational environment provided by a system embodied in accordance with the present invention. The universe of knowledge may typically address areas of competency useful in a professional context and may, but need not necessarily, include subject areas treated in formal academic programs. Because neither knowledge nor the environment in which it is used is static, the content of the education genome is subject to change over time.

An "education template" is a data set defining a current desired standard for competencies of an individual based on the individual's competency profile derived from genome.

An "influence event" is an event wherein a user is determined to be impelled to develop or refresh competency in a target subject.

A "influence profile" of an individual is a data set that characterizes preferences expressed implicitly and (optionally) explicitly by the individual for experience in the environment and typically includes (i) references to terms in the taxonomy defining areas of information to be presented to the individual in the environment and optionally including (ii) weights, associated with relevant areas, defining relative proportions of information to be presented in such areas, and (iii) preferred formats of information product types, weighted to define relative degrees of preference in accordance with such individual's learning style. In other words, in typical embodiments, the data set characterizes preferences expressed both implicitly and explicitly by the individual.

An "information product type" is a format, used for the delivery of information to the individual, such as (but not limited to) article, book, video clip, conference, executive education course, learning module, or performance support tool kit. With respect to most or all of these formats a further degree of specification is typically appropriate, namely whether the format is web-delivered (for example in HTML format) or delivered in hard-copy form or delivered as a download for a handheld or portable computer or display device or delivered in CD ROM format.

An "item of information content" or, equivalently, an "information content item" is a particular instance of an information product type, such as a particular article, a particular book, a particular video clip, a particular conference, a particular executive education course, a particular learning module, or a particular performance support tool kit, that is used for delivery of information to the individual and is made available to the individual in the environment.

A user's "personal data" includes contact information for the user, the user's job function and organization, as well as user preferences governing experience in the environment.

"Personalized information" is information that is made specific to an individual based on a user profile of the individual.

A "provider" is an organization offering to individuals over a network a personalized education environment.

A "taxonomy" is a hierarchical categorization of the education genome, and is therefore a hierarchical list of categories that collectively describe the subject matter of the relevant universe of knowledge. Because the education genome is subject to change, so is the taxonomy.

A "thesaurus" is a mapping of terms, which may appear in a context, to categories in the taxonomy. Because a given term may be relevant to more than one category, the given term may be applied to all categories to which it is pertinent. In the reverse direction, the thesaurus can be used to generate a list of terms pertinent to a given category in the taxonomy. In operation, the influence engine used the thesaurus to identify terms to search for, based on analysis primarily of the user's click stream.

The "user" of a system is an individual who uses the system.

A "user profile" is a data set including a competency profile, an influence profile, and personal data pertaining to an individual.

Whereas it is known in the prior art to provide a systems designed to deliver education over a network to an individual user, embodiments of the present invention provide such network-based education by using personalized influences, those self selected by the user as well as those determined by the user's global context and analysis of the user's click stream, to determine the offering of content to a user.

In this regard, embodiments of the present invention are configured to provide an informed and intelligent conduit between the user and information for learning. A series of searches and filters, both running in the background and available to a user for participation through the interface, are available in a typical embodiment to help the user accomplish his learning objectives with multiple types of learning experiences. The overall purpose of this embodiment is four-fold.

First, it is designed to create an environment where a user is assessed on what the user already knows. The user's knowledge is compared with an existing educational template created by a panel of experts in the field, and the difference between the two helps determines areas where the user is focused by delivery of content to develop competency. This approach addresses the primary need of a user to learn more about an area where he is called to perform or needs information.

Second, it is also designed as a forum to blend outside content with internal company-provided content. This embodiment has the ability to search all repositories for information using the taxonomy-based XML tagging system and the thesaurus. The thesaurus maps the taxonomy terms of the embodiment to parallel taxonomies in the client organization and tracks emerging terms in the field in possible one to many, many to one, one to one, or many to many relationships. This helps a user keep learning in context by providing company-based materials and perspective on each topic, and allowing the company itself to help shape the learning experience of the user.

Third, this embodiment uses both rules-based personalization filters and inference-based collaborative filtering methods to determine what information product type the user selects to accomplish goals and what areas of the taxonomy this user is focused in. Collaborative filtering also compares the movements of this user with others in his position across the industry, and returns areas this user may have missed, but others in his position have determined are important areas of focus. These results are added to the parameters used during a user's next session to determine what areas and types of content should be presented to the user.

Fourth, this embodiment is designed to blend the information in a thesaurus with personal profile information about each user and search databases for key words and terms to identify emerging trends the user should be aware of to stay on top of his field. This information will be marked in each user profile, and new content links will be added to the site. During the user's next experience, the user will be presented with newly discovered emerging trends and the information necessary to address future situations in the user's work environment before those situations even arise. The user's reaction to this new information (click, drill down, ignore, or delete) will further refine the user profile in the database and in this way the predictive value of the system grows with each use.

The architecture underlying this embodiment (FIG. 1) includes two database structures, one relational and one object-oriented, allowing for an index of content in the relational database to be present in the object-oriented structure. The index allows for faster and more flexible searching of the relational database structure. Further, because the index is populated by key terms associated with the location of each object, it is not limited to representing only the objects found in the primary repository. Objects identified as relevant to upcoming activities during periodic web crawls (conducted, for example, nightly) can be added as location pointers to partner content in other repositories or web locations, and tagged with the key terms (from the thesaurus) leading to its discovery. The web crawls may be implemented using a product such as those provided by Autonomy, Inc. of San Francisco, Calif. In the same way, these objects can be searched periodically (again, for example, nightly) to determine their continued availability. If a link to a partner object, or home repository object is no longer active, the reference may be removed. This nightly searching is defined by key words relating to a taxonomy structure in the embodiment, as well as a thesaurus of terms associated with the relevant taxonomy. The thesaurus maps key words collected from user searches and industry developments back to the taxonomy terms at all levels. This mapping can be either automatic (from a trusted or internal site) or conducted via editors familiar with the field and nuances of terminology in the field determine the thesaurus The industry-specific results of this search are used to update a user's "influence profile", which affects the presentation of information to the user in the environment. These results are given a predetermined ranking or weight depending on a user's self-selected area of focus and results of collaborative filtering.

A second, parallel search is also seen in this embodiment. During the registration process a user supplies personal data including contact information such as, among other things, the company name and their job function within the company. This information is used by the embodiment to search pre-identified news and information sources relevant to the industry the embodiment addresses. The name of the organization a user is associated with becomes part of search criteria, and their job function within the organization is used to filter search results appropriately. The relevant content locations discovered during this second search are also added to the object-oriented database, and tagged with the key taxonomy terms leading to their discovery. The user's influence profile is then updated to reflect the results of this process.

If individual use of the site has been ongoing, a user's log file (his "click stream"), tracking, for the user, information accessed by the user by web page address, when sufficiently extensive, provides a basis for analyzing the user's learning patterns. The log file can be analyzed, for example, using a collaborative filtering tool such as offered by E.piphany of San Mateo, Calif. to identify areas of taxonomy, information product type selected, and other patterns of the user in relation to patterns of other persons similarly situated. The results of this analysis when appropriate may be used to update the user's influence profile, for example to identify other areas of content a user may be interested in.

The user's log file is also subject to another form of analysis, namely rules-based personalization, using a tool such as available from Art Technology Group of Cambridge, Mass., called the Scenario Server, which is an add-on to its Personalization Suite. Here, a user's prior selection of topics in the taxonomy and selection of content type are noted and this data is used to update the influence profile.

Given the number of raw search returns and the number of appropriate objects for presentation in the home repository is quite large, this embodiment uses a set of filters to select object references most appropriate for the users during their next visit. This same filter system also determines temporary rule constructs for a user during his next active trip, weighing a user's action and preferred topics against the recommended content to continue personalization of content offerings while a user is active on the site. These filters are terms in the taxonomy added to a user profile after the influence search, rules based analysis, and inference events have concluded. They are added if the term does not already exist in the profile. If the term is already present because of previous profile additions or user selections, the weight or ranking of this term increases to represent the added influence this term should have on the users' activities. The result is a list of taxonomy terms used to determine what content should fill the primary recommendation area of the embodiment, and what content should be included as related links in each content area.

It is important to note that a user is not bound by these recommendations. This embodiment can be used as a simple conduit with no personalization available to the user if the user chooses to turn the personalization options off in the user's preferences. These options can also be globally turned off if a business customer prefers that the embodiment does not track the movements of its users. The user can also, at any time, browse and search for content separate from what is recommended. The entire archive of licensed content is always available to a user through the taxonomy and searching options. This independent searching is an expected part of the experience and the click stream gathered during these events helps to determine the appropriate areas of recommendation during the next visit.

FIG. 1 is a block diagram of a system for providing a personalized educational environment in accordance with an embodiment of the present invention. A web server 103 is in communication with a network, such as the internet, over which individual users, represented collectively by population 112, may be in communication with the web server 103. The web server 103 is in turn in communication with application server 102, which makes applications available to user in population 112 via web server 103.

Content for the applications delivered by the application server 102 is provided by content management system 105. (The content management system is also in communication with the application server 102; cross communication between various blocks in this diagram has been omitted for simplicity in illustration.) The content management system 105 obtains content from one or more data warehouses 106. As described in further detail below, even though the data may be organized in a relational data base system, the content is also suitably tagged using tags associated with a markup language, such as XML, in a manner permitting rapid access of the content using tags via the XML object index. The information in the data warehouses in turn is furnished initially and supplemented from time to time (typically on a manual basis) by the authoring and tagging provider 111. As will be described more fully below, the information in the data warehouses is organized, under supervision of the content management system 105, by the tag parser, index creator and update system 113.

The content accessed by an application on application server 102 via content management system 105 is personalized for each user in the manner described above. One source of the personalization is via the rules-based personalization module 109 based on personal data (job function, organization and user preferences) from the profile/user database 110. (Hence the personalization module 109 is also in communication with the application server 102.) Profile/user database 110 includes, among other things, for each individual of population 112 who has run through a registration process, user registration data, an influence profile and a competency profile. Rules-based personalization module 109 utilizes the competency profile and the influence profile from the profile/user database 110 to determine the user's experience in the environment, and in particular, content accessed by an application on application server 102 via the content management system 105. The object index 104, which is in communication with the tag parser/index creator and update system 113, provides a continually updated, multi-dimensional index for the tags and the information associated with such tags. As described previously, a taxonomy is established for content delivered by content management system 105, and the content has been tagged either by tag parcer 113 after content has been added to the content management system 105 or by authoring and tagging provider 111 before the content has been added to the content management system 105. In either event, the tagging is performed in accordance with terms in the taxonomy. Because the taxonomy does not embrace all terms pertinent to the categories it covers, a thesaurus is used to map a term to all categories in the taxonomy to which the term is pertinent. Keywords used by the tag parcer 113 and the authoring and tagging provider 111 in the course of tagging content are derived from the thesaurus and the taxonomy. Accordingly, the object index 104 reflects the results of the tagging processes performed in items 111 and 113.

The influence profile for a user is dynamically updated by inference engine 108, which operates on data (performing what can be called "click stream analysis") on the basis of: (i) individual interaction with external data from the web server 103 as processed by influence engine 101; (ii) responses from the individual in the course of interacting with applications provided by application server 102; and (iii) iterative comparison of data for a user demographic group against another group.

An example of an influence profile is provided in FIG. 60, which a data set pertinent to user having ID number 00721. The influence category column for this user indicates, among other things, top level categories in the taxonomy and associated weights for such categories that provide a measure of the relative proportions of such categories in the presentation to the user of content in the environment. In addition the influence category column includes a listing of information product types along with associated weights for such information product type that provide a measure of the relative proportions of such product types in the presentation to the user of content in the environment.

Figure 58:
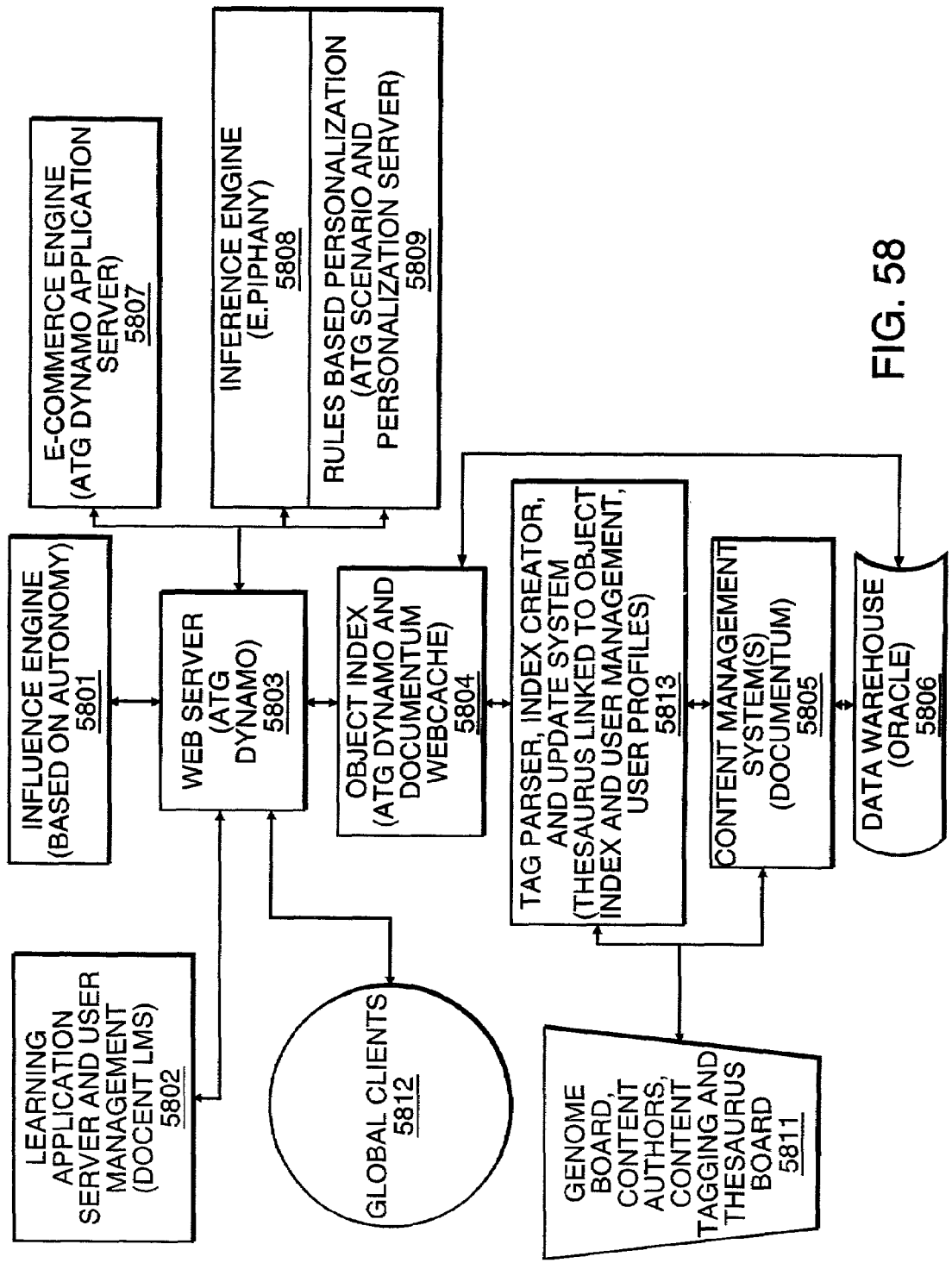
FIG. 58 is block diagram of a system for providing a personalized education environment in accordance with a further embodiment of the invention.

FIG. 58 shows how an embodiment having the general structure of FIG. 1 may be implemented. In this figure the item numbers 5801, 5802, 5803 . . . 5813 correspond to the item numbers 101, 102, 103 . . . 113 respectively. As shown in FIG. 58, the influence engine 5801 may suitably be based on Autonomy software from Autonomy Inc. of San Francisco, Calif. The learning application server and user management system 5802 replaces both the application server 102 and the profile/user database 110 of FIG. 1 and may utilize Docent from Docent, Inc. of Mountain View, Calif. The web server 5803 may be implemented by ATG Dynamo from Art Technology Group of Cambridge, Mass. The object index 5803 may likewise employ ATG Dynamo as well as Documentum Webcache from Documentum, Inc. of Pleasanton, Calif. As in FIG. 1, the object engine 5804 of this embodiment contains both the thesaurus and the taxonomy. The thesaurus of the object engine 5804 is linked to the tag parcer, index creator and update system 5813. The system 5813 is also in communication with user management and user profiles as well as the content management system 5805. The content management system 5805 may be implemented using software from Documentum. Both the content management system 5805 and the tag parcer, index creator, and update system 5813 are in communication with the genome board, the content authors, content tagging, and thesaurus board as shown at 5811. These boards administer the system and provide the standards for education genomes, content and tagging for the global clients 5812 of this structure.

In accordance with the embodiment of FIG. 58, the data warehouse 5806 is implemented using Oracle, provided by Oracle, Inc. of Redwood Shores, Calif. ATG Dynamo may provide the application server used to implement the e-commerce engine 5807. The inference engine 5808 is in communication with the e-commerce engine 5807, the web server 5803, and rules based personalization 5809. The inference engine 5808 may utilize software from E-piphany, as described above, and rule based personalization 5809 may be implemented with the ATG Scenario and Personalization Server.

Figure 2:
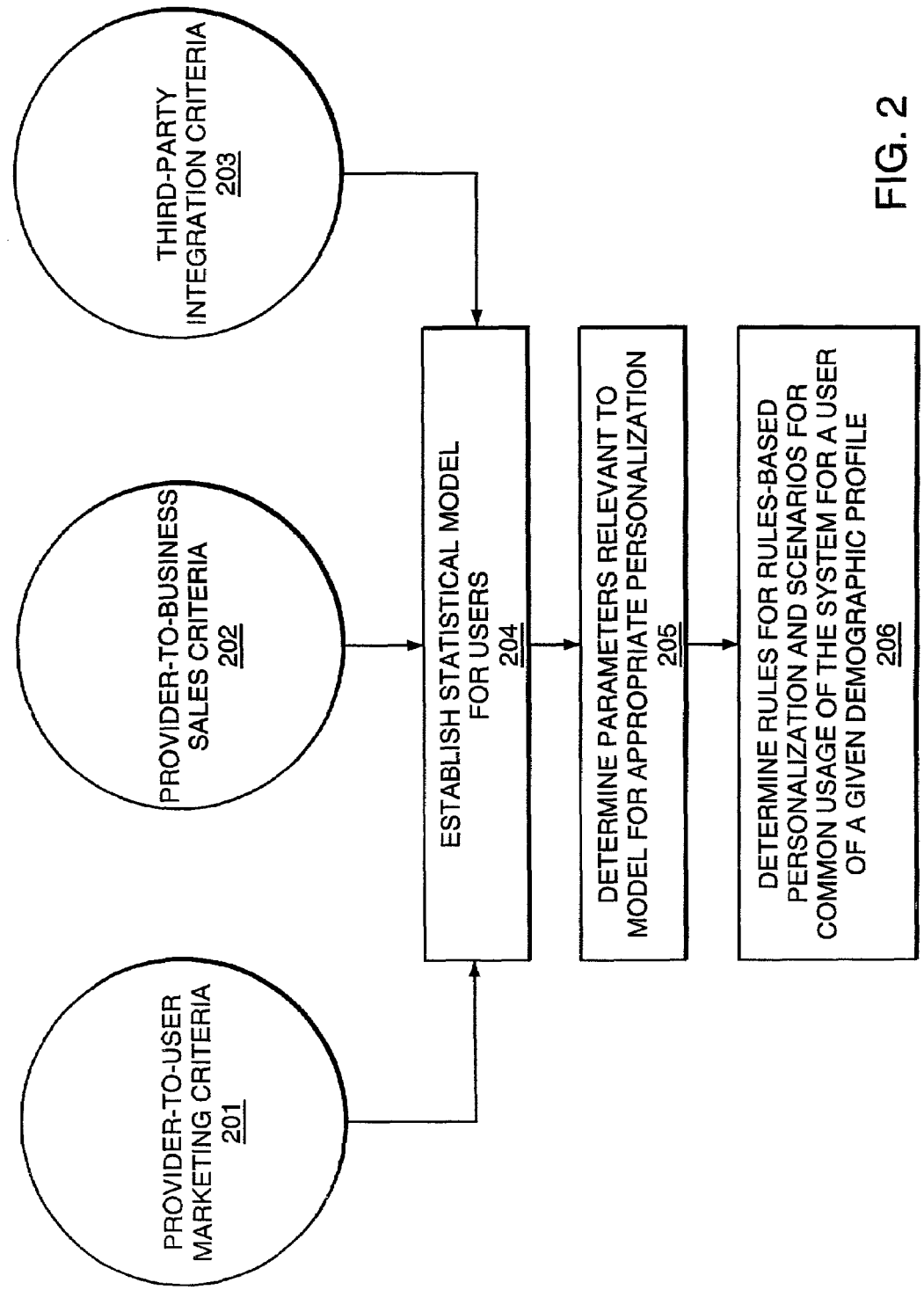
FIG. 2 is a flow chart illustrating a method of constructing the inference engine and rules-based personalization module of FIG. 1 in accordance with an embodiment of the present invention.

FIG. 2 is a flow chart illustrating a method of constructing the inference engine 108 and rules-based personalization module 109 of FIG. 1 in accordance with an embodiment of the present invention. The processes of this figure are typically performed manually. An important facet in the construction of the personalization module is establishment of a statistical model for users of the system, as indicated in block 204 of FIG. 2. The model in this embodiment utilizes criteria applicable to (a) provider-to-user marketing (shown as item 201), (b) provider-to-business sales 202, and (c) third-party integration services 203. In other words, the personalization depends on the relations of the user to the provider of the system (hence criteria in category (a). The personalization also depends on the relations of the user to a business customer of the system (hence criteria in category (b). Finally, the personalization also depends on content or other services provided by a third party integrator to the provider (hence criteria in category (c). Once the parameters relevant to the model have been determined in process 205, there are determined, in process 206, the rules for rules-based personalization and scenarios for common usage of the system for a user of a given demographic profile.

Figure 3:
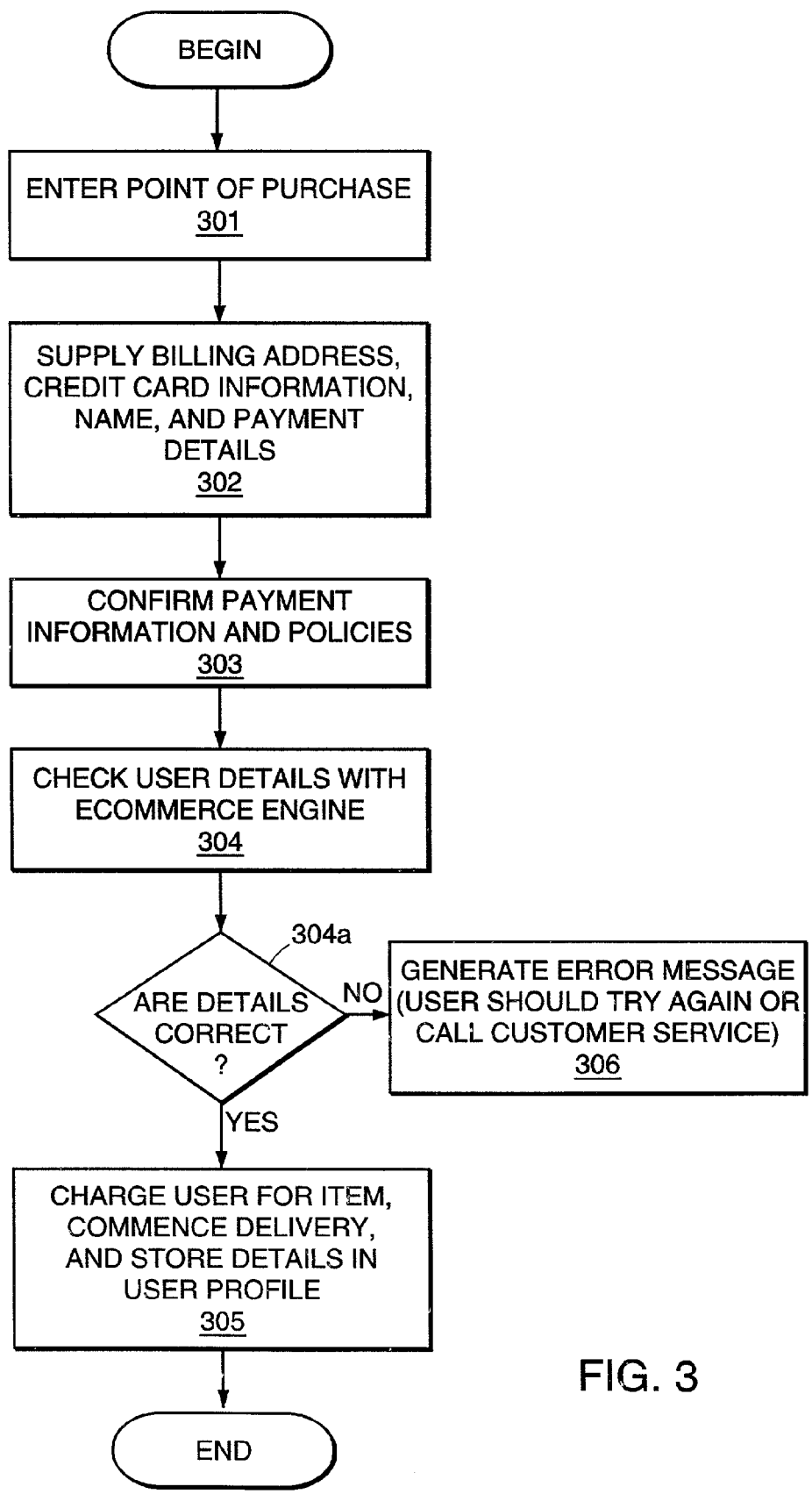
FIG. 3 is a flow chart illustrating processes of the eCommerce engine of FIG. 1 in accordance with an embodiment of the present invention.

FIG. 3 is a flow chart illustrating the processes of the eCommerce engine of FIG. 1. The eCommerce engine facilitates on-line purchase of products or services from an eCommerce company in the context of the system of FIG. 1. In process 301, a user enters a point of purchase. Pursuant to prompts, in process 302, the user supplies a billing address, shipment information, credit card information, and other payment details. In process 303, the eCommerce engine confirms the payment information and the user's understanding of the eCommerce company's policies. In process 304, the engine checks the user details. Process 304a determines whether the details are correct; if the details are incorrect, a message will be generated, in process 306, informing the user that there has been an error and advising the user to try again or call a customer service representative. If the details are correct, the user will be charged for the item in process 305, a delivery process will commence, and the user profile and details of the purchase will be stored.

Figure 4:
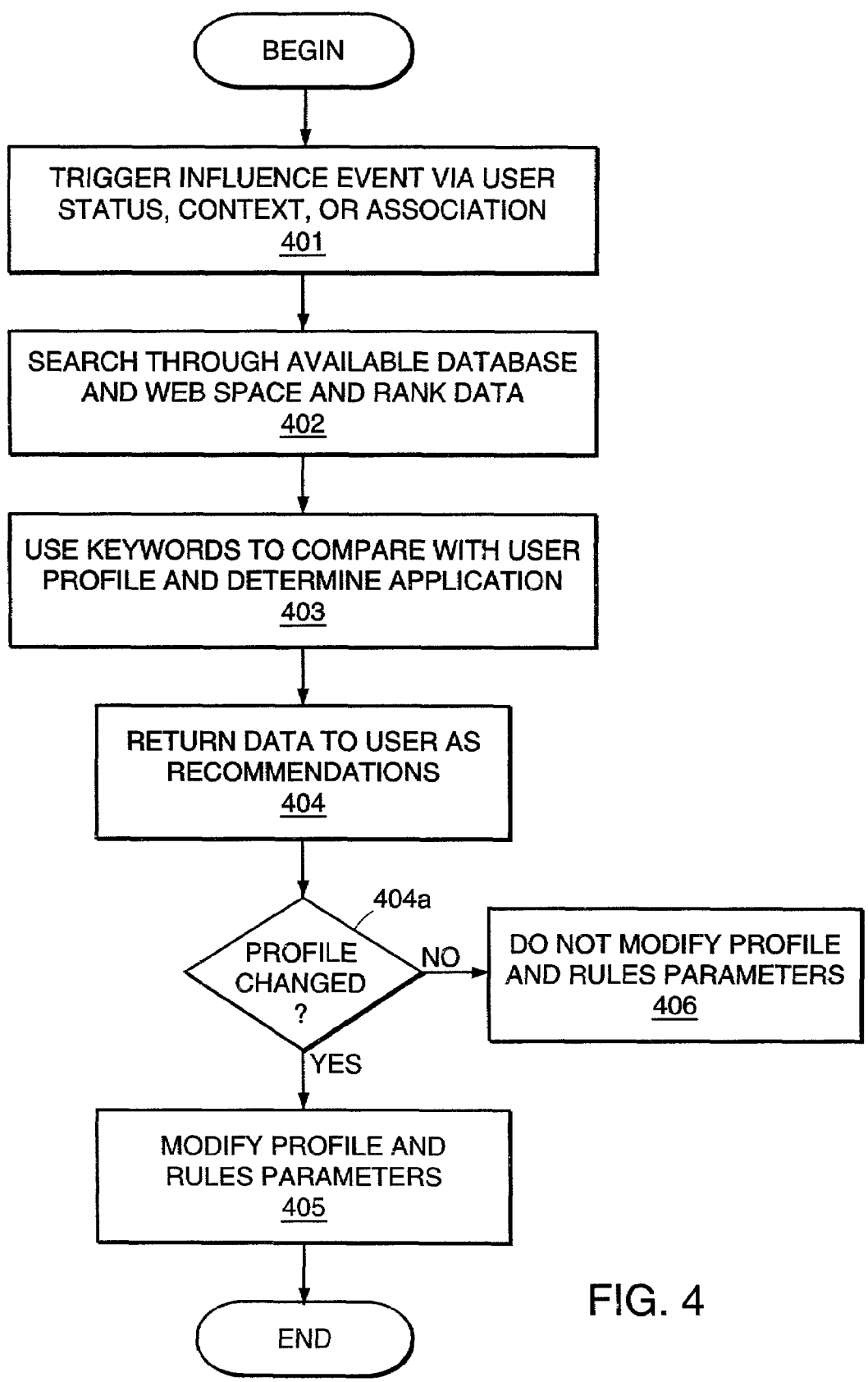
FIG. 4 is a flow chart illustrating operation of the influence engine of FIG. 1 in accordance with an embodiment of the invention.

FIG. 4 is a flow chart illustrating operation of the influence engine of FIG. 1 in accordance with an embodiment of the invention. In process 401, an influence event is triggered, wherein a user is determined to be impelled to develop competency in a target subject. The influence event may be triggered by virtue of a user's status, the context of a user's participation, or through a process of association with information in the user's profile. A search through all available databases and web spaces is conducted in process 402, and the data produced by the search is ranked according to relevance. In process 403, keywords are used to compare the data with the user's user profile and to determine how the data should be applied. As discussed in connection with FIG. 1 above, the keywords used in process 403 are based on the taxonomy, and in particular collectively are derived from the thesaurus and the taxonomy itself. In process 404, the data is returned to the user and recommendations are made with respect to the data. In process 404a, there is a test to determine whether the user's profile status has changed as a result of the influence event. If the user's profile status has not changed, in process 406 no modifications are be made to the inference engine and rules parameters. If, however, the profile has changed, the profile parameters for the user are modified, in process 405, to reflect the results of the influence event.

Figure 5:
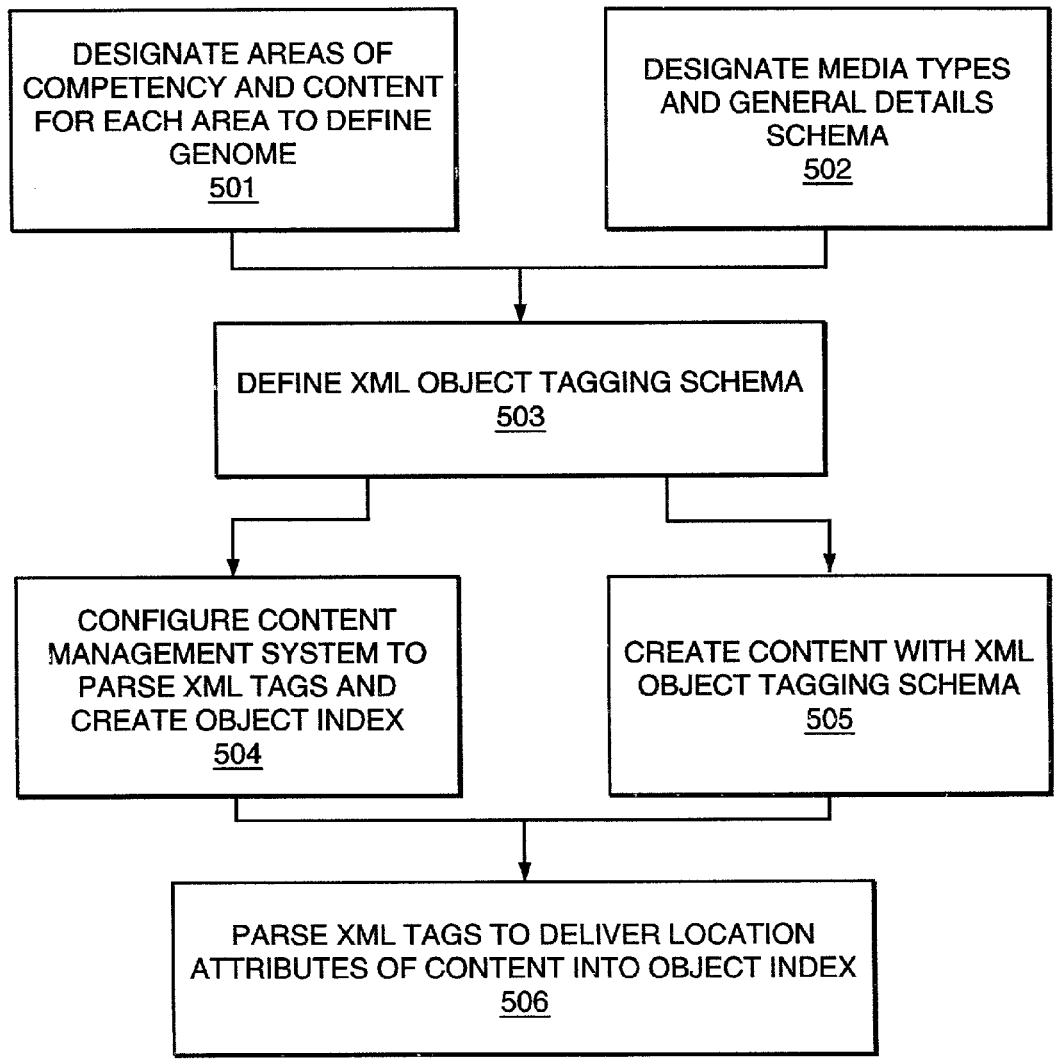
FIG. 5 is a flow chart illustrating a procedure for implementing an object tagging schema pertinent to operating the data warehouse(s), object index, and the content management system of FIG. 1 in accordance with an embodiment of the present invention.

FIG. 5 is a flow chart illustrating a procedure for structuring XML schema relevant to the system of FIG. 1 in accordance with an embodiment of the present invention. In process 501, areas of competency and content are designated for each learning area in order to define an education genome. The education genome in turn is structured hierarchically into categories that constitute the taxonomy. This process, which is typically performed manually—indeed, appropriately by a high level committee—produces something akin to a topical outline (including subheadings) of the universe of competencies to be addressed by the embodiment of the system. In process 502, also performed manually, and which may be conducted in parallel with process 501, a schema for media types and general details is also designated. Once the processes 501 and 502 have been completed, there is defined an XML object-tagging schema in process 503 (also typically a manual process), which constitutes the taxonomy. Once the object-tagging schema is defined, two processes may be conducted in parallel. In process 504, the tag parser 113 is configured, to enable it to parse the XML tags and to create the object index 104. The configuration of the tag parser 113 depends on the taxonomy.

In particular, from the taxonomy there is derived the thesaurus, which maps each of a body of relevant terms to all categories in the taxonomy to which such term is pertinent. The thesaurus is used to configure the tag parser 113. Additionally, in process 505, content is created (or supplied) with the XML object tagging schema defined in process 503. In process 506, the XML tags associated with the content are then parsed, and location attributes of the content are delivered to the object index 104.

Figure 59:
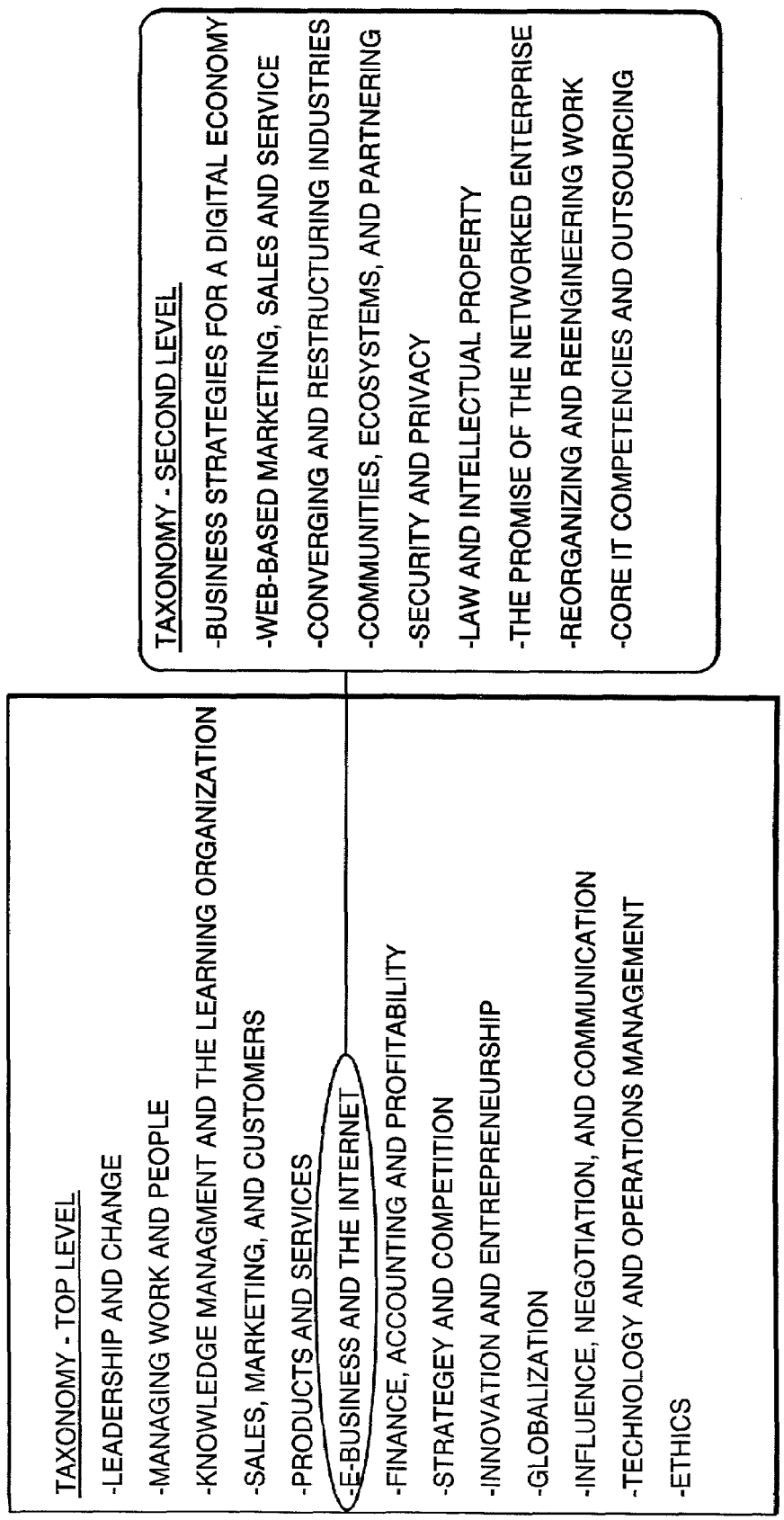
FIG. 59 is a graphical illustration of a dual level taxonomy in accordance with an embodiment of the invention.

An example of a taxonomy is provided in FIG. 59, which shows on the left side the top level of categories for an environment addressing business management education. Each of the top level categories is further divided into subcategories. As an illustration, the top level category "E-business and the internet" has second-level subcategories shown on the right side of the figure. It possible for each of these subcategories to be further partitioned if desired.

Figure 6:
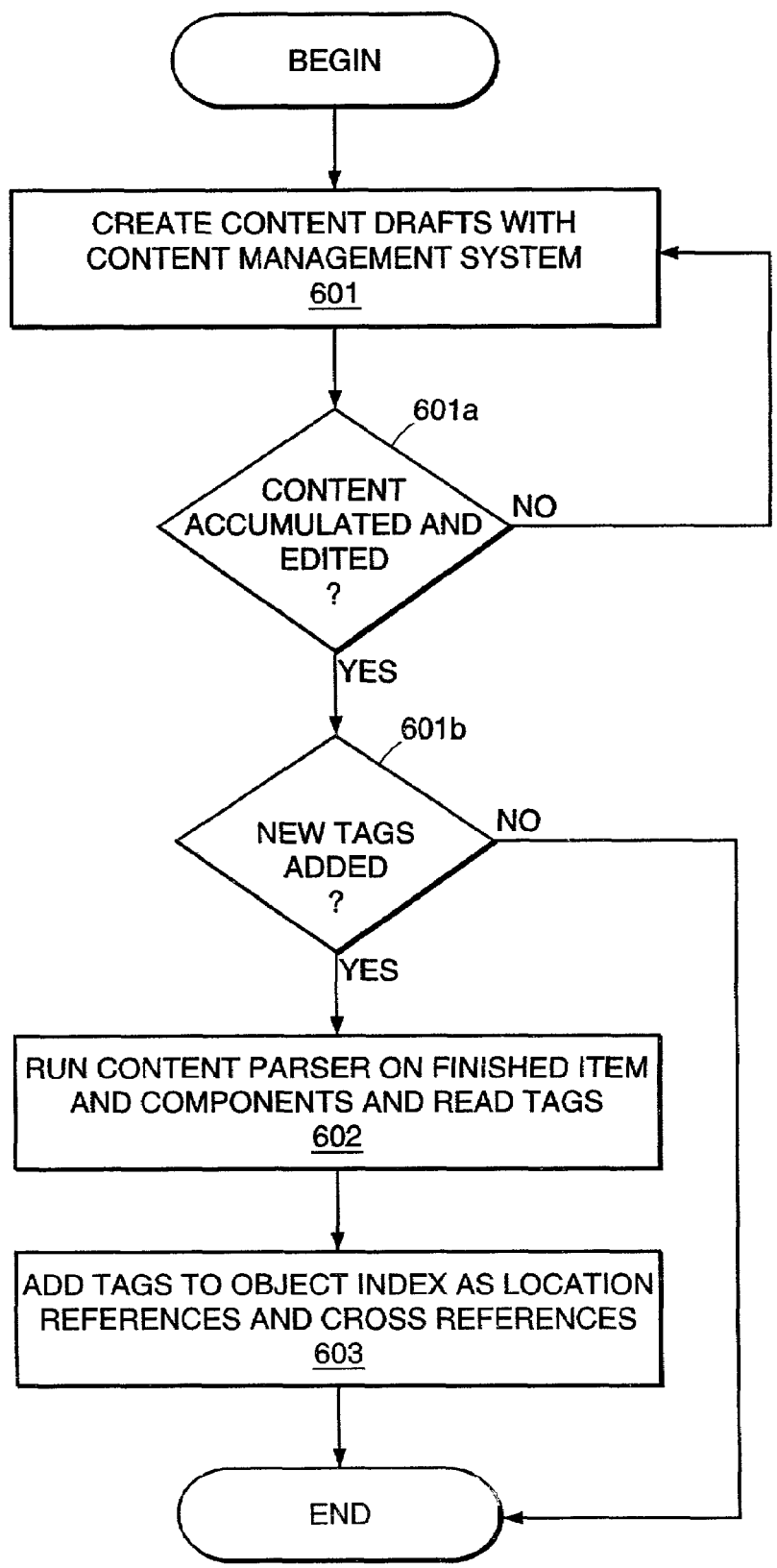
FIG. 6 is a flow chart illustrating a procedure for adding content to the content management system in accordance with an embodiment of the invention.

FIG. 6 is a flow chart illustrating a procedure for adding content to the content management system 105 of FIG. 1 in accordance with an embodiment of the invention. In process 601, content drafts are created using the XML object-tagging schema developed in processes of FIG. 5. In process 601a, there is a check to determine whether the content is complete, that is, whether the content has been accumulated and edited. If there is more content to accumulate or edit, the process 601 is continued. If all of the content has been accumulated and edited, then, there is a determination, in process 601b, whether new tags have been added. If no new tags have been added, the procedure is terminated. If, however, there have been new tags added, the content parser is run on the drafts accumulated in process 601 to read the object tags in process 602. In process 603, the tags are added to the object index 104 of FIG. 1.

Figure 7:
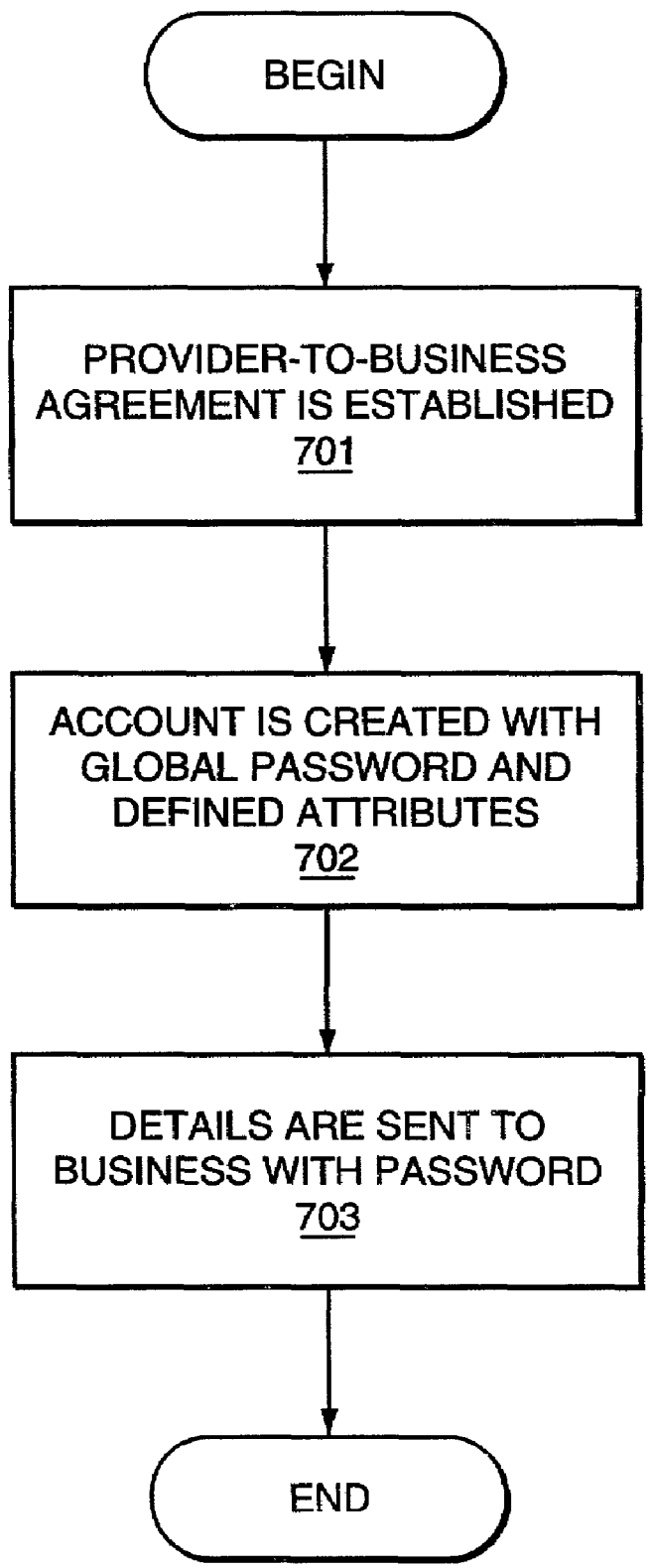
FIG. 7 is a flow chart illustrating a method in accordance with an embodiment of the invention for establishing a class of users having a group permission rendering them eligible to utilize the system of FIG. 1.

FIG. 7 is a flow chart illustrating a method in accordance with an embodiment of the invention for establishing a class of users having a group permission rendering them eligible to utilize the system of FIG. 1 . The network based educational environment of the present invention may involve any number of particular markets. Such markets may include a provider-to-business market, provider-to-academia market, and provider-to-user market. For convenience, as mentioned above in connection with the definitions, we identify a "business customer" as any enterprise that shall have made arrangements with the provider pursuant to which members of the enterprise may become users of a system embodied in accordance with the present invention. This figure thus addresses the enlistment of a business customer. In process 701, an agreement with the business customer is established. In process 702, an account in the network is created and the business customer is given a global password, and attributes related to the desired or necessary education genome and content view are defined for users associated with the business customer. These details are then sent, in process 703, to the business along with a password which the business may pass on to individual users.

Figure 8:
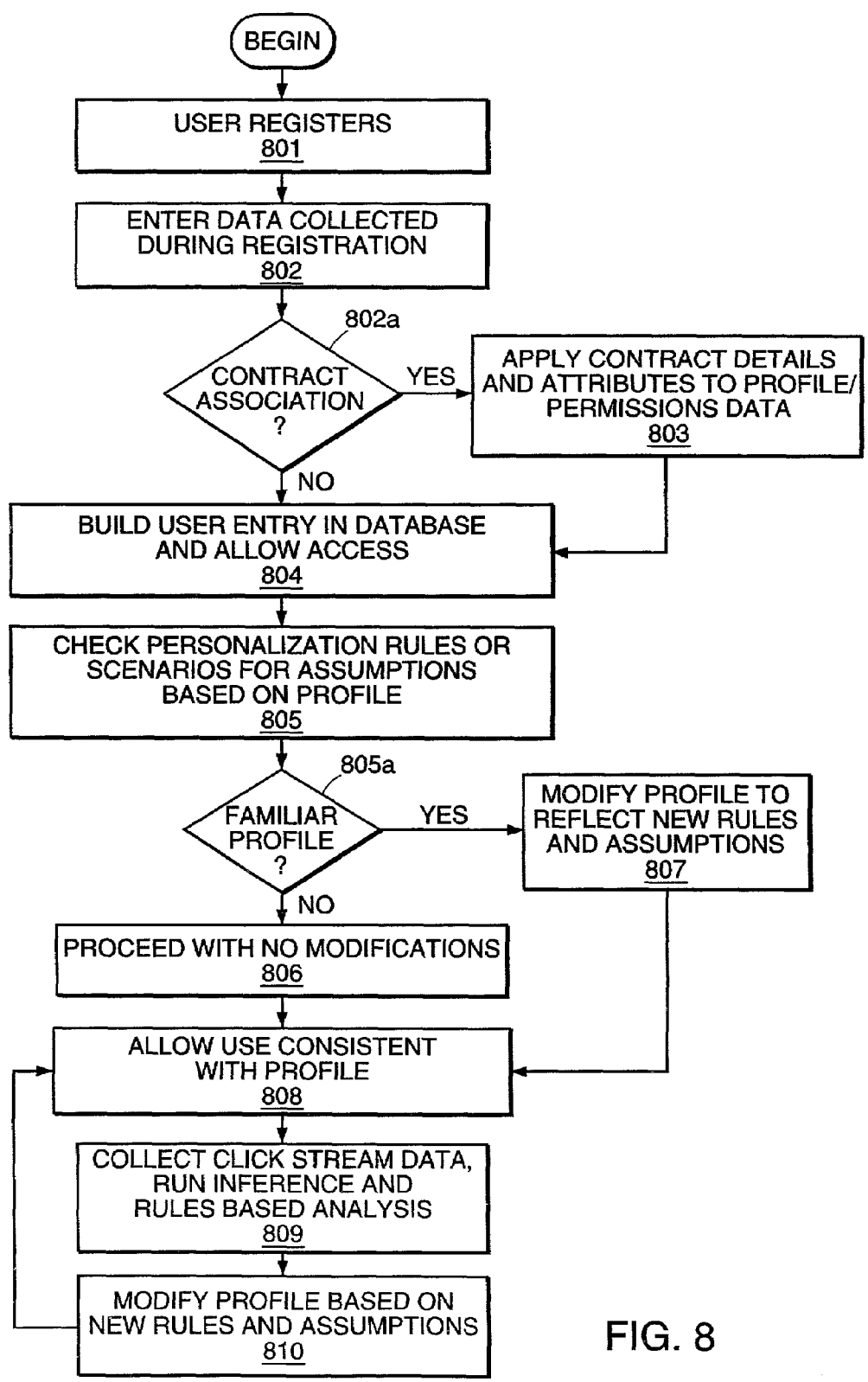
FIG. 8 is a flow chart illustrating operation of the personalization module 109 of FIG. 1 in relation to the profile/user database 110 for a new user in accordance with an embodiment of the present invention.

FIG. 8 is a flow chart illustrating operation of the personalization module 109 of FIG. 1 in relation to the profile/user database 110 of FIG. 1 for a new user in accordance with an embodiment of the present invention. Following registration of the user in process 801, data collected during registration is entered in process 802. There is a determination, in process 802a, whether the user is a member of a business customer that has an agreement in accordance with the method described above in connection with FIG. 7. If a business customer agreement exists for the user, the agreement details and attributes are applied, in process 803, to the user's profile/permission data, and, in process 804, a user entry is established in the database and the user is granted access. If, pursuant to the determination in process 802a, it is found that no business customer agreement exists, then in a user entry is established in the database, as above in process 804, and the user is granted access. In process 805, the personalization module is accessed, and in process 805a, there is a determination whether the profile data match any normative profiles. If the profile is deemed to be familiar, then in process 807, the profile is modified to reflect new rules and assumptions associated with the matched normative profile; then in process 808 there is allowed use consistent with the new profile. If pursuant to process 805a, it is determined that the profile is not familiar, this is noted by the system, and the user in is allowed to proceed, in process 806. No modifications to the profile are made initially. As in the case of a familiar profile, there is allowed, in process 808, use consistent with the user profile. In process 809, click stream data is collected and an inference and rules-based analysis on the click steam data is performed. Following the analysis performed in process 809, the profile is modified, in process 810, based on any new rules and assumptions formed from the result of the analysis. Again, use consistent with the new profile is then allowed. Thus, the user profile is continually updated to reflect the user's progress and educational interests.

Figure 9:
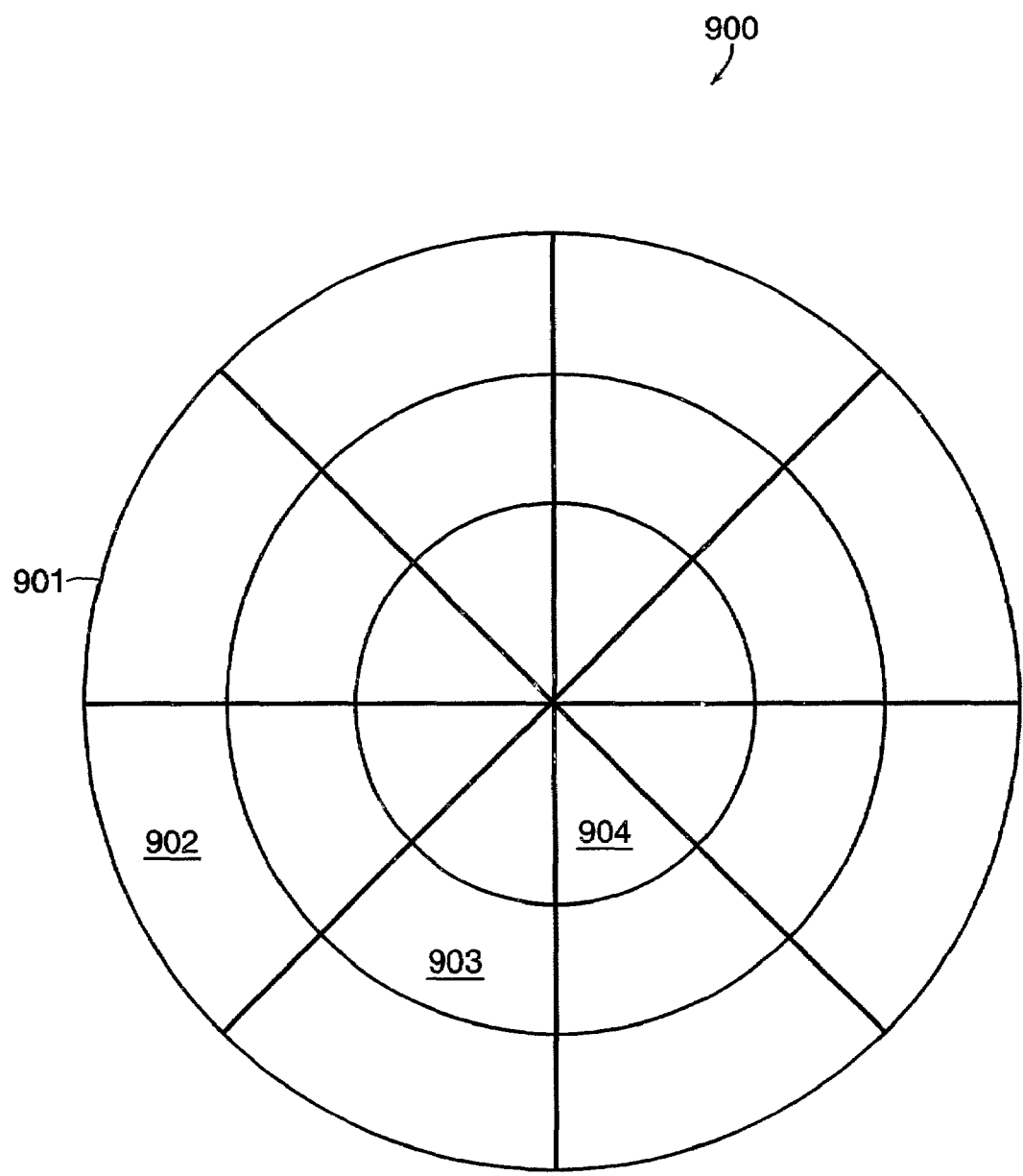
FIG. 9 is a diagrammatic illustration of an education genome for use in association with the rules-based personalization module of FIG. 1 in accordance with an embodiment of the present invention.

FIG. 9 is a diagrammatic illustration of a competency map900 for use in association with the rules-based personalization module of FIG. 1 in accordance with an embodiment of the present invention. The competency map900 may be understood as a map of a universe of competencies (the education genome) associated with the subject matter pertinent to the system, for example, of FIG. 1. Each slice, such as the slice 901, represents a competency area or topic associated with the pertinent subject matter, and is therefore one of the top level categories of the pertinent education genome. For example, if the subject area is business management, then a competency area may be (but not is not limited to) the leadership area, the team area, or the e-business area. The competency map900 provides opportunity for portable credentialing plus company wide data-mining and knowledge management. The concentric rings 902, 903, and 904 represent competency levels. Competency levels may include the environmental level, the organizational level, and the personal/transformational level, etc. The education genome (on which the competency map 900 is based) may be defined by educators and people in specific fields who agree upon competencies required by the relevant subject matter of the system. Hence the education genome defines an objective standard for the evaluation of competencies. Whereas companies typically have human resource information on competencies of employees, the presence of an objective standard permits translation of such human resource information into the framework of the standard (and vice-versa) Indeed, the translation may be automated. Further, a translation script can be built that will allow each company's human resource information system to translate their own worldview of managerial competencies to the genome standard.

It is plain that the map of competencies based on the education genome, may provide an objective basis for showingcompetency of an individual, or, for that matter, of a group. On the other hand, the universe of competencies that are relevant to a vocation is not static, because the nature of any given vocation changes over time. Accordingly, the genome also necessarily requires modification over time to keep abreast of changes in subject matter.

Moreover, while we have said that a genome provides an objective basis for evaluating competency of an individual or of a group, a subset of the genome may provide an objective basis for defining competencies to be learned by an individual or a group. Indeed, what we have called a "template" above is a subset of the genome defining a current desired standard of competencies of an individual based on the individual's competency profile. Further, subsets of and engraftments to the genome may be used to objectively define competencies to be learned (or that have been learned) by companies, groups, and individuals.

Figure 10:
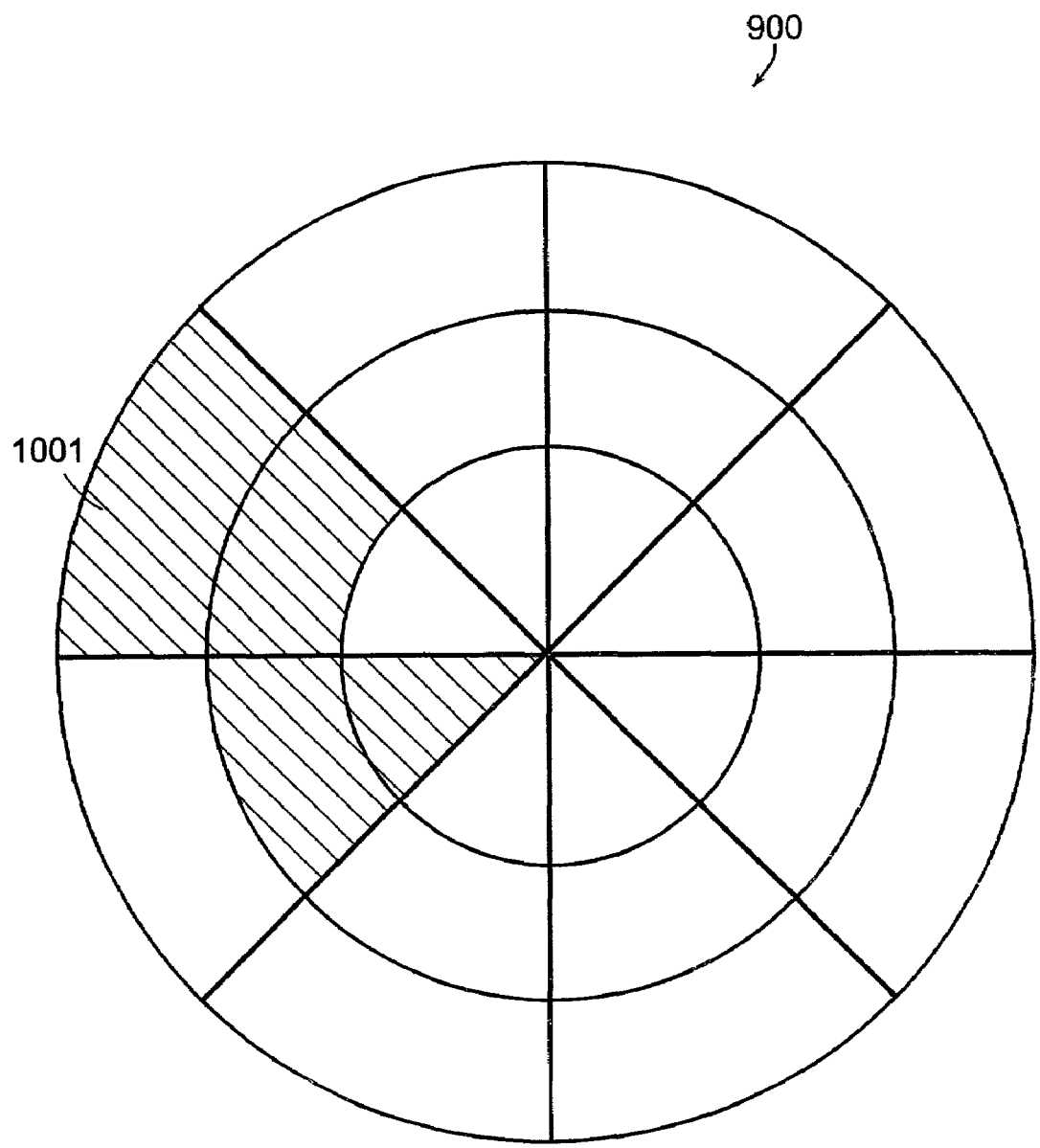
FIG. 10 is an illustration representing a competency map associated with a user's profile in the profile/user database of FIG. 1 in accordance with an embodiment of the present invention.

FIG. 10 is an illustration representing a competency map associated with a user's profile in the profile/user database of FIG. 1 in accordance with an embodiment of the present invention. The competency map of this figure is an overlay on the education genome. For each individual user there may be developed a competency map 1001 that serves to indicate developed competencies and areas for future learning, by for example, as here, showing in shaded design areas of competency and unshaped regions areas for future learning. These areas of learning are defined by the individual's business performance, derived through testing, as well as the influence engine and the inference engine, and by using tags associated with information in the data warehouse(s). The map may be used in supplying links to education content geared the individual's education needs or desires at that moment. Thus, pursuant to embodiments described herein, an ongoing, time-varying, and evolving relationship between an individual and the learning environment is established. Because the education genome provides an objective standard, comparisons can be made of individual or group competencies across company boundaries. In this respect, each company's human resource data applicable to an individual's competencies can be translated into equivalent regions in the education genome; indeed the translation can be automated when the data is consistent.

Additionally, as the map 1001 or personal profile changes, i.e., the learning process progresses, the information is updated using programs that provide for monitoring feedback and methods to interact with others.

Figure 11:
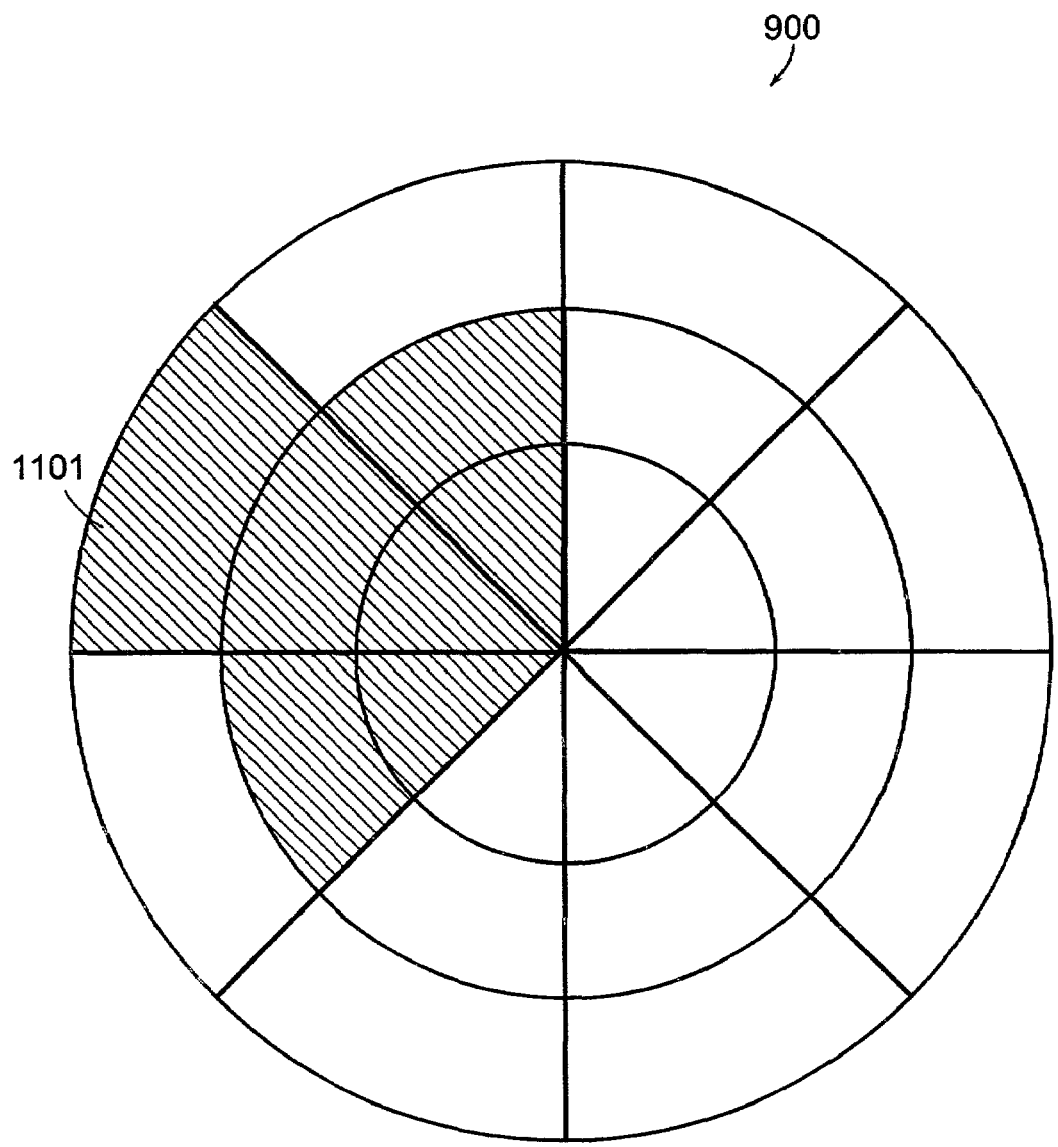
FIG. 11 is an illustration representing a selective view of the aggregated records in the profile/user data base of FIG. 1 which allows a company to actively mine data about its own employees' competencies in accordance with a further embodiment to the invention.

FIG. 11 is an illustration representing a selective view of the aggregated records in the profile/user database that conform to certain criteria of the genome, which allows the business customer to actively mine data about its own employee's competencies. Here, the shaded area 1101 represents a subset of employees, all of whom either sharing certain competencies or have none of those competencies and require them. This allows the business customer to manage the sharing of redistribution of knowledge within the organization and to selectively target employees based on certain competencies or lack thereof. This capability also allows business customers to identify employees who are capable of leading collaborative facilitation and discussion within competencies or areas of the genome.

Figure 12:
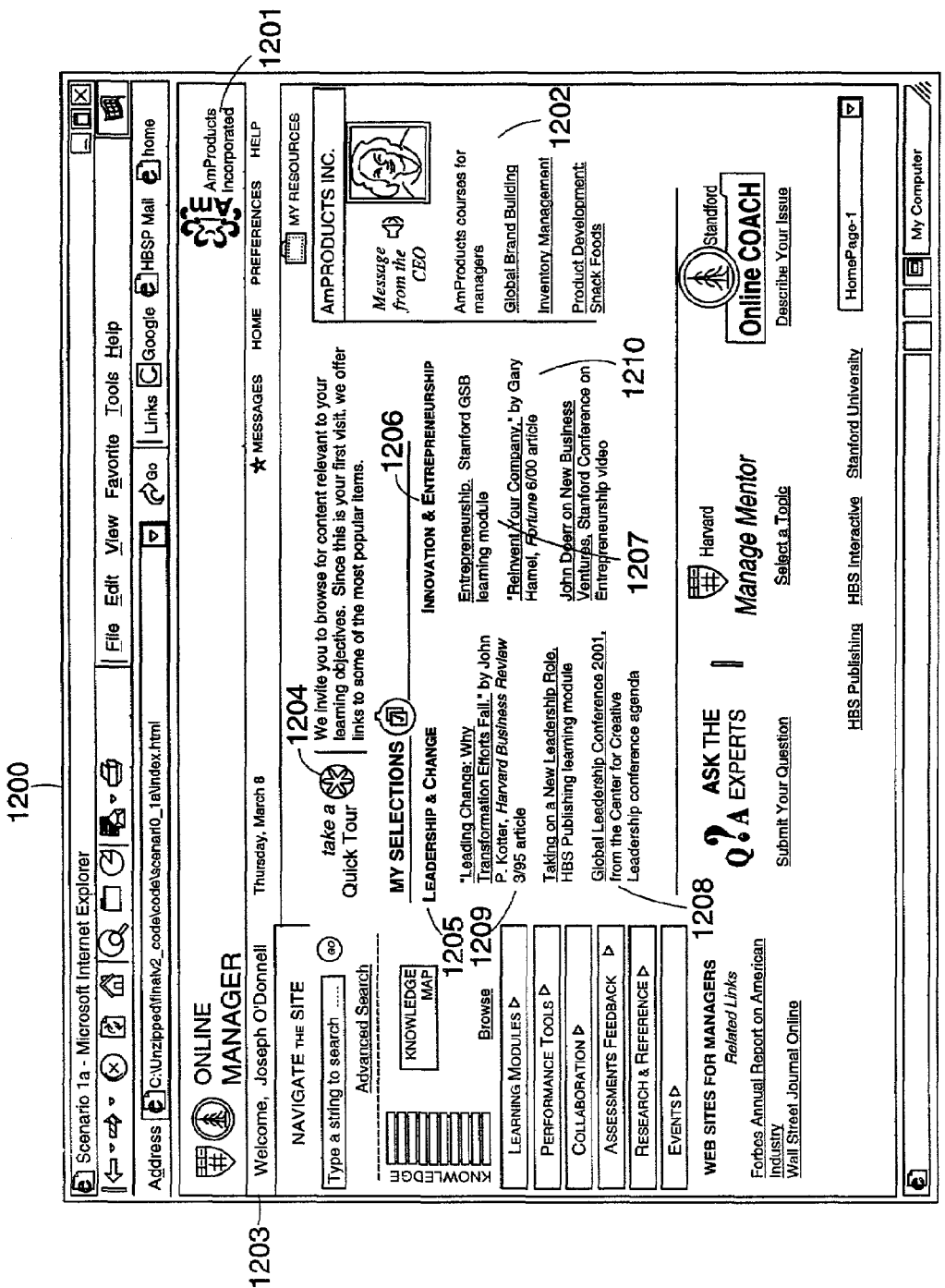
FIG. 12 is a screen shot of a graphical user interface which may be employed in accordance with an embodiment of the invention.

FIG. 12 is an illustration of a graphical user interface provided in accordance with an embodiment of the invention. In this embodiment, the apparatuses and processes of the embodiments of FIGS. 1–11 and 58–60 have been applied to provide a business learning environment, here called "Online Manager" for the business customer "AmProducts", which we sometimes all "the company". In accordance with this first scenario, a first user, Joseph O'Donnell, is a regional manager from Latin America for the beverages division of AmProducts, a global maker of packaged consumer goods. He is a learning-oriented user who is preparing for a major new assignment, launching a soft drink specifically for Latin America. This assignment requires that his staff of five (who directly report to Joseph) will be increased to a staff of twelve. Joseph will need to work on his new business development skills, having spent most of his career managing ongoing operations. The human resources department of AmProducts has recommended that the best resource for preparing for his new assignment is the Online Manager website. The screen shot of FIG. 12 represents Joseph's first time visiting the page.

The screen shot 1200 is an illustration of a default home page for a new user at AmProducts. This website is co-branded with the AmProducts logo 1201, and some of the home page real estate, shown generally at 1202, has been allocated to the company's proprietary use. AmProducts has chosen to use some of their space on the page to highlight some of their training courses and to provide a welcome message, also shown at 1202, from the CEO. When Joseph first registered for use of this website, his personal information was captured and is reflected here where the website says, "Welcome, Joseph O'Donnell" at 1203. An opportunity to take a quick tour of the website and its functionality, via link 1204 is available at the top of the screen.

Two popular knowledge categories have been pre-selected for Joseph to browse. These categories are "Leadership and Change", shown atl205, and "Innovation and Entrepreneurship" at 1206. These categories will become personalized in accordance with Joseph's preferences and click stream. As he progresses, his experience with this website progresses. Within these topic areas, Joseph can access content from the overall catalog offering, including learning modules 1207, 1208 and journal articlesl209, 1210.

Figure 13:
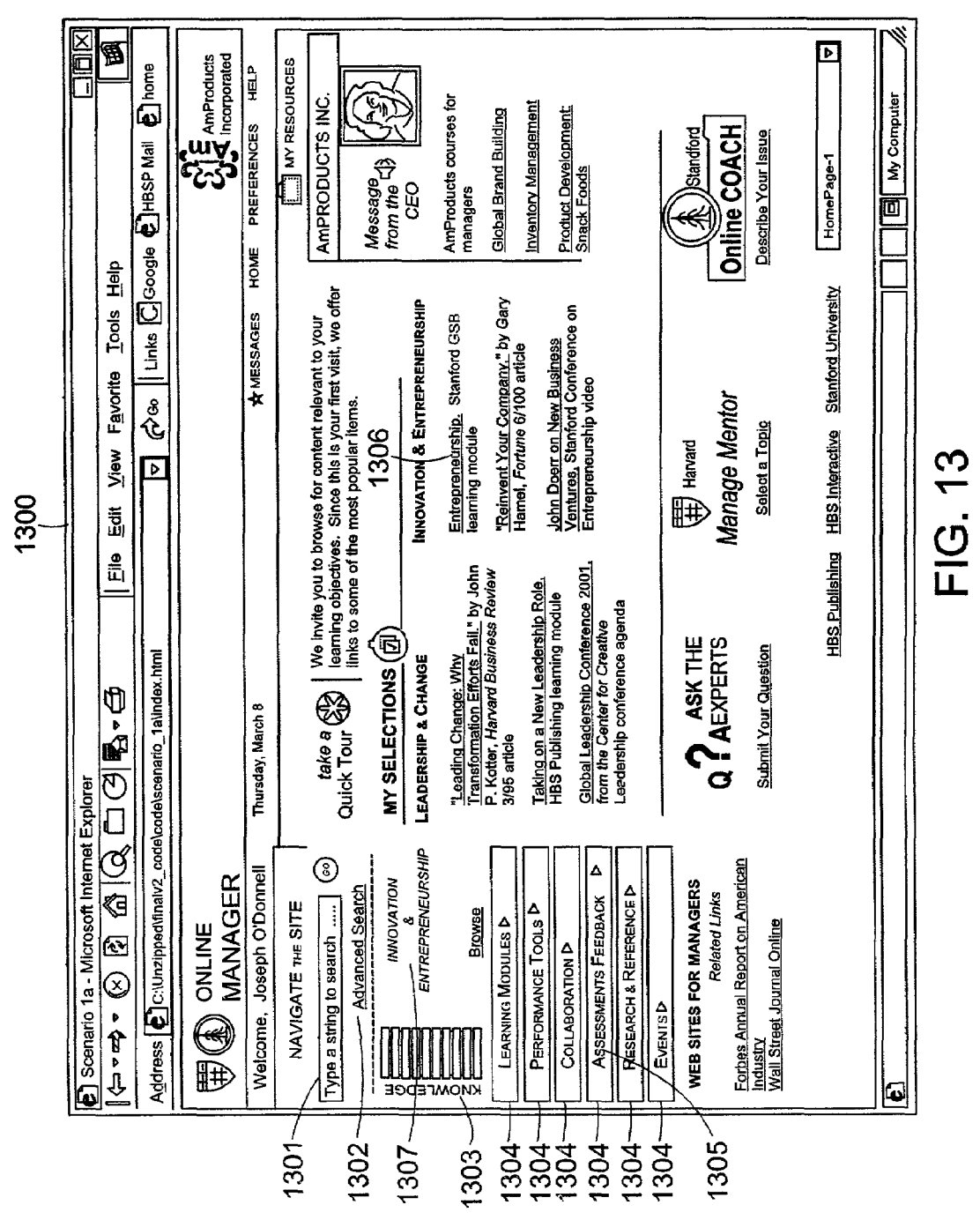

FIG. 13 is a screen shot 1300 showing four ways to locate content on the website, shown here on the left side of the screen 1300. First, if a user knows exactly what he or she wants, he or she may search via simple keyword field 1301 or an advanced search capability accessed via link 1302. If the user is looking for something by topic, he or she can browse using a knowledge map, shown at 1303. If the user is looking for a specific kind of content, her or she can use the content-specific buttons along the left side, shown generally at 1304. If the user is looking for content in his or her focus areas, he or she may engage in an assessment via link 1305. At the conclusion of the assessment, the Online Manager website will recommend learning opportunities in the user's areas of focus, such as those shown at 1306. Each piece of content available on the website is linked to one of a plurality categories making up the knowledge map 1303. This linking allows for a visual representation of the corresponding category whereby other content in that area may be found. As the user progresses through the items 1306, the relevant category 1307 of the knowledge map 1303 will be highlighted.

Figure 14:
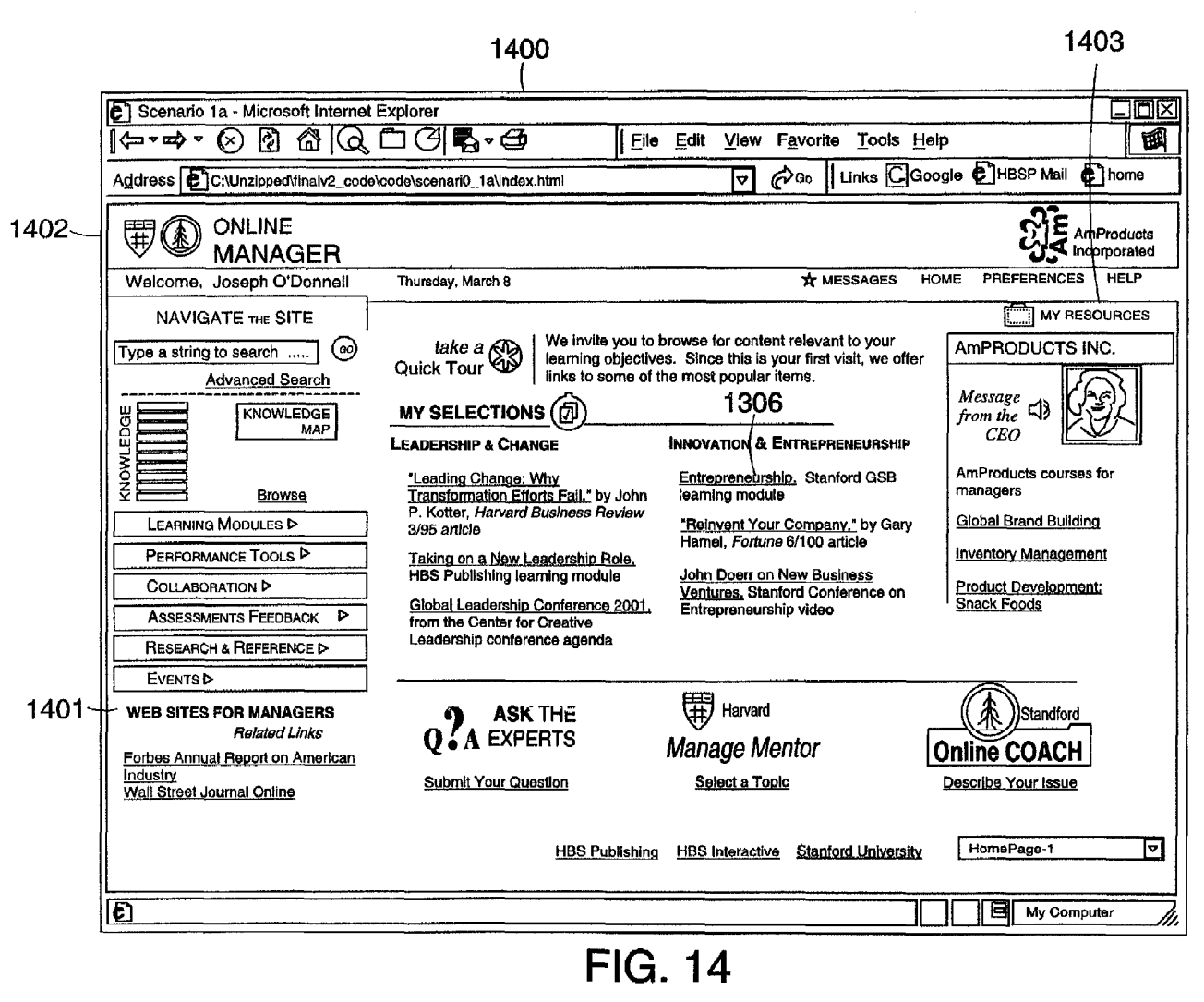

FIG. 14 is graphical illustration showing a screen shot 1400 highlighting "Websites for Managers" area, shown at 1401. This is a set of external websites that have been selected and vetted by Online Manager's editors. This area contains links related to the content visible on the screen. Similarly, "My Resources" is an area, shown at 1403,where a user can save frequently accessed articles and tools used during his or her learning experience.

Figure 15:
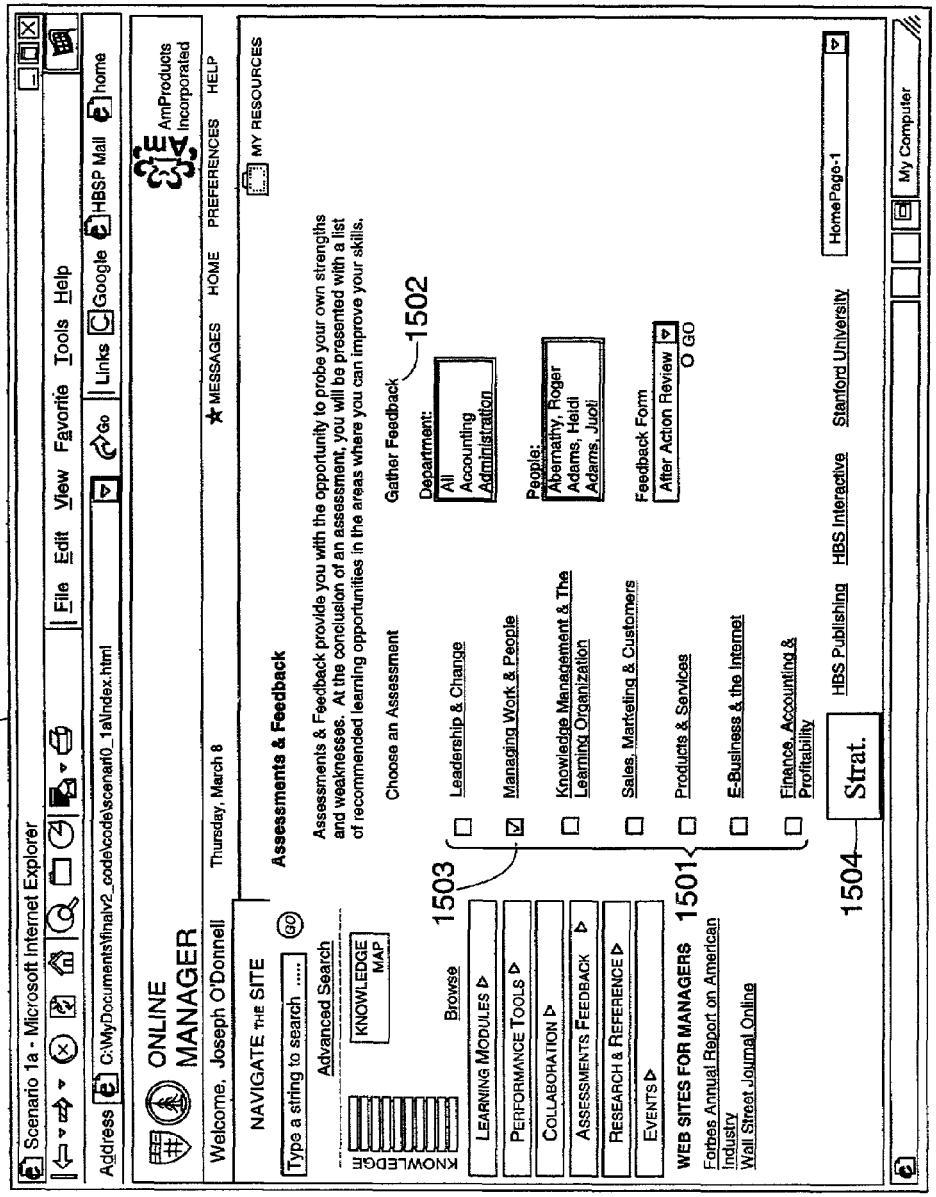
FIG. 15 is a screen shot of illustrating an assessment and feedback interface in accordance with the embodiment of FIG. 12.

FIG. 15 is a screen shot 1500 demonstrating how Joseph, in preparation for his new project, decides to assess his skills in areas relevant to his updated management role. On this page, Joseph has several options. He can choose among the many assessment tools, shown at 1501, offered to test his skills. He can also seek feedback, via area 1502, from colleagues within the company. On this particular visit, Joseph chooses to engage in two assessments via links 1503 and 1504. The two areas in which Joseph chooses to be assessed are "Managing Work & People" 1503 (because he will be doubling the size of his reporting staff), and "Strategy & Competition" 1504 (because he will be launching a product in a competitive space). Each of these areas may be crucial to his new role in bringing the beverage to market.

Figure 16:
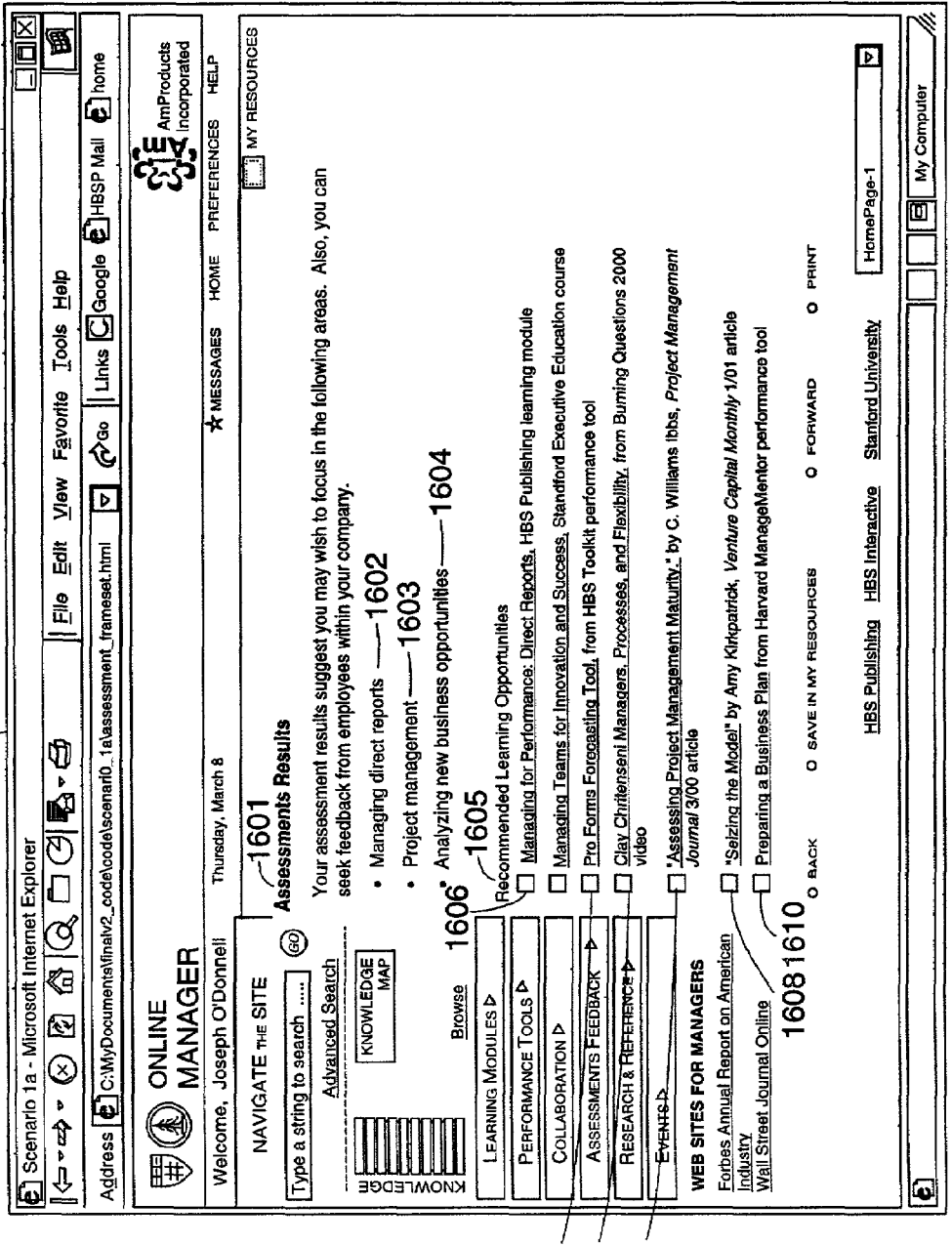
FIG. 16 is a screen shot of an interface by which the first user may view the result of an assessment and related feedback in accordance with the embodiment of FIG. 15.

FIG. 16 is a screen shot 1600 showing that Joseph has completed his two assessments 1601. As a result of the assessments, Joseph is offered three areas, "Managing Direct Reports" 1602, "Project Management" 1603, and "Analyzing New Business Opportunities" 1604 in which he may wish to focus. He is also provided with a recommended list of Online Manager website content in those areas, shown generally at 1605, including links to learning modules 1606, articles 1607 and 1608, tools 1609 and 1610, and videos 1611.

Figure 17:
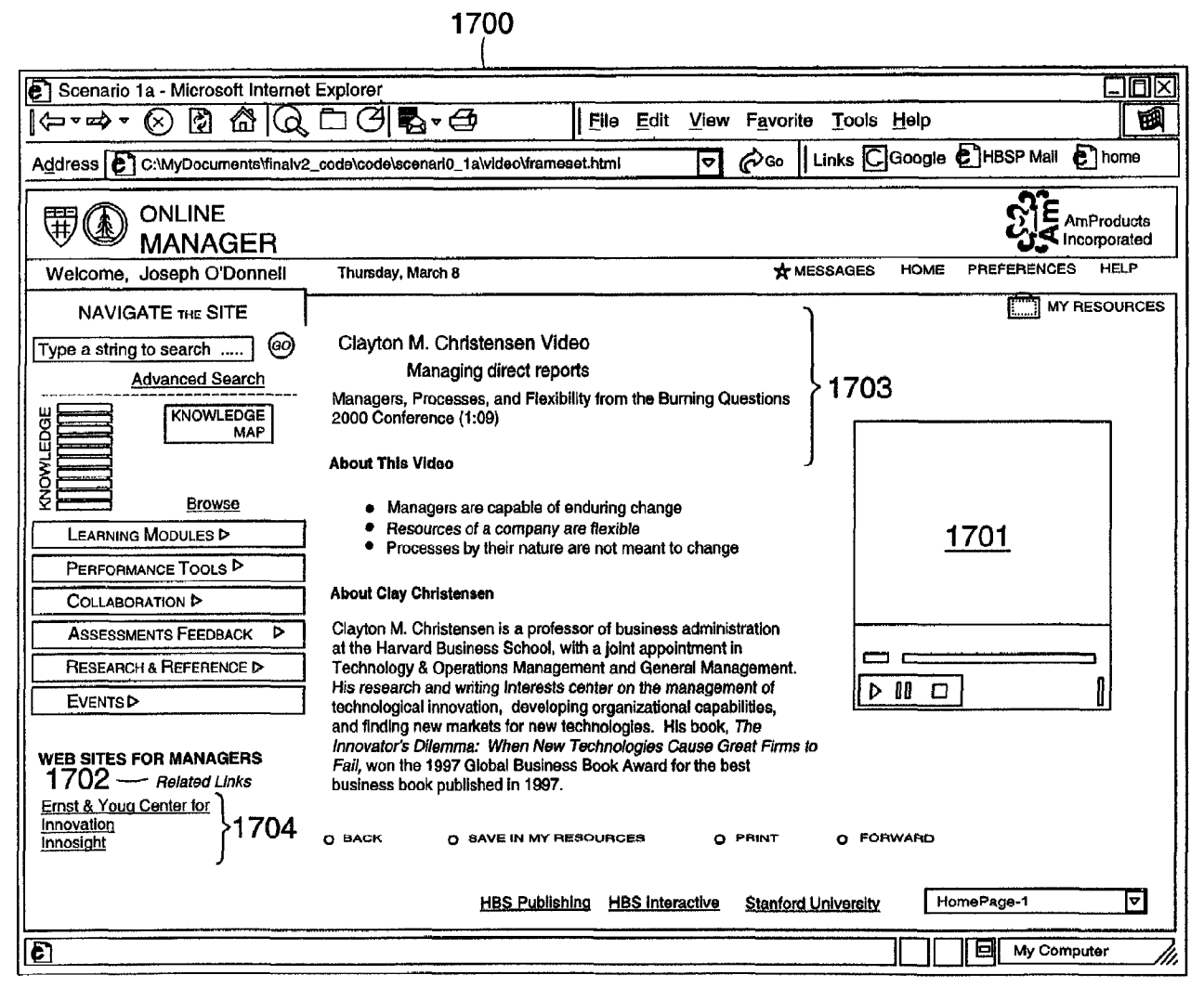
Figure 19:
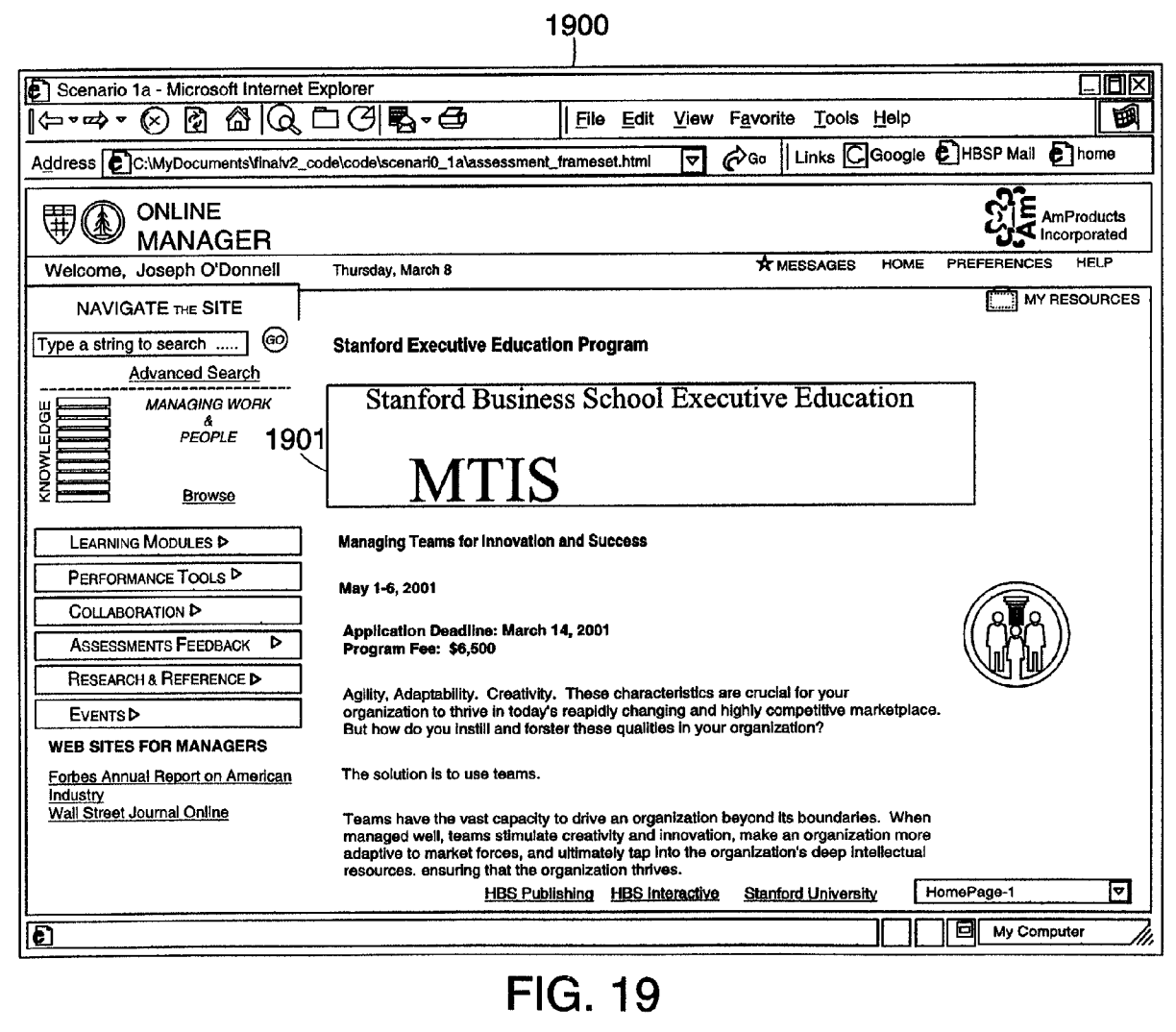
Figure 20:
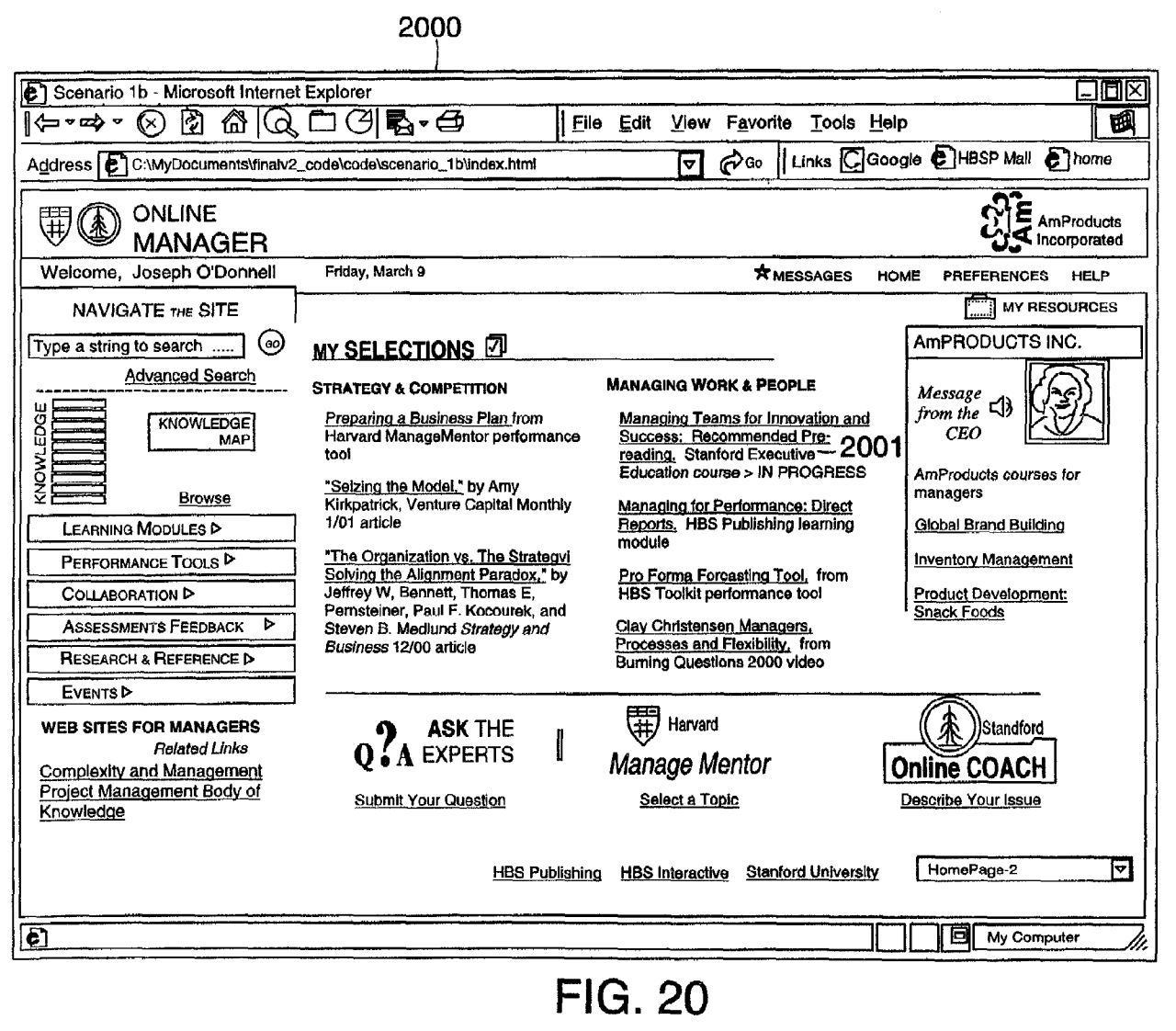

FIG. 17 is a graphical illustration if a screen shot 1700 showing that Joseph chose to view the "Clayton Christensen" video 1701 offered via link 1611. Websites for Managers 1401 now shows "Related Links" 1702. When content is shown in the main window 1703, external websites relevant to that content are shown in this area 1704. FIG. 18 is a screen shot 1800 showing how Joseph can return to page 1601 and select something else that catches his eye. Here, Joseph has selected a Stanford Executive Education course, "Managing Teams for Innovation and Success" highlighted at 1801. Screen shot 1900 of FIG. 19 shows Joseph taking a look at a Stanford Graduate School of Business Executive Education course. Information relative to the course is presented as shown at 1901. Similarly, FIG. 20 is a screen shot 2000 showing that he has to registered in the course, and at item 2001, the pre-reading for the course is now "In Progress".

Figure 21:
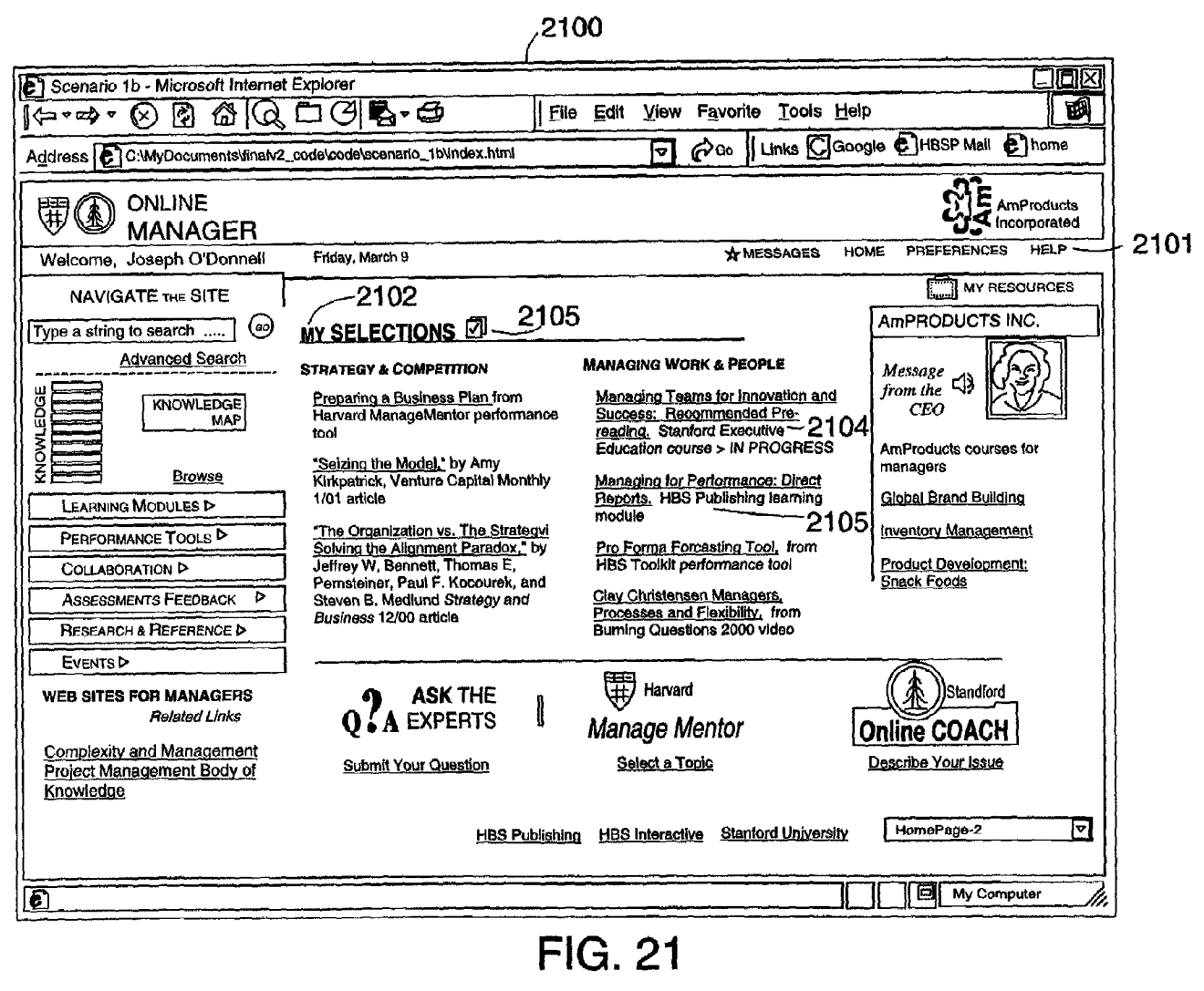

FIG. 21 is a screen shot 2100 showing Joseph's next visit to the website. When Joseph logs in, his home page has changed. The "Take a Quick Tour" section, shown at 1204 in FIG. 12, is gone, but is accessible again under the "Help" section at 2101. His "My Selections" area, shown at 2103, has changed to reflect his previous activity: including the assessments of FIG. 15. The recommendations now appear in the main window 2102, as do other items relevant to the assessment topic areas. There are new "Related Links" shown at 1702, as dictated by the new items in Joseph's "My Selections" area. His "Executive Education" program is marked "In progress" at 2104, and there is a link to pre-reading for the program. Joseph notes another recommendation and chooses the "Managing for Performance" link 2105.

Figure 22:
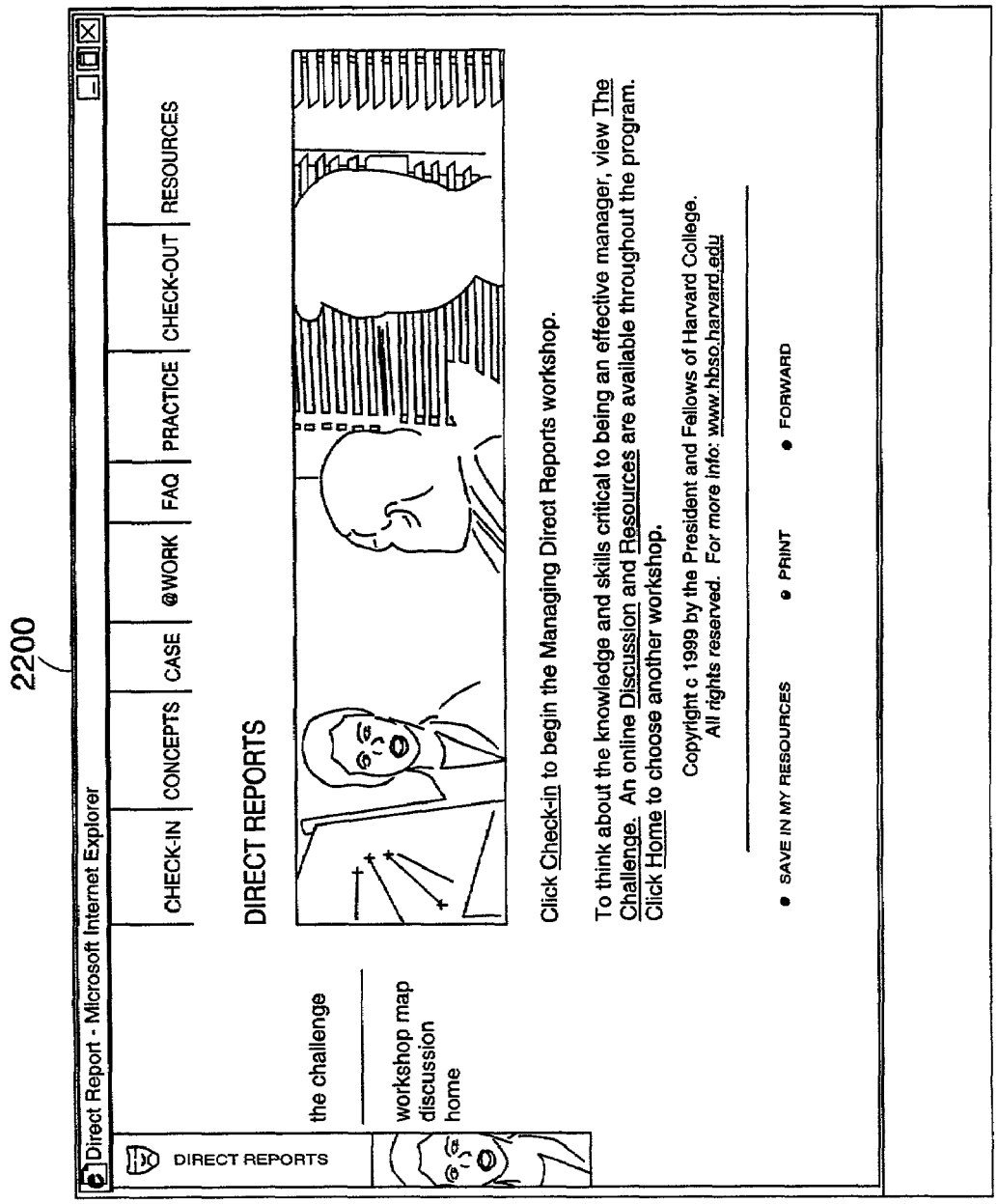
FIG. 22 is screen shot of an interface by which the first user may access a managing and performance module in accordance with the embodiment of FIG. 12.

FIG. 22 is a screen shot 2200 showing that the "Managing for Performance" module is launched, and Joseph can spend as much or as little time as he likes going through it. While he navigates the module, his progress is tracked by the course system database. If he leaves the course midway through, his place will be bookmarked for future visits.

Figure 23:
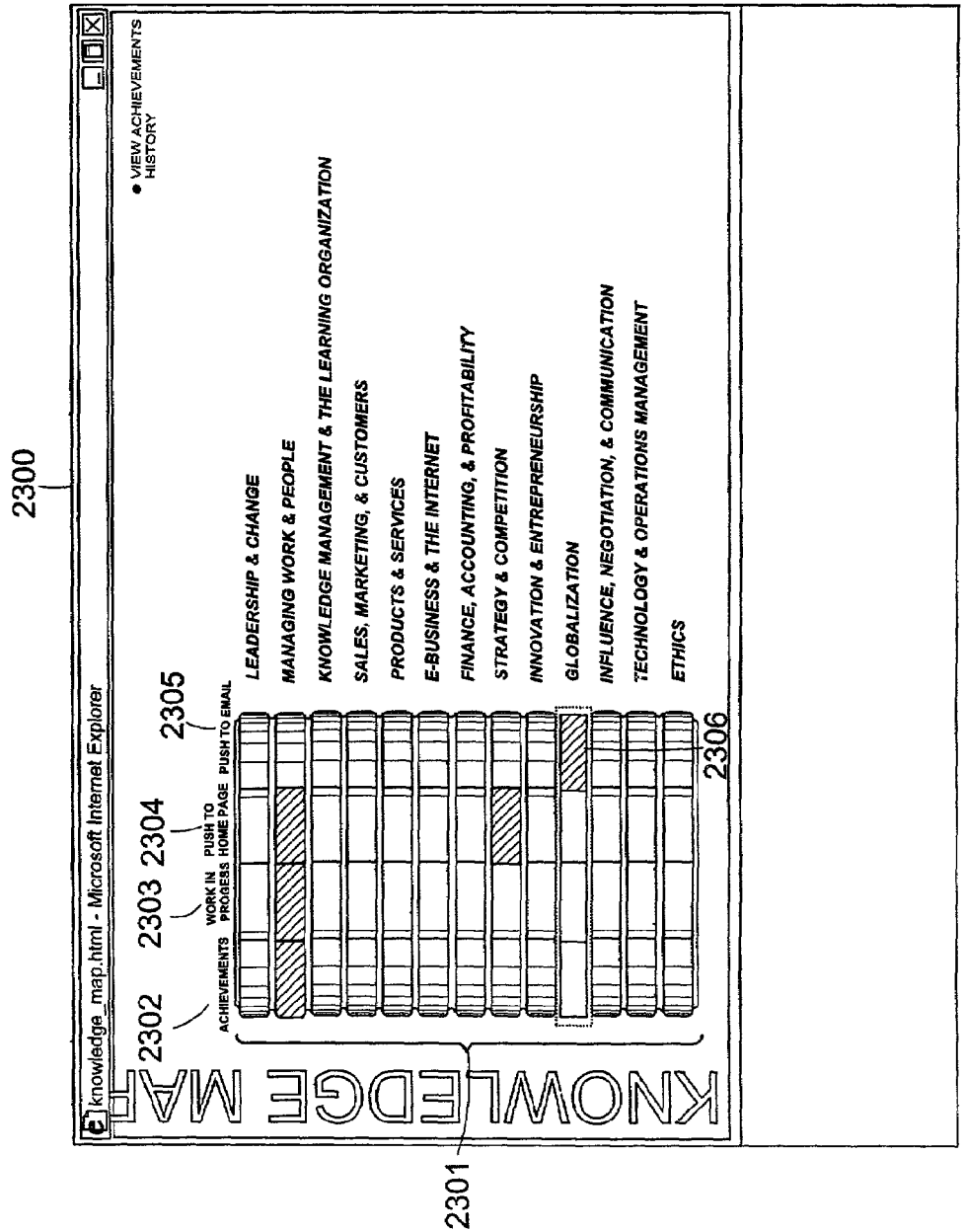
FIG. 23 is a screen shot of an interface by which the first user may access a knowledge map in accordance with the embodiment of FIG. 12.

FIG. 23 is a screen shot 2300 showing a detailed knowledge map 1303. Because Joseph will be dealing with many multinational issues, he decides to have the Online Manager keep him up to date on globalization issues. The knowledge map functions much like the Dewey decimal system of business knowledge, providing categories to capture the entire landscape of management content topics. The categories, shown at 2301 are top-level categories. Across the top of the knowledge map, Joseph can track areas where he has achievements at 2302 or work in progress at 2303. Joseph may also select areas where he would like category information pushed to his home page at 2304 or to his email at 2305. In addition, Joseph may simply use the knowledge map to browse content within specific content areas. Here, he clicks on the "Globalization: Push to Email" feature at 2306. Now, when new and interesting learning opportunities (such as articles or features) in the area of globalization are produced, Joseph will receive email.

Figure 24:
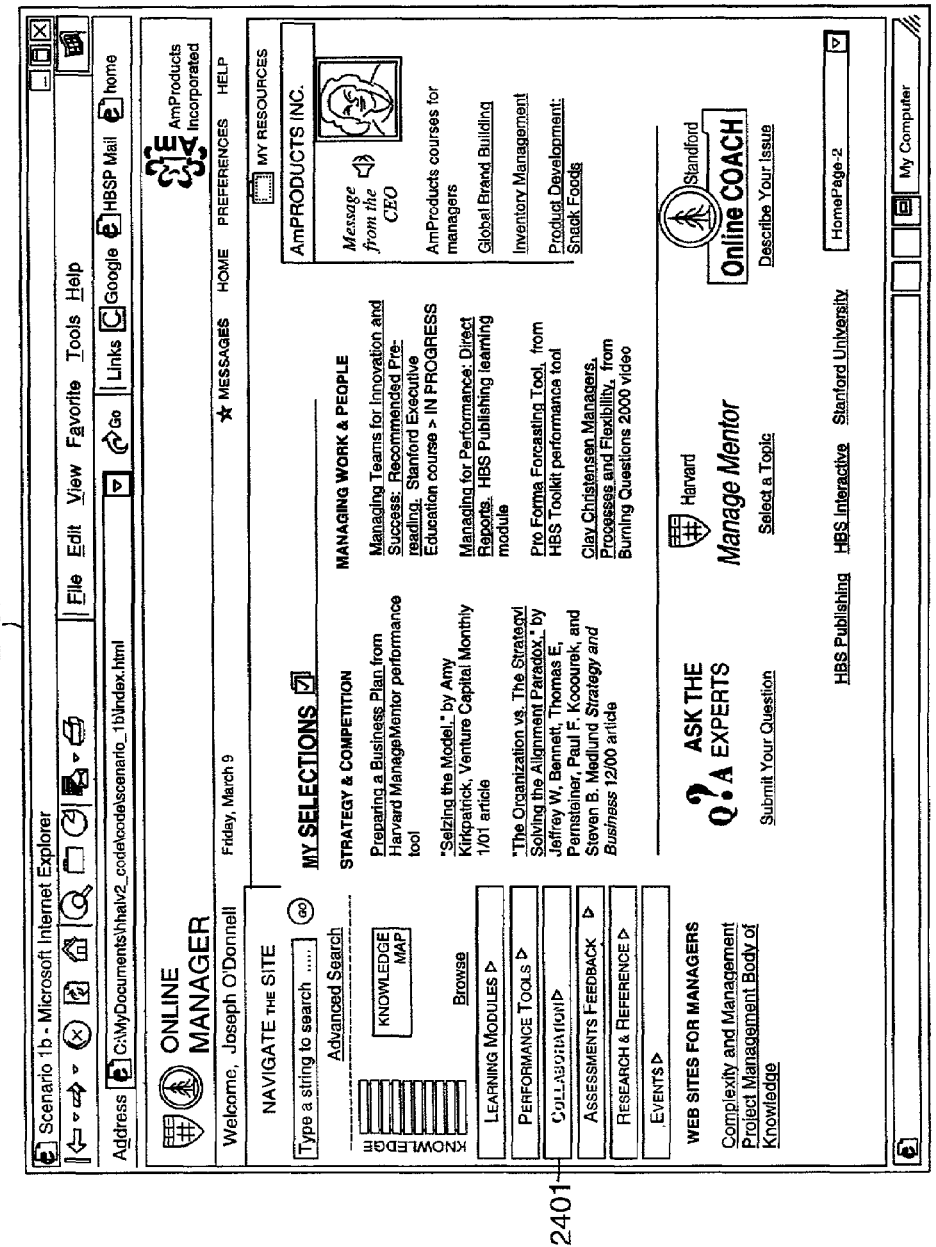
FIG. 24 shows the interface of FIG. 12 in which links to an online advisor are highlighted.

FIG. 24 is a screen shot 2400 showing how Joseph next goes to seek some guidance from an "Online Advisor", regarding a personnel decision. In this case, AmProducts provides mentors in each of the knowledge areas of Joseph's knowledge map. For other companies, the Online Manager website1306 may provide outside advisors with significant expertise. To reach the Online Advisor service, Joseph navigates through the "Collaborate" link 2401.

Figure 25:
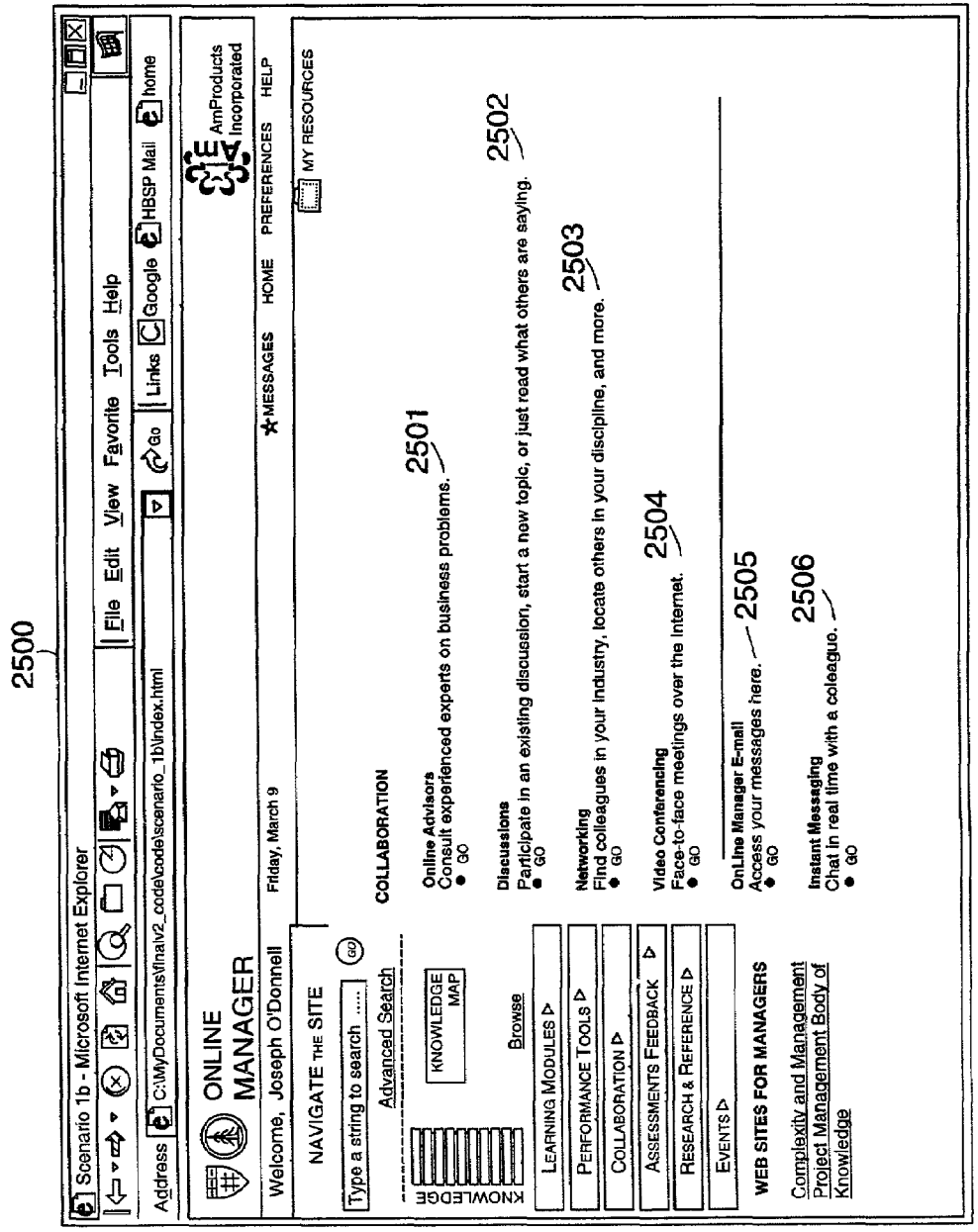
FIG. 25 is a screen shot of an interface by which the first user may select collaboration features in accordance with the embodiment of FIG. 24.

FIG. 25 is a screen shot 2500 showing that in addition to the Online Advisor shown generally at 2501, there are a number of collaboration features available through the Online Manager website. Threaded discussions on various topics may be accessed through link 2502; networking, the ability to find and share information with colleagues may be achieved through link 2503; video conferencing with others in your company or with partner companies may commence through link 2504; website-specific email may be accessed through link 2505, including a log of your website email communications; and instant messaging with remote colleagues may be achieved through link 2506.

Figure 26:
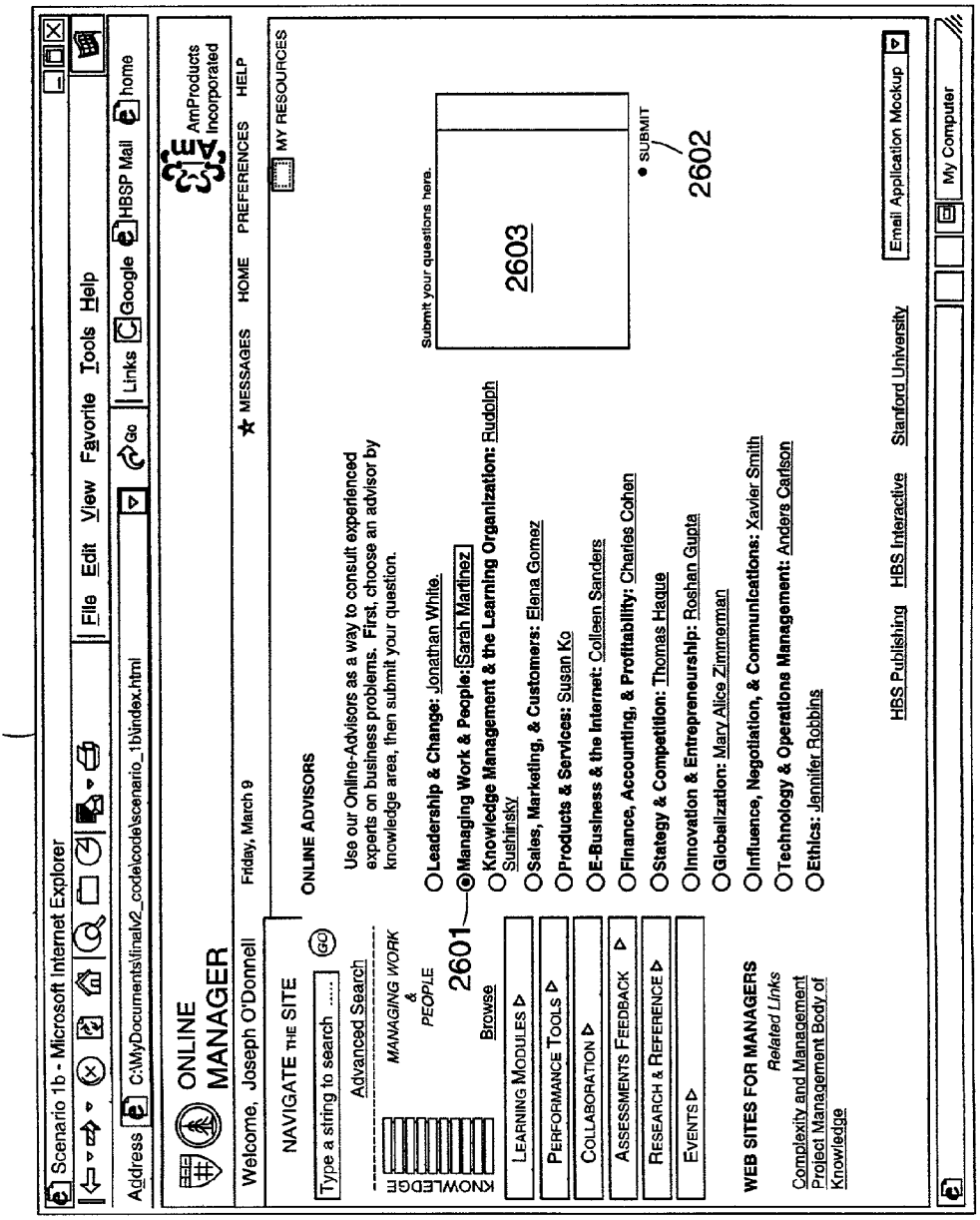
FIG. 26 is a screen shot of an interface by which the first user may select an advice subject in accordance with the embodiment of FIG. 24.

FIG. 26 is a screen shot 2600 showing that because his question to the mentor is related to personnel, Joseph chooses the "Managing Work & People" link at 2601. He submits a question to the mentor through field 2603 by clinking on "submit" at 2602 and logs off.

Figure 27:
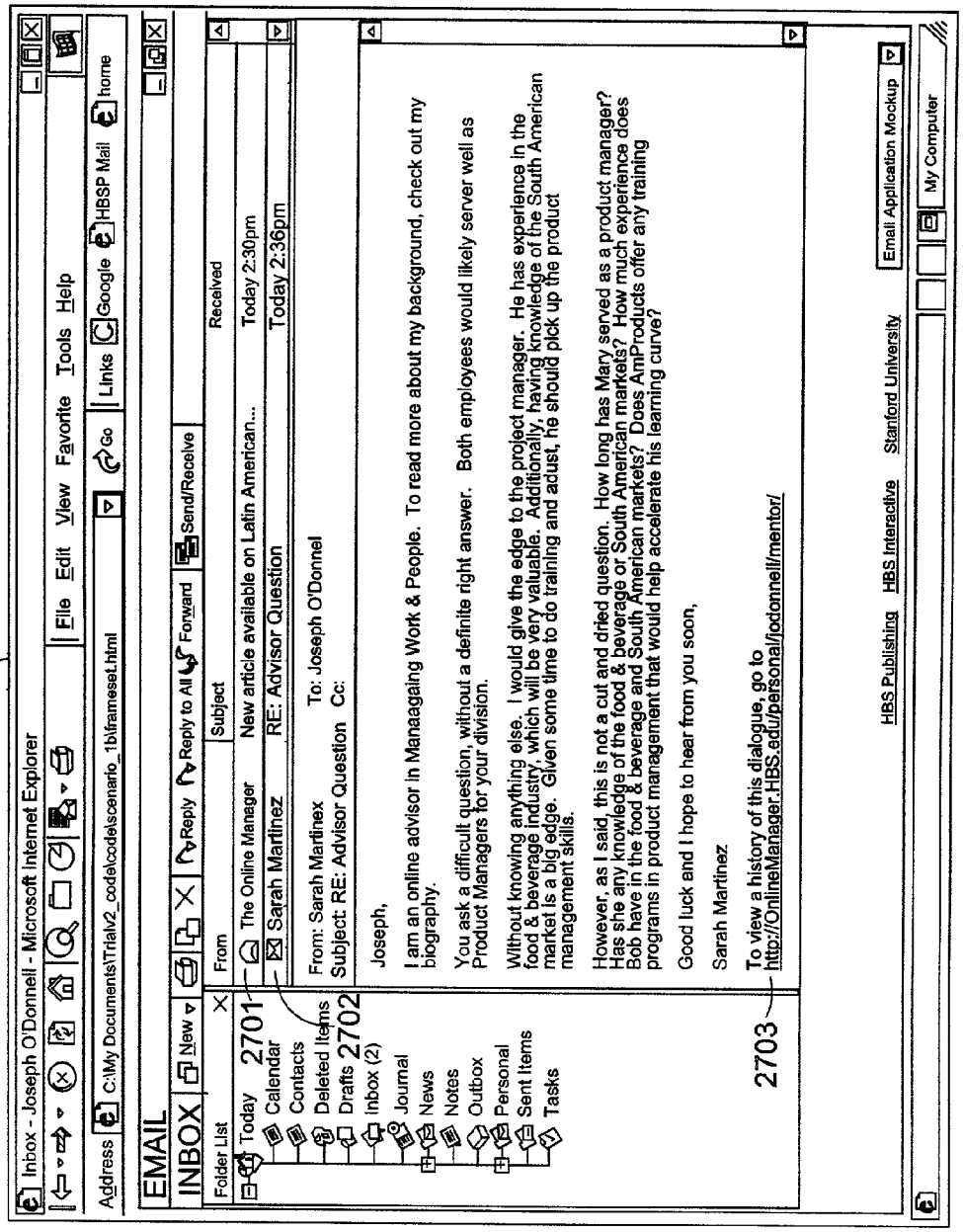
FIG. 27 is a screen shot of an interface by which the first user may access emails in accordance with the embodiment of FIG. 12.

FIG. 27 is a screen shot 2700 showing that Joseph has two emails waiting at his desk. The first email, shown at 2701, is from the Online Manager 1306 website. There is a new article about the Latin American beverage industry that relates to Joseph's work. The email contains a pointer to the article on the website. The second email, highlighted at 2702, is a reply from the mentor, Sara Martinez. Joseph reads her advice, and will later reply to further pursue the problem. At the bottom of an email is a link 2703 to view a history of their now-ongoing dialog, which is available on the Online Manager website.

Figure 28:
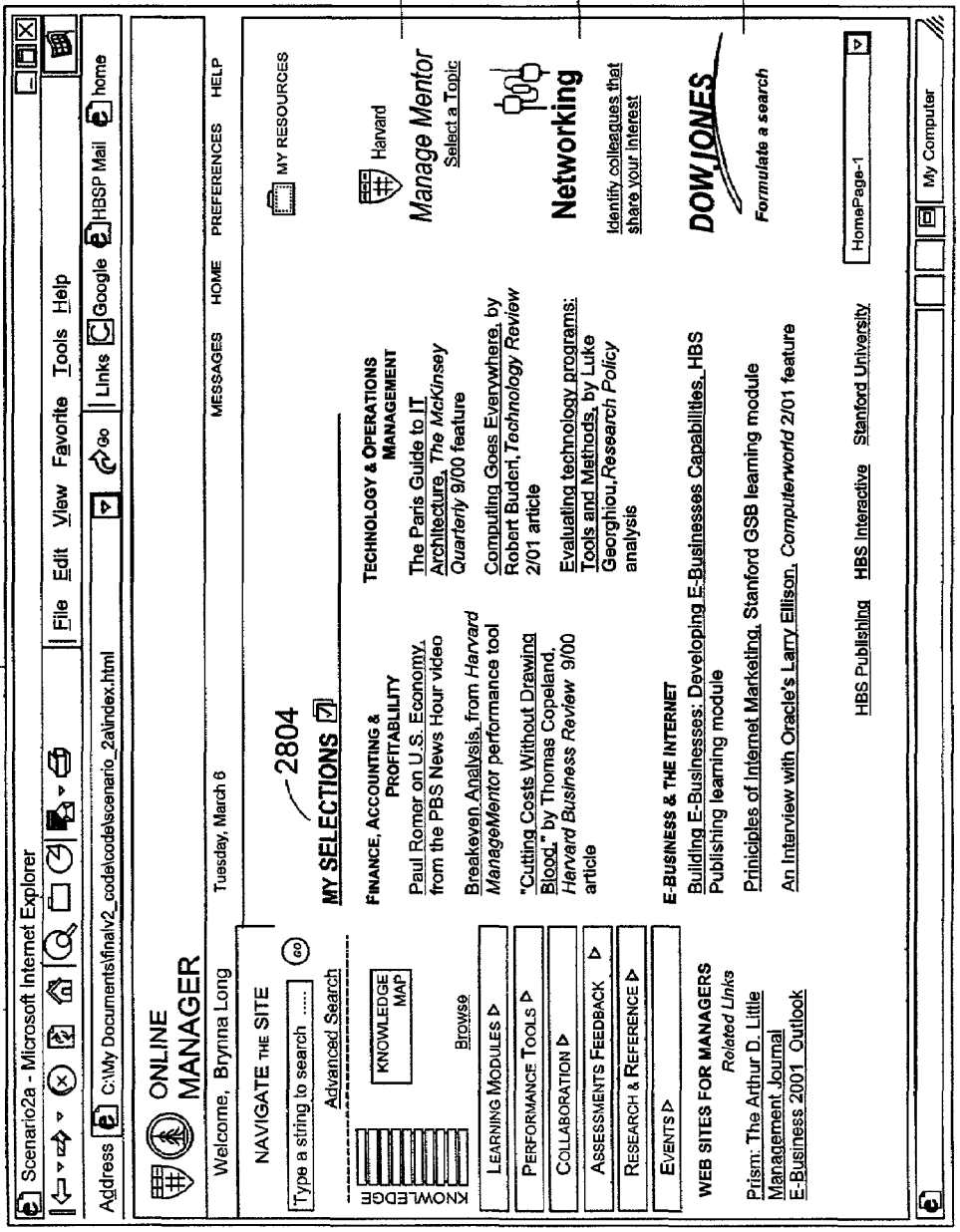
FIG. 28 is a screen shot of the interface of FIG. 12 configured for a second user.

FIG. 28 is an illustration of another graphical user interface provided in accordance with the embodiment of FIG. 12. In accordance with this second scenario, a second user Brynna Long, is the director of engineering at Interconnect, a small internet service provider. Brynna uses the Online Manager website frequently for performance support. She is about to enter negotiations with a new vendor for networking equipment, and is looking for some support on this challenge. The interface of FIG. 28 includes is a screen shot 2800 showing that Brynna uses the pages often, and has personalized both its content and its layout. Since Interconnect is not a very large company, it has not chosen to customize the page for its employees. This allows Brynna to place links to her most frequently accessed areas along the right side at 2801, 2802, and 2803 in what would otherwise be company real estate 1200. She uses the "Harvard ManageMentor" link 2801 for just-in-time performance support. She uses the "Networking" link 2802 to discuss problems with other engineering directors. The "Dow Jones" link 2803 is crucial to monitoring developments at competitor and vendor companies. She also has three My Selections 2103 categories instead of the shown with respect to Joseph.

Figure 29:
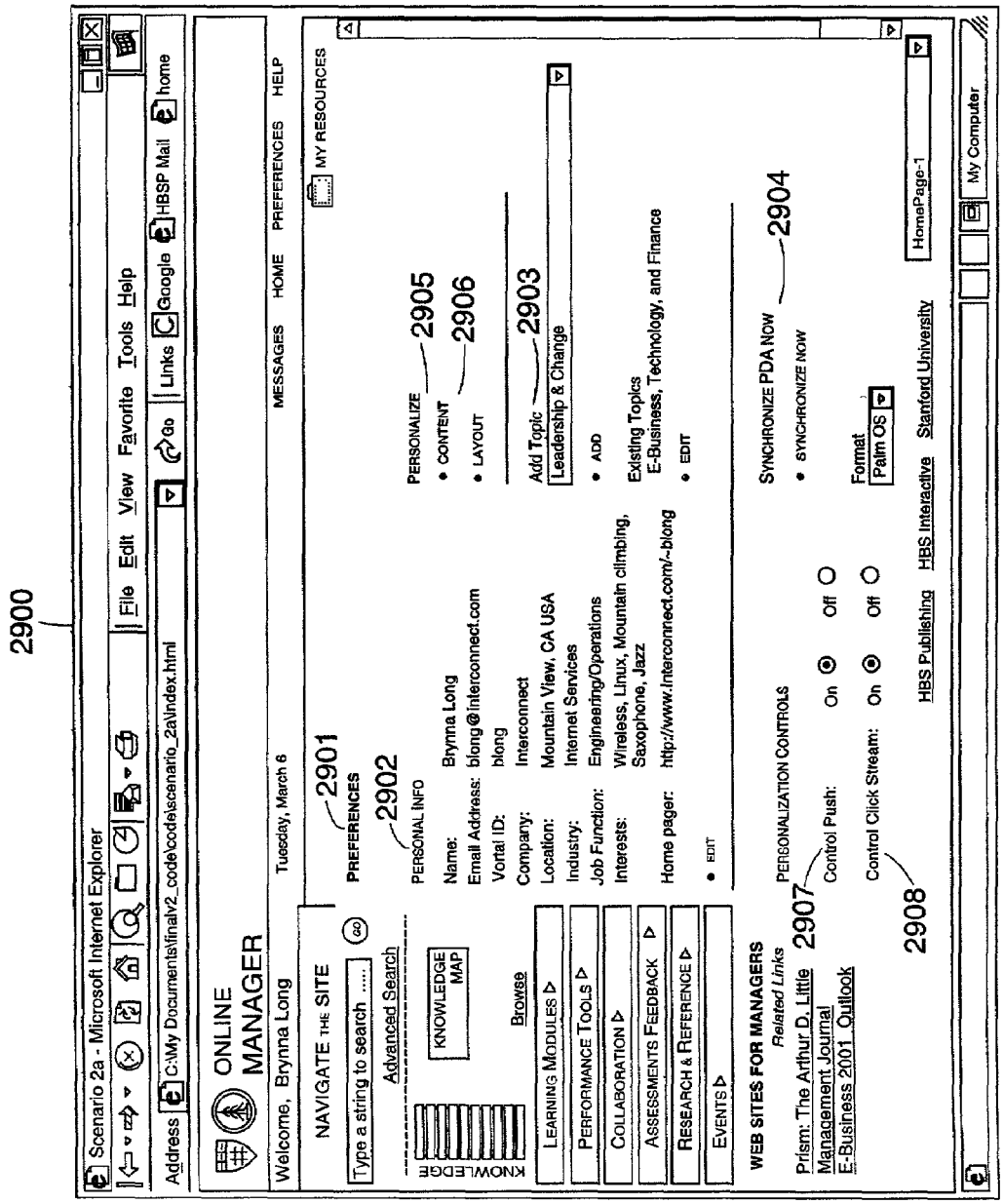
FIG. 29 is a screen shot of a preferences interface whereby the second user may manage all aspects his or her on-line experience.

FIG. 29 is a screen shot 2900 of the preferences page 2901, showing how Brynna can manage all aspects of her Online Manager website experience. Her personal information, shown at 2902 is stored. She can choose what new articles she'd like add to her personalized website experience through field 2903. She can also set preferences in regard to synchronizing content with other devices through link 2904. Brynna has a Palm V, and often uploads articles and performance support modules to it. Brynna has already used the personalized content link 2905 and layout features link 2906. These allow her to choose the interface and material that best suits her usage habits. Brynna can also control the level of push to her desktop with the "Control Push" link 2907 of the Personalized controls. This area also allows her to turn website data collection or "click stream" data off if she prefers through link 2908.

Figure 30:
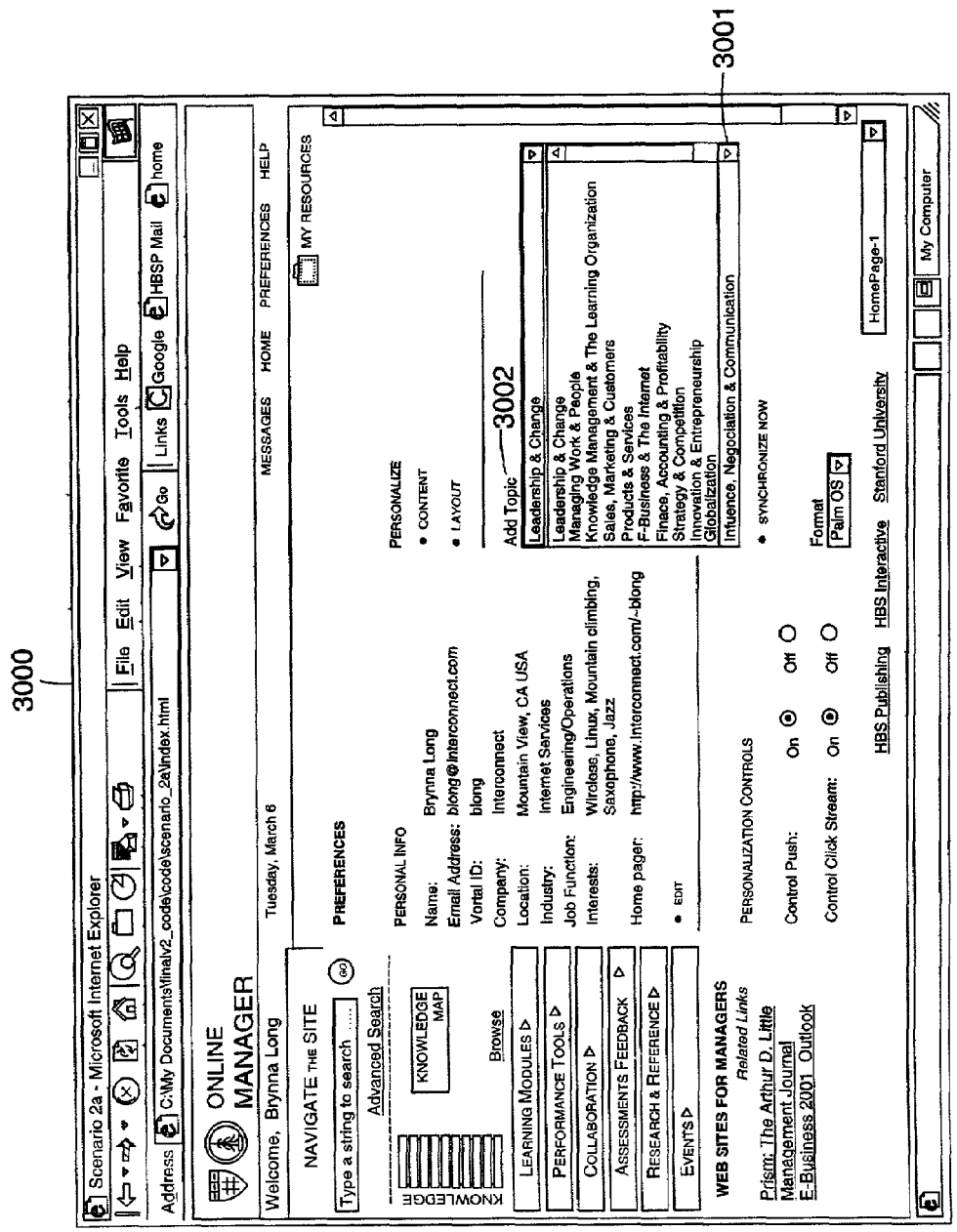
FIG. 30 shows the interface of FIG. 29 wherein topics for exploration by the second user are highlighted.

FIG. 30 is a screen shot 3000 showing how Brynna begins to look for support on her negotiation by adding a negotiation section to her home page via field 3001. In the "add topic" area 3002, she types what she is looking for and updates her home page. This is accomplished by choosing "Influence, Negotiation & Communication" in the "add topic" area 3002.

Figure 31:
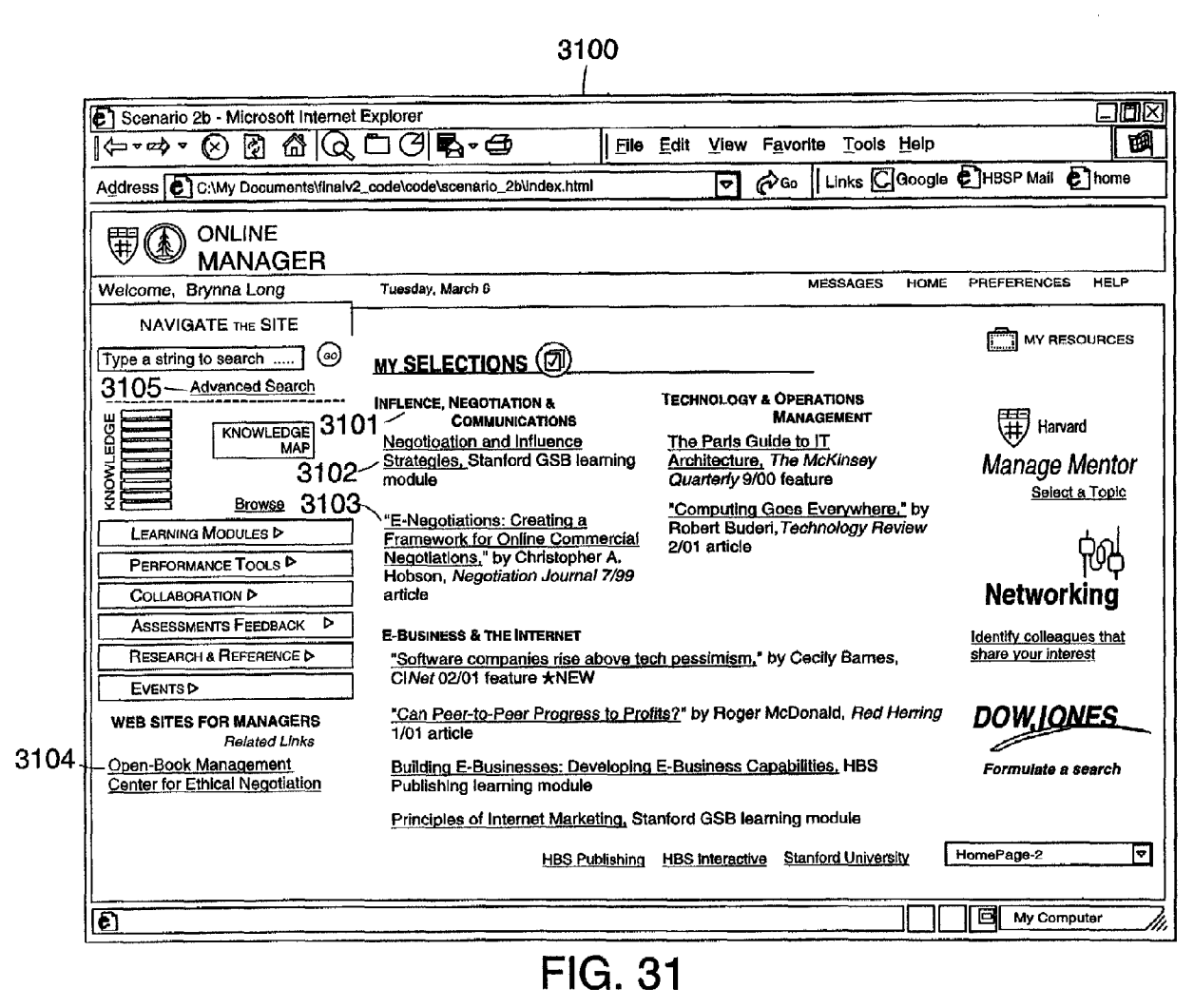

FIG. 31 is a screen shot 3100 showing that Brynna's home page has been updated to reflect her preferences. "Influence, Negotiation and Communications" is now displayed at 3101 as one of her Selections, with content relevant to negotiation accessed through links 3102, 3103 and 3104. Brynna decides to navigate by search and clicks via the "Advanced Search" link 3105.

Figure 32:
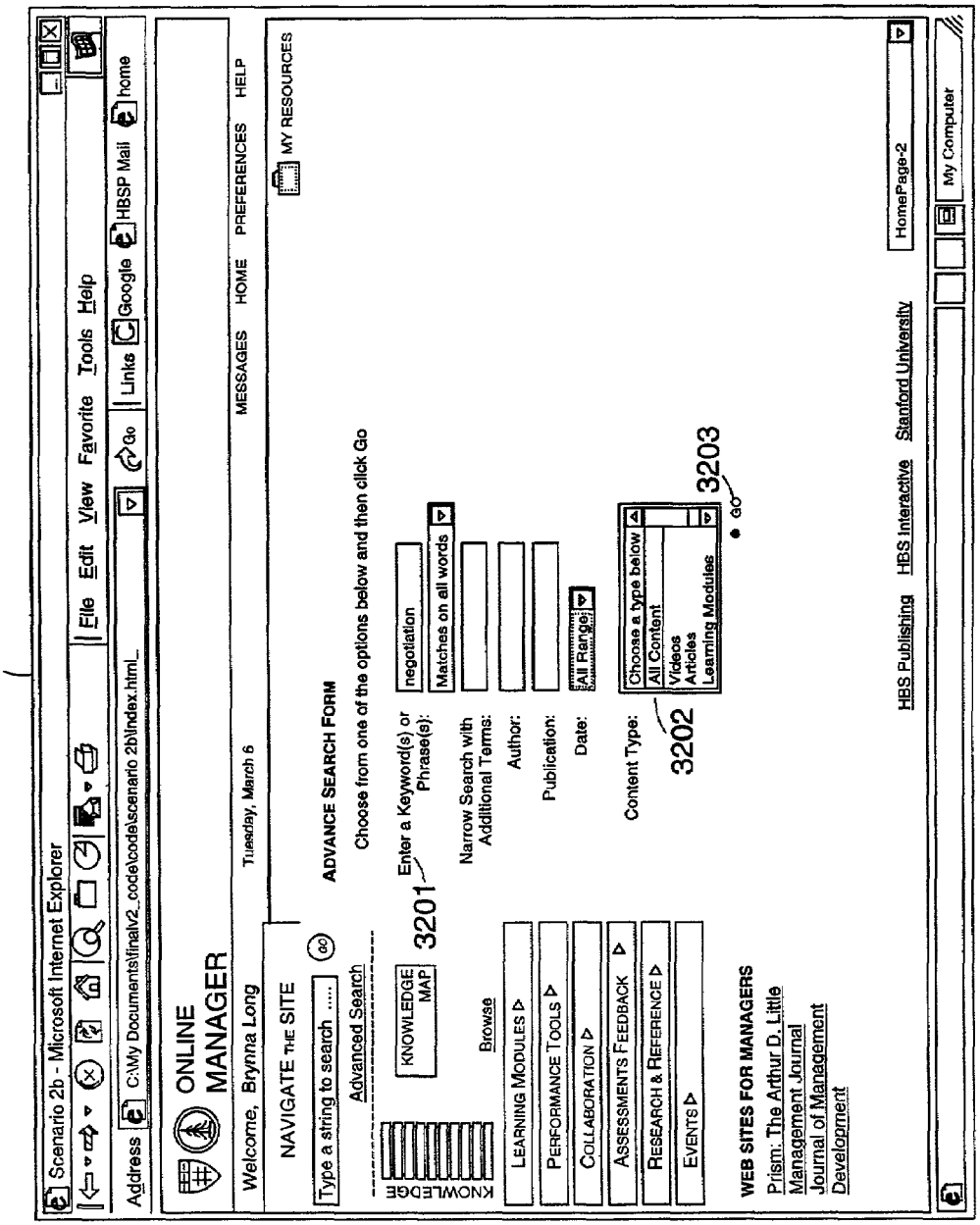
FIG. 32 is a screen shot of an interface by which the second user may conduct an advanced search in accordance with the embodiment of FIG. 28.
Figure 33:
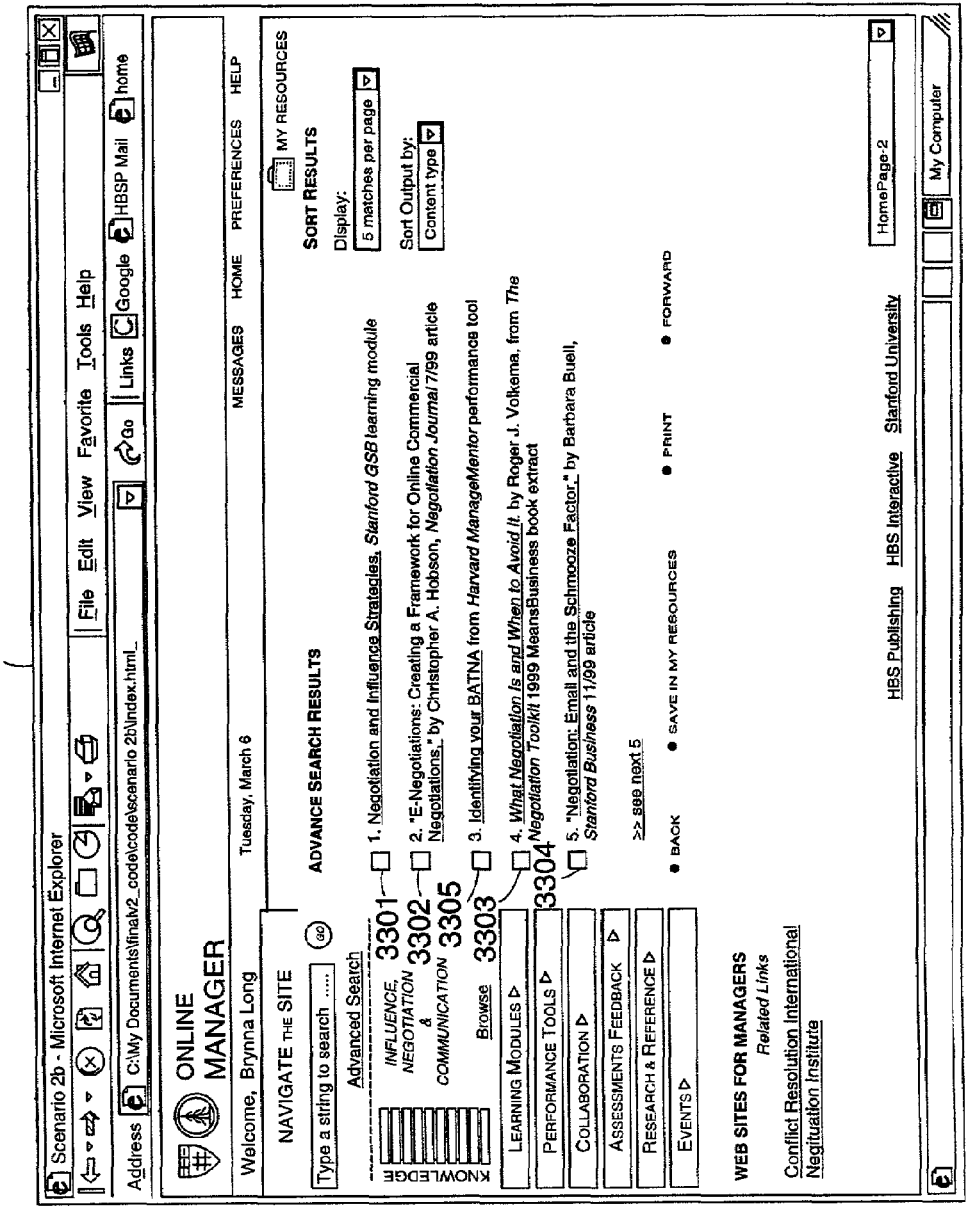
FIG. 33 is a screen shot of an interface by which the second user may view the results of a search in accordance with the embodiment of FIG. 32.
Figure 34:
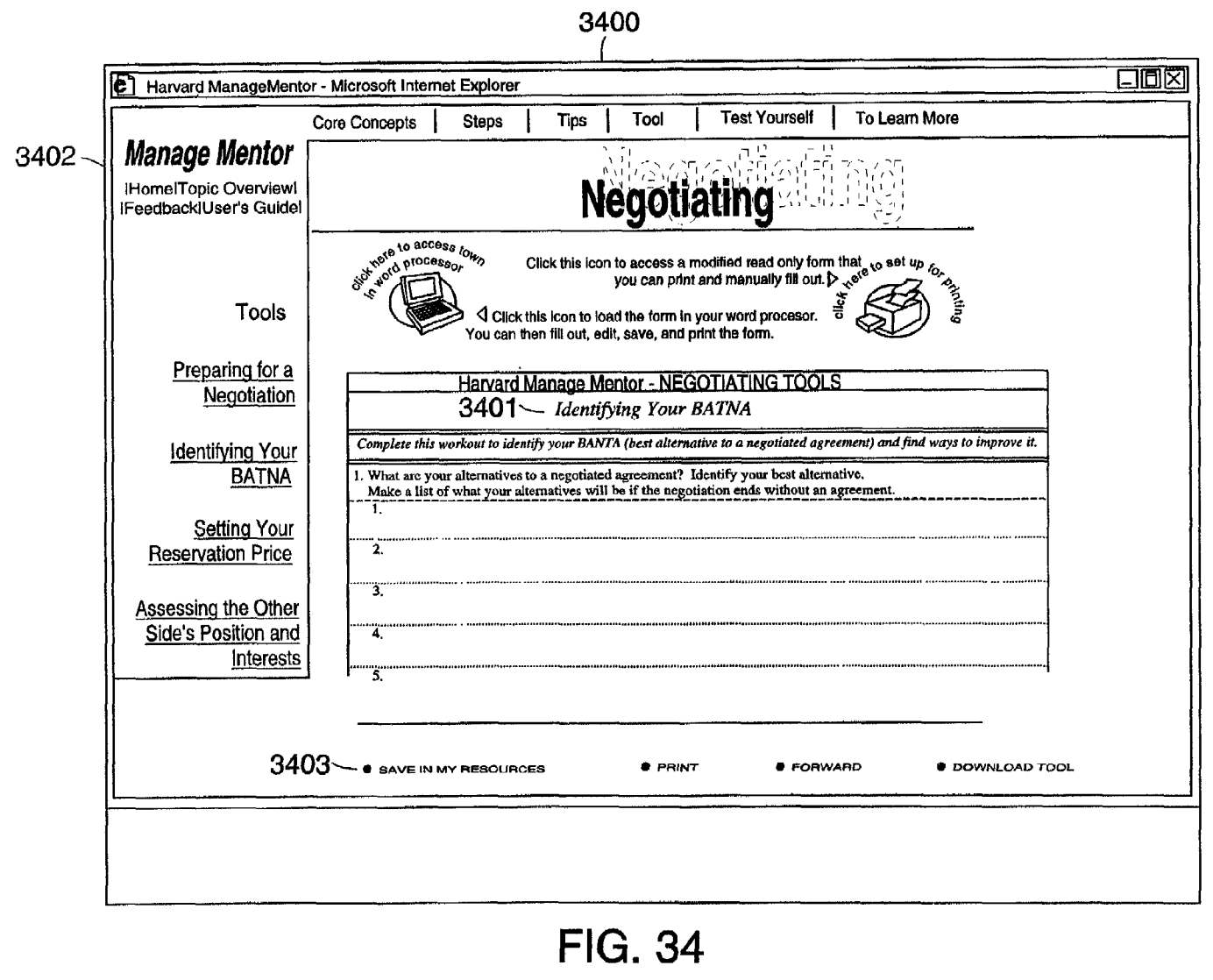

FIG. 32 is a screen shot 3200 showing how Brynna, looking for information on negotiation, does an advanced search. She enters "negotiation" as a keyword in field 3201 and chooses to search all content by highlighting "All Content" at 3202 and clicks "Go" at 3203. Screen shot 3300 in FIG. 33 shows that, as a result of Brynna's search, she is offered a number of different options to pursue, including learning modules 3301, articles 3302, 3303 and 3304 and performance support 3305.Brynna can view the "Identifying Your BATNA" tool shown at 3401 in screen shot 3400 of FIG. 34 from Harvard Business School Publishing's Harvard ManageMentor 3402. Finding it helpful, she saves it to her My Resources 3403 area for later use.

Figure 35:
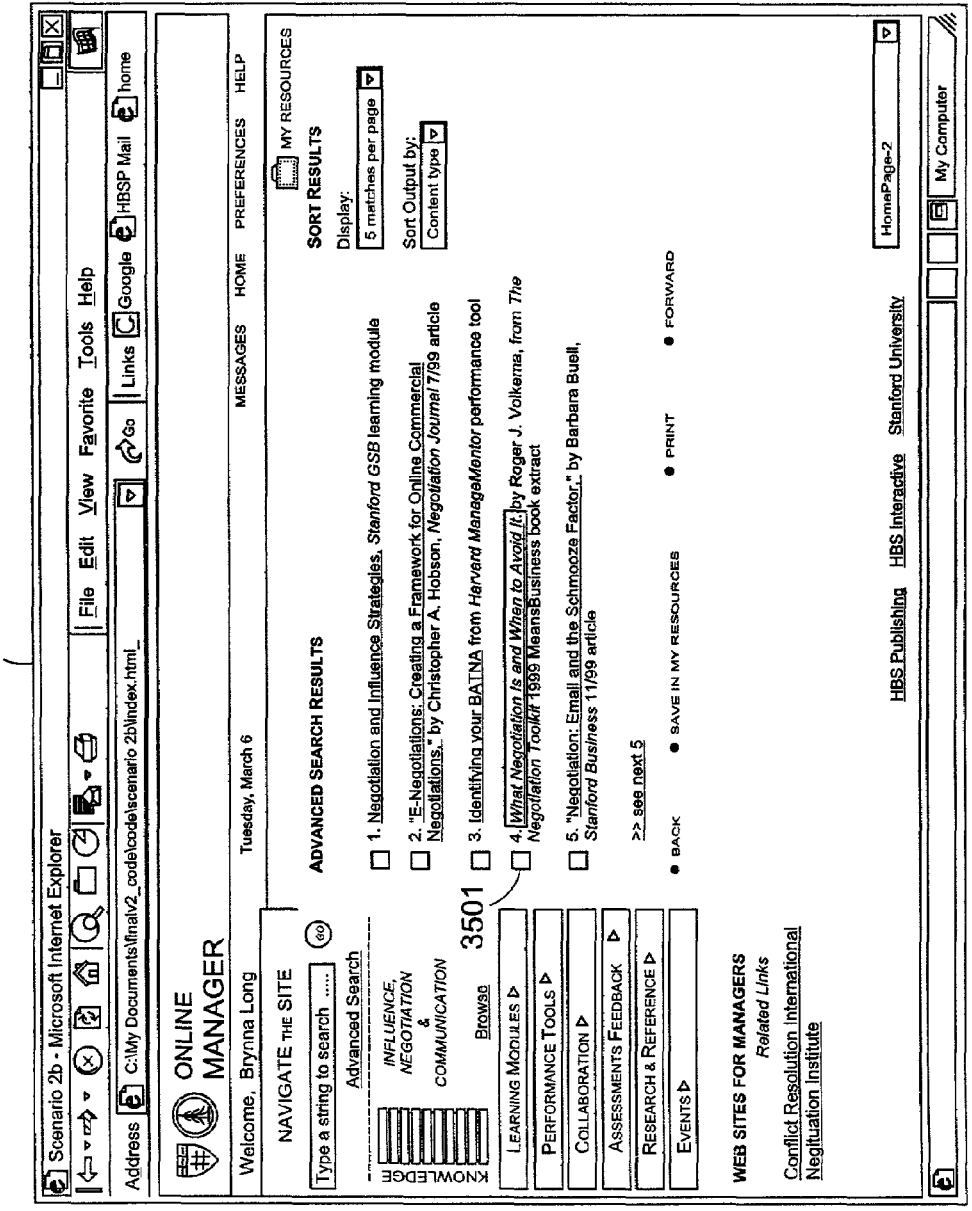
FIG. 35 is a screen shot of the interface of FIG. 33 updated in accordance with the second user's previous activity.
Figure 36:
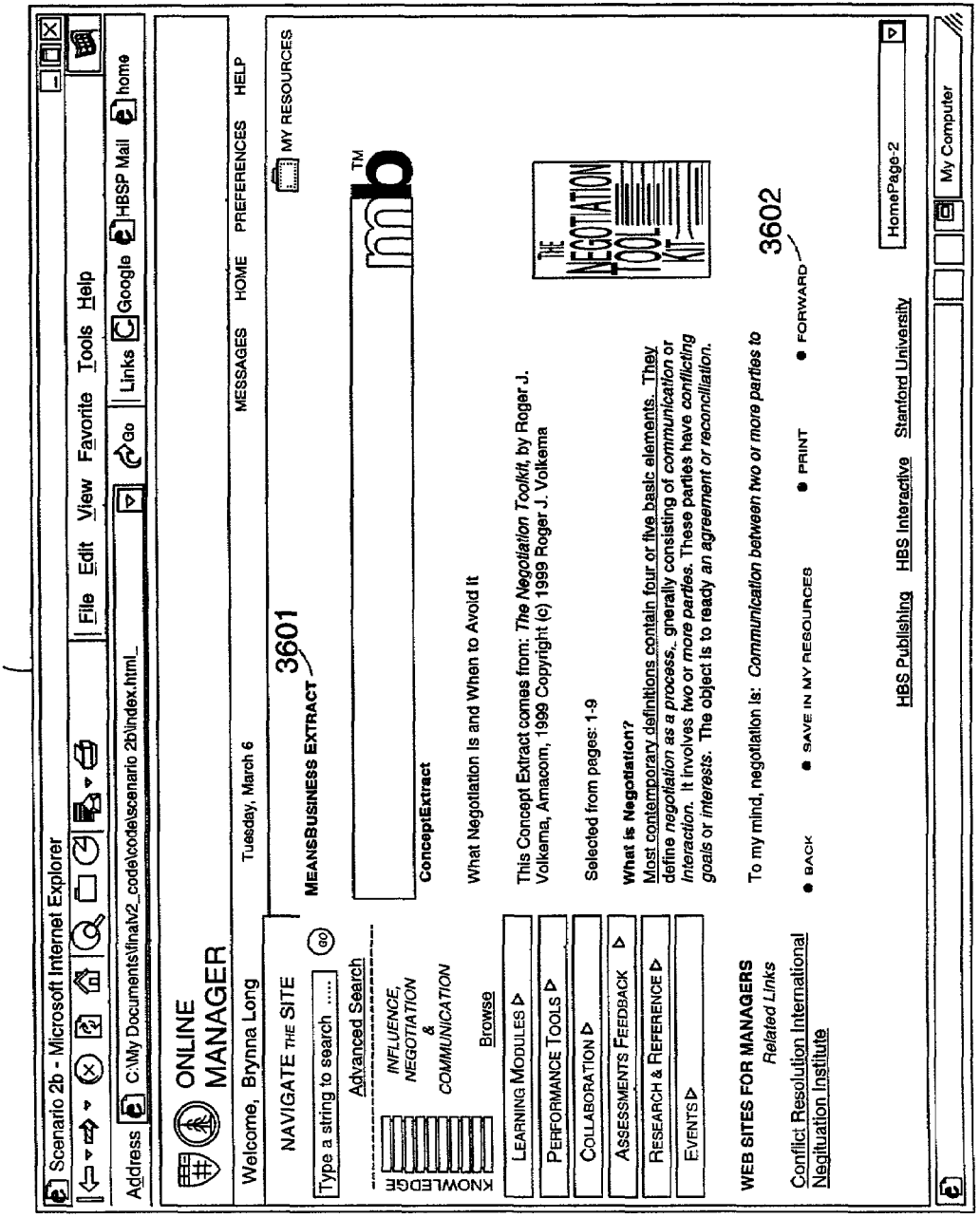
FIG. 36 is a screen shot of an interface by which the second user may access products from different providers in accordance with the embodiment of FIG. 28.

FIG. 35 is a screen shot 3500 showing Brynna's search results. She chooses to take a look at a book extract from MeansBusiness via link 3501. Screen shot 3600 of FIG. 36 shows how the Online Manager website will bring in products from many different providers of high quality business content. Brynna finds the article from MeansBusiness shown at 3601 helpful, and uses the Online Manager website's forwarding feature at 3602 to share it with Interconnect's CFO, who will be joining her in the vendor discussions. She has spent all the time she can spare for now, and logs off.

Figure 37:
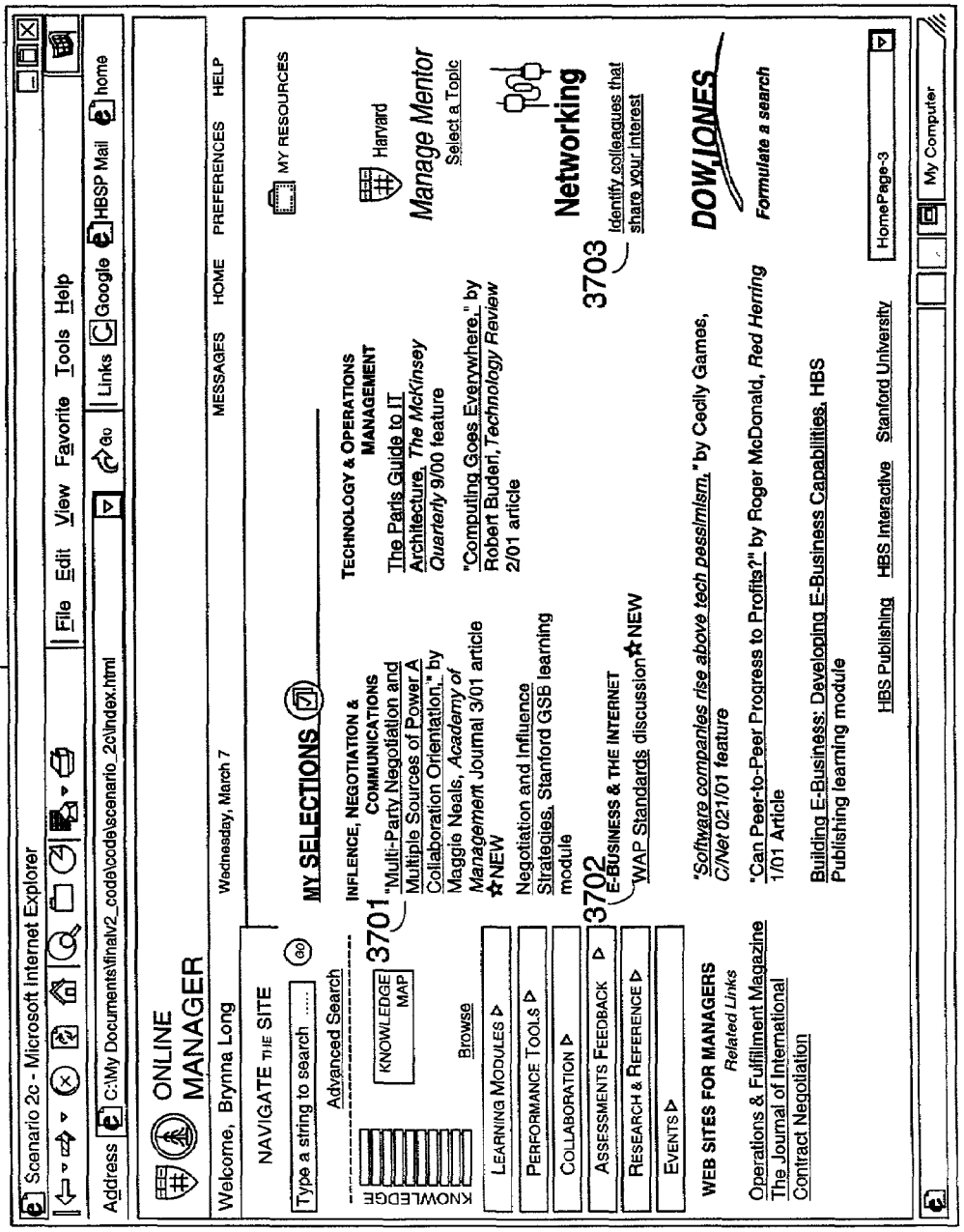
FIG. 37 shows the interface of FIG. 28 updated in accordance with the second user's activities of the previous day.

FIG. 37 is a screen shot 3700 showing that it is the next day for Brynna. Several new items, including those shown at 3701 at 3702 have appeared under My Selections since Brynna last visited. With the negotiations a day closer, she decides to look for colleagues with experience with the vendor. She clicks on the "Networking" link 3703

Figure 38:
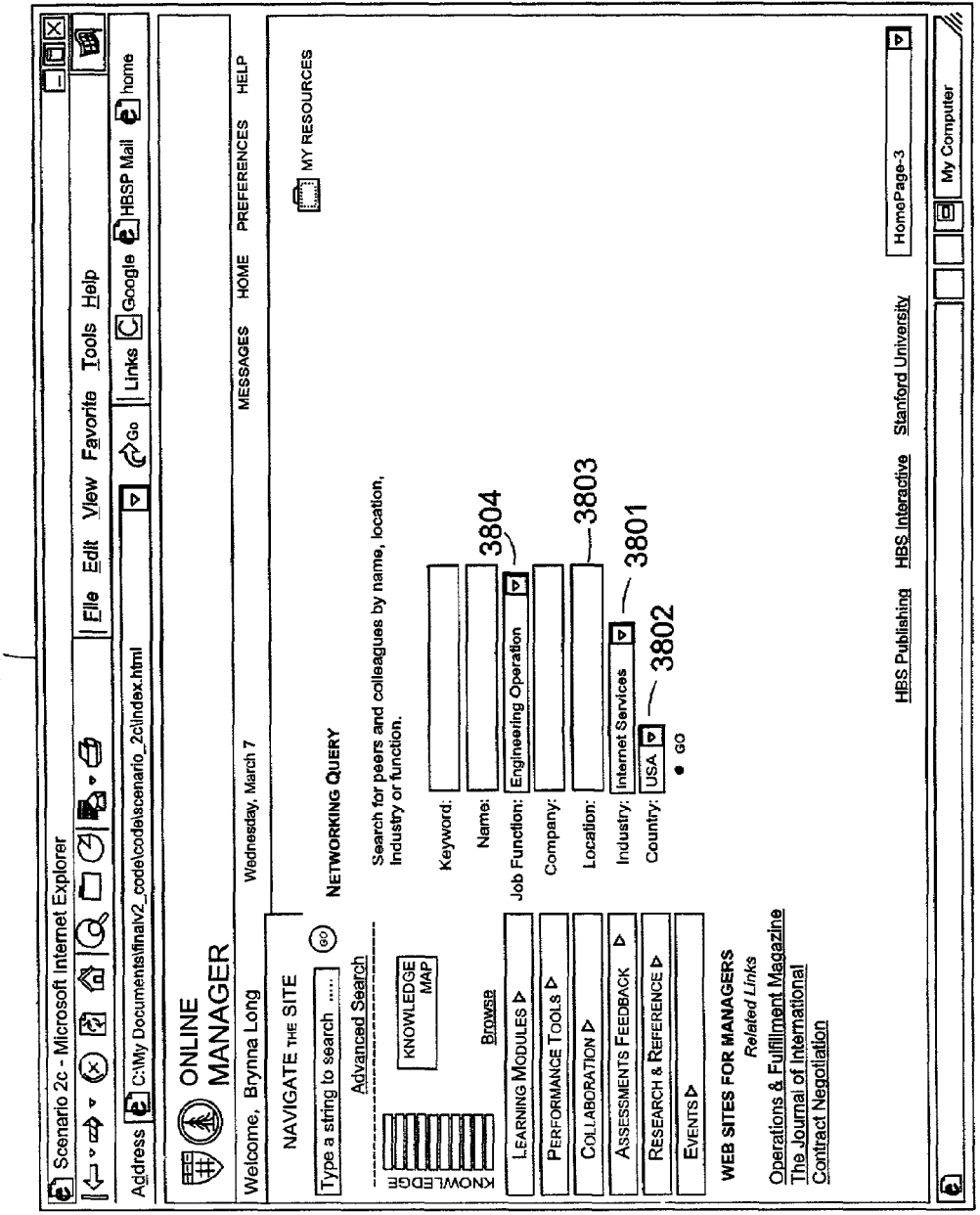
FIG. 38 is a screen shot of an interface by which the second user may access business and learning contacts in a network in accordance with the embodiment of FIG. 28.

FIG. 38 is a screen shot 3800 showing how Brynna can search for contacts by industry through field 3801, geography through fields 3802 and 3803, and job function through field 3804. She may receive a list of names, and send an email to each of them if she so chooses.

Figure 39:
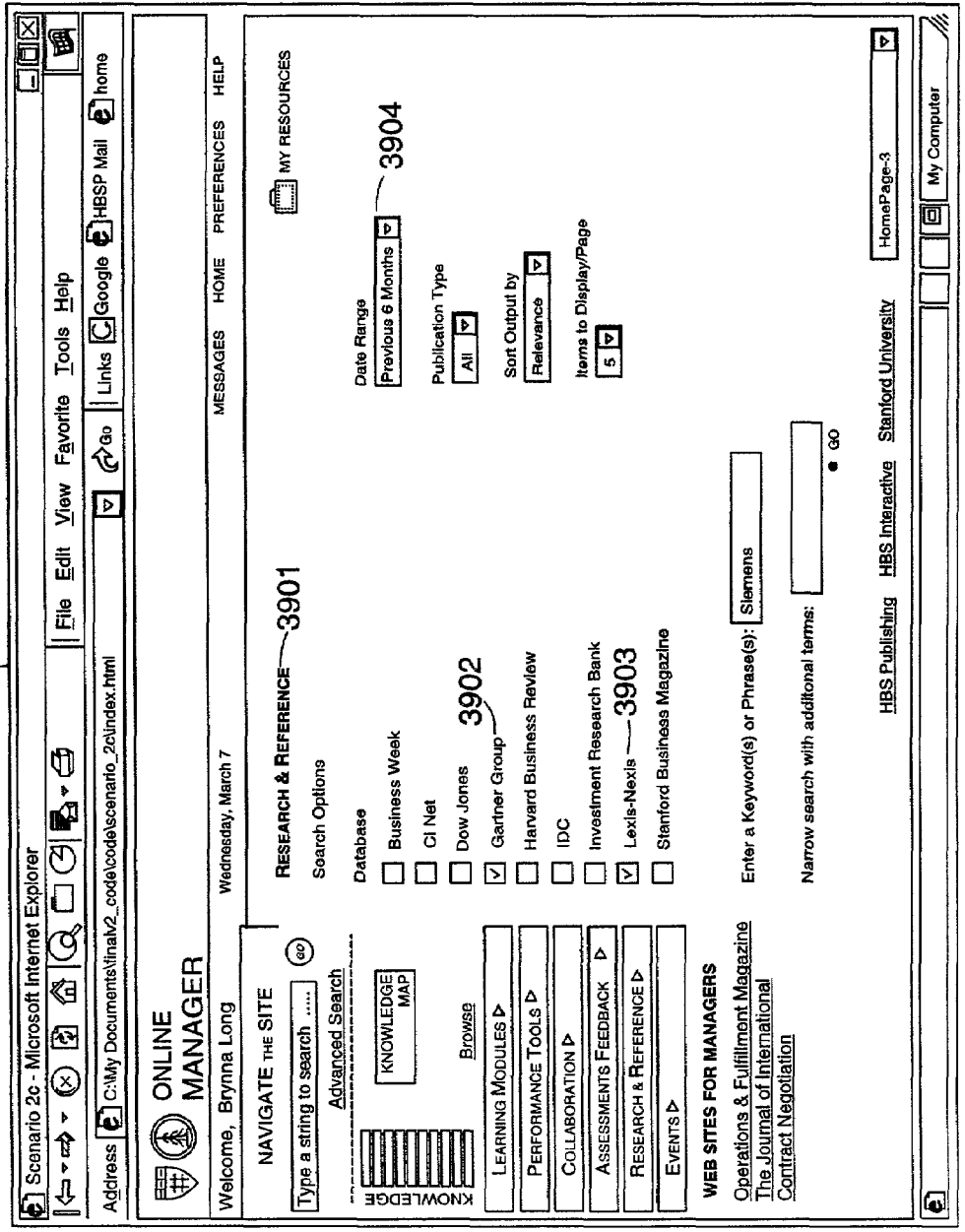
FIG. 39 is a screen shot of an interface by which the second user may access a research and reference area in accordance with the embodiment of FIG. 28.

FIG. 39 is a screen shot 3900 showing how Brynna, interested in knowing more about the vendor, enters the research and reference area, shown generally at 3901 of the website. The Online Manager website has access to many of the top business information sources available. Brynna decides to search for the vendor in two specific databases by checking 3902 and 3903, and indicates that she wants to view recent articles only by checking 3904.

Figure 40:
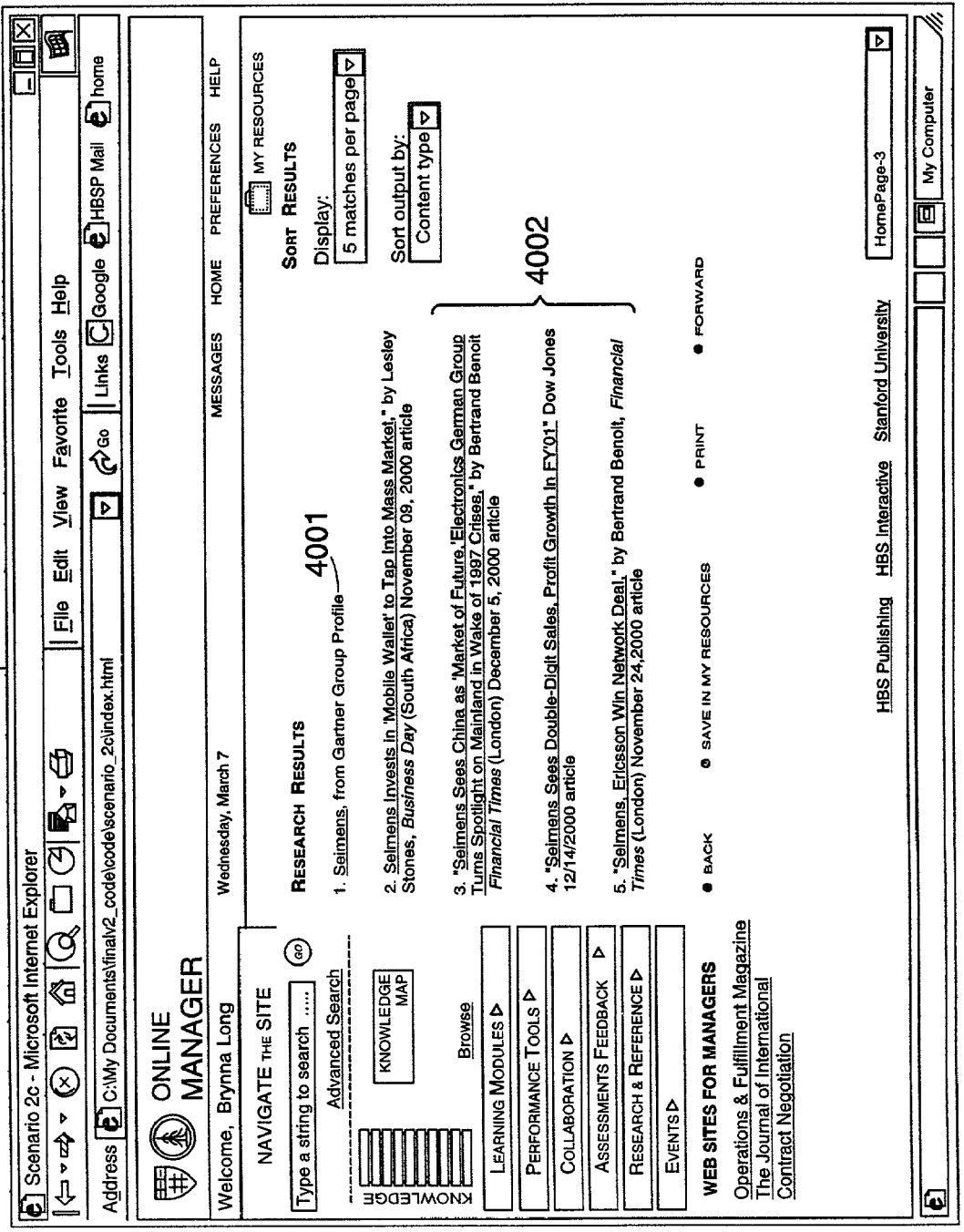
FIG. 40 is a screen shot of an interface by which the second user may access research results in accordance with the embodiment of FIG. 39.

FIG. 40 is a screen shot 4000 showing how Brynna receives a Gartner Group profile, accesed through link 4001 as well as a number of articles, shown generally at 4002, from the Lexis-Nexis database. She may choose to print several of the articles for later reading.

Figure 41:
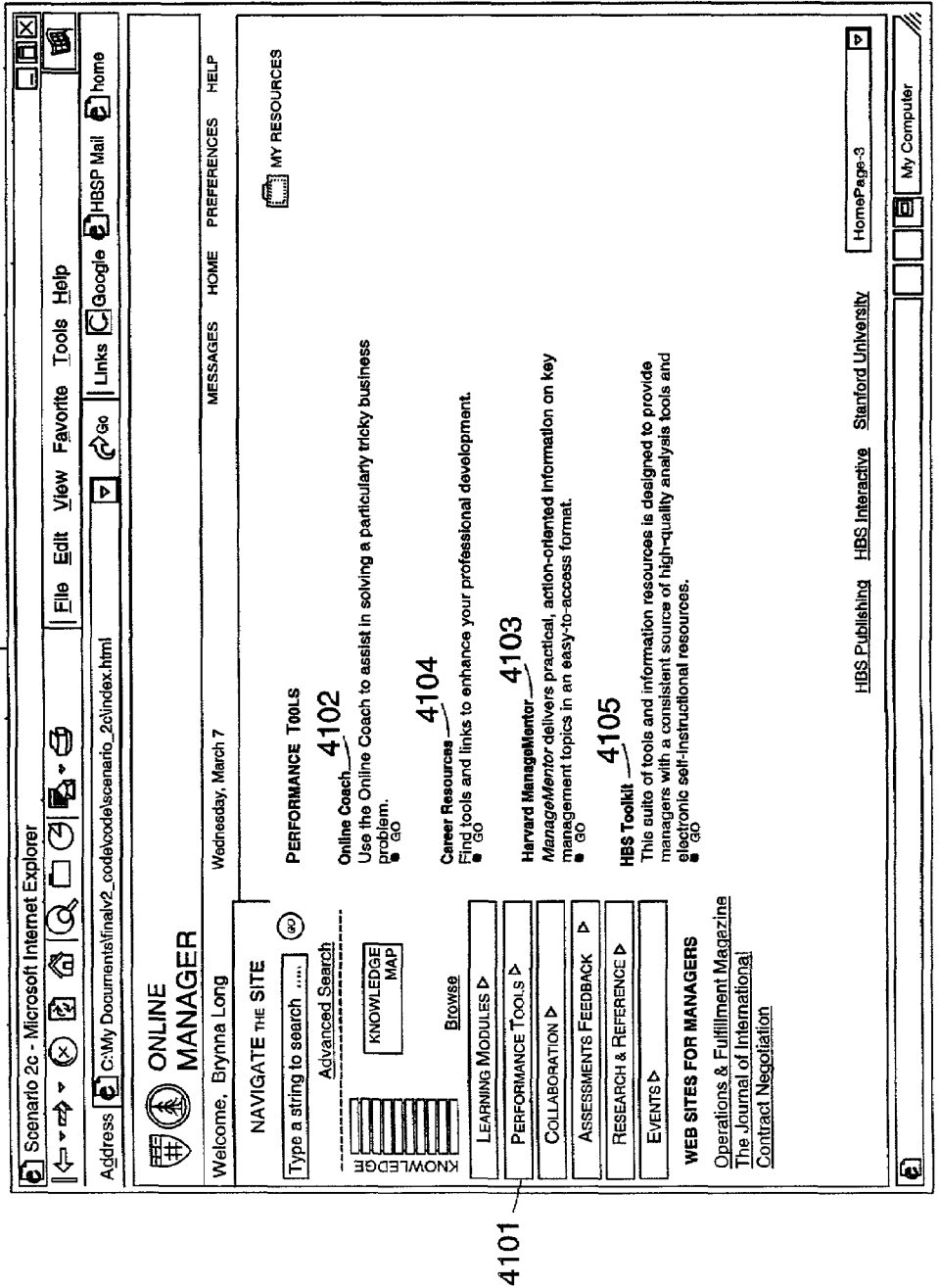
FIG. 41 is a screen shot of an interface by which the second user may access performance tools in accordance with the embodiment of FIG. 28.

FIG. 41 is a screen shot 4100 demonstrating how Brynna may access certain "Perfomance Tools" by clicking on a Performance Tools link at 4101. In this screen shot, Brynna has entered Performance Tools to consult the Online Coach by clicking "go" at 4102. The Online Coach is a computer-based coaching tool that uses artificial intelligence (AI) to provide guidance on frequently encountered challenges. The Performance Tools area includes several other options, including Harvard ManageMentor 4103, career resources 4104, and the Harvard Business School (HBS) Toolkit 4105.

Figure 42:
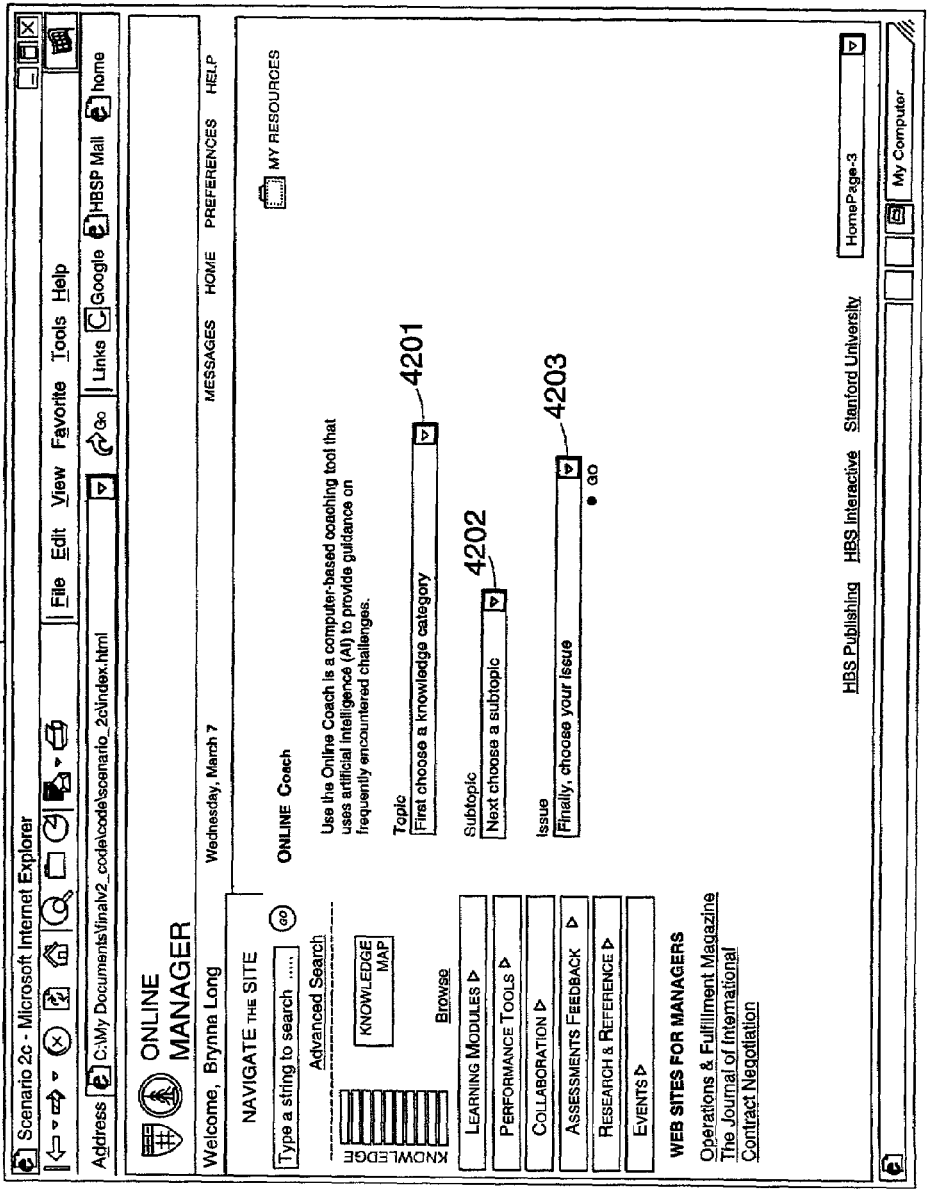
FIG. 42 is a screen shot of an interface by which the second user may access an online coach in accordance with the embodiment of FIG. 28.
Figure 43:
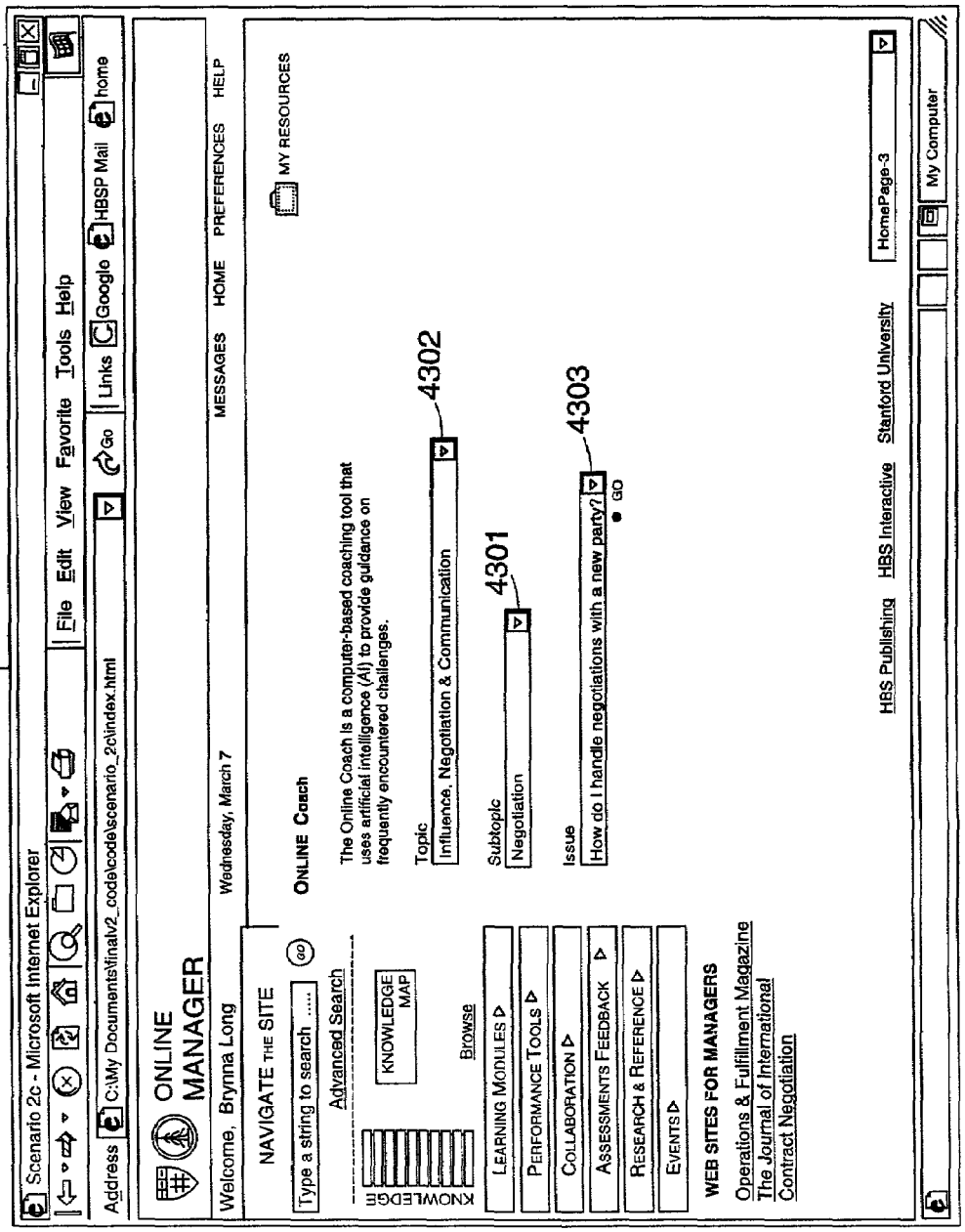
FIG. 43 shows the interface of FIG. 42 in which options associated with the online coach are highlighted.

FIG. 42 is a screen shot 4200 showing how Brynna may now choose the specific area with respect to which she wants assistance. First, she has to choose a knowledge category under the topic area via field 4201. She may also choose a subtopic area via field 4202. And, finally, she may choose an issue via field 4203.Screen shot 4300 of FIG. 43 shows that Brynna picks "Negotiation" in field 4301 as her subtopic field under the topic of "Influence, Negotiation and Communication" in field 4302. Finally, she chooses her issue which is, "How do I handle negotiations with an unknown party?" in field 4303 The Online Coach will present her with a series of diagnostic questions, involving Interconnect's needs, the viability of other alternatives, and so on. After she completes the diagnostic, the Online Coach will present her with several possible strategies to think about, and she can save the two she finds most promising to My Resources.

Figure 44:
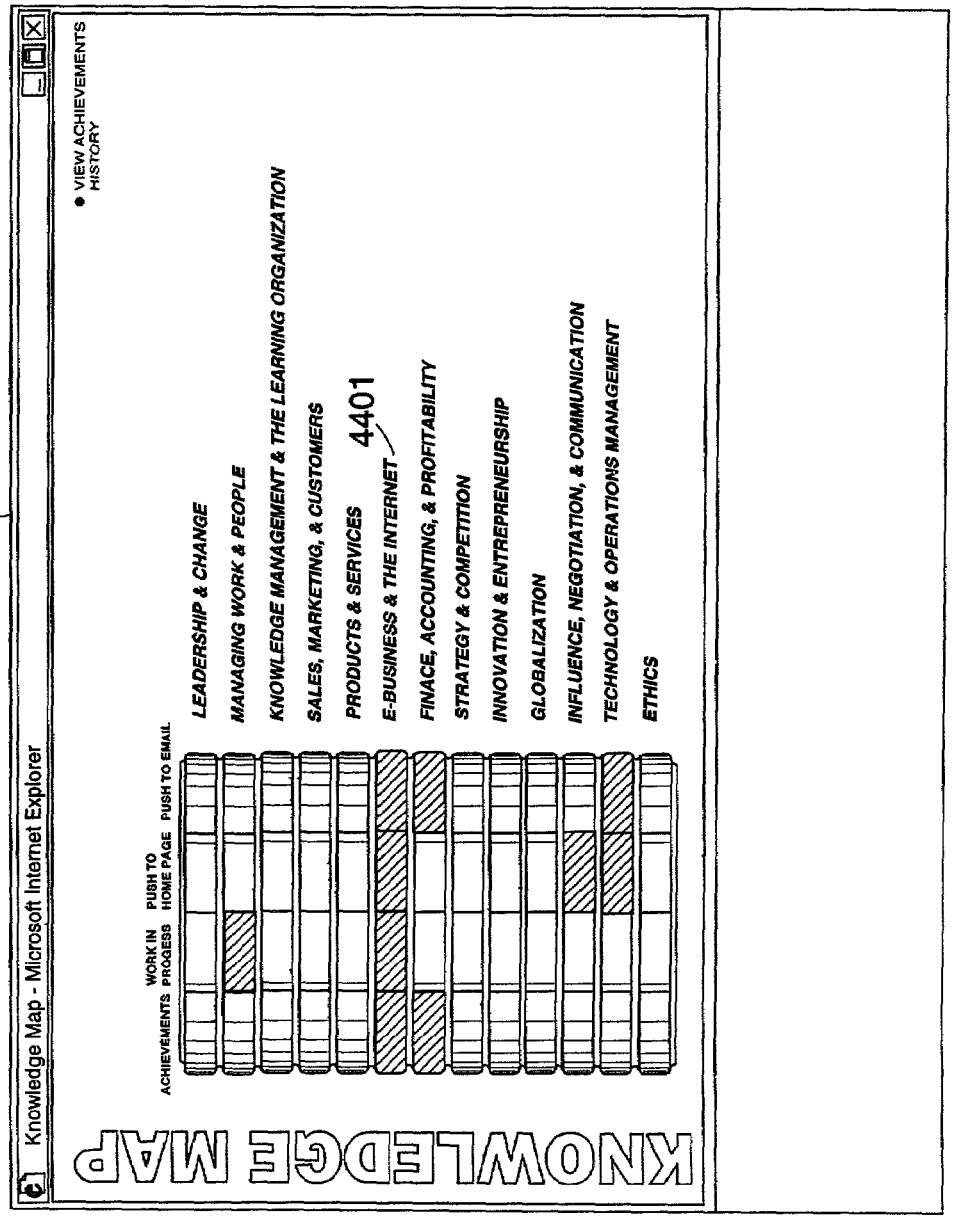
FIG. 44 is a screen shot of an interface by which the second user may access a knowledge map in accordance with the embodiment of FIG. 28.
Figure 45:
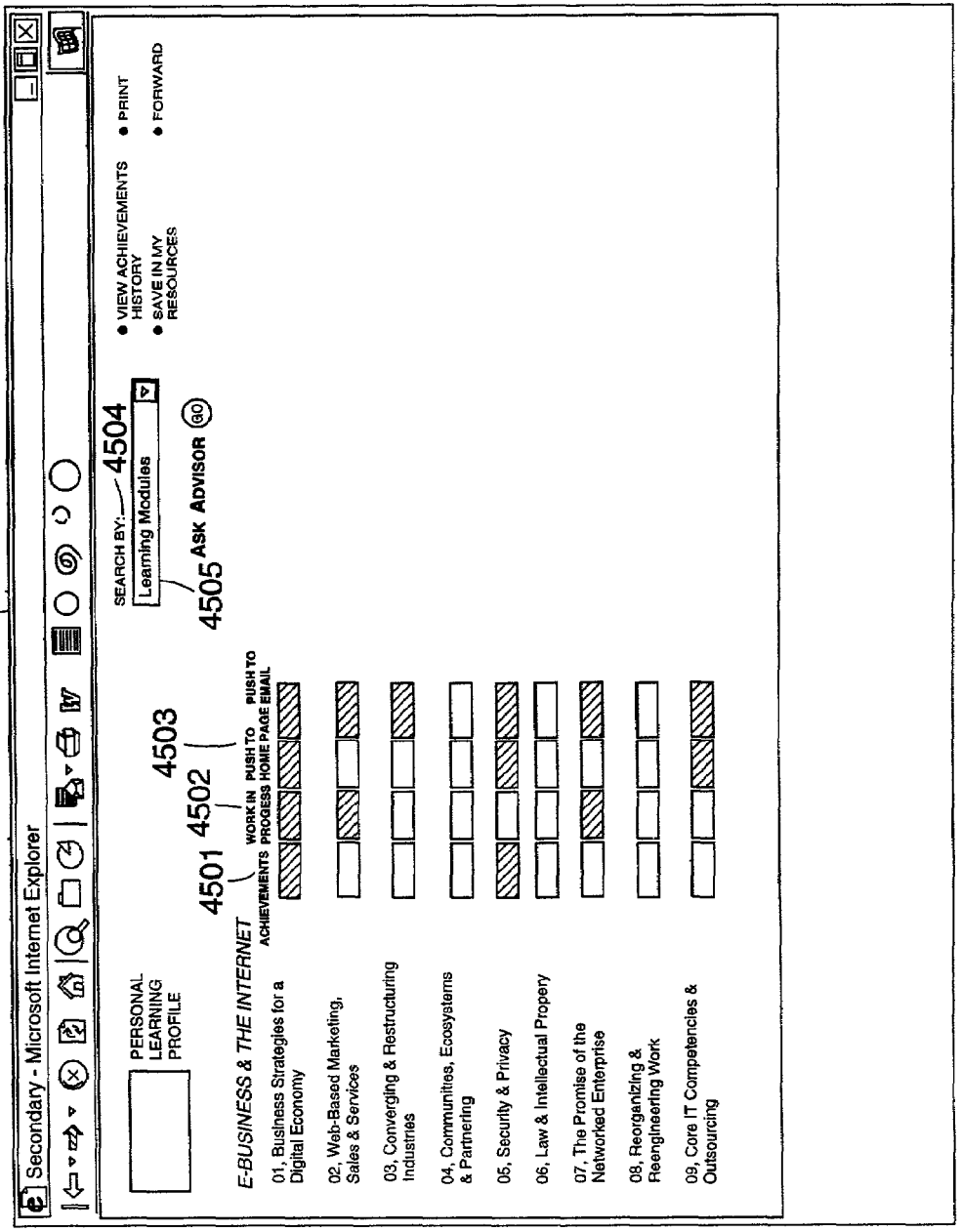
FIG. 45 is a screen shot of an interface by which the second user may access a competency profile in accordance with the embodiment of FIG. 28.

FIG. 44 is a screen shot 4400 that shows Brynna going to her homepage and clicking on her knowledge map. Browsing with the knowledge map, she selects the E-Business and the internet 4401 area to explore more deeply. Screen shot 4500 of FIG. 45 shows the second-level subcategories under the E-Business section 4401. Within each of these subcategories, Brynna can drill down to find content specific to one sub-area. Also, she can see in which subcategories she has completed via the "Achievements" area 4501 as well as which subcategories have "in-progress" learning opportunities via area 4502. In addition, she can choose to have more information in each of these areas presented to her via the "push to webpage" area 4503. Also, she can search for specific types of content within the E-Business category via field 4504, such as learning modules 4505 or performance tools.

Figure 47:
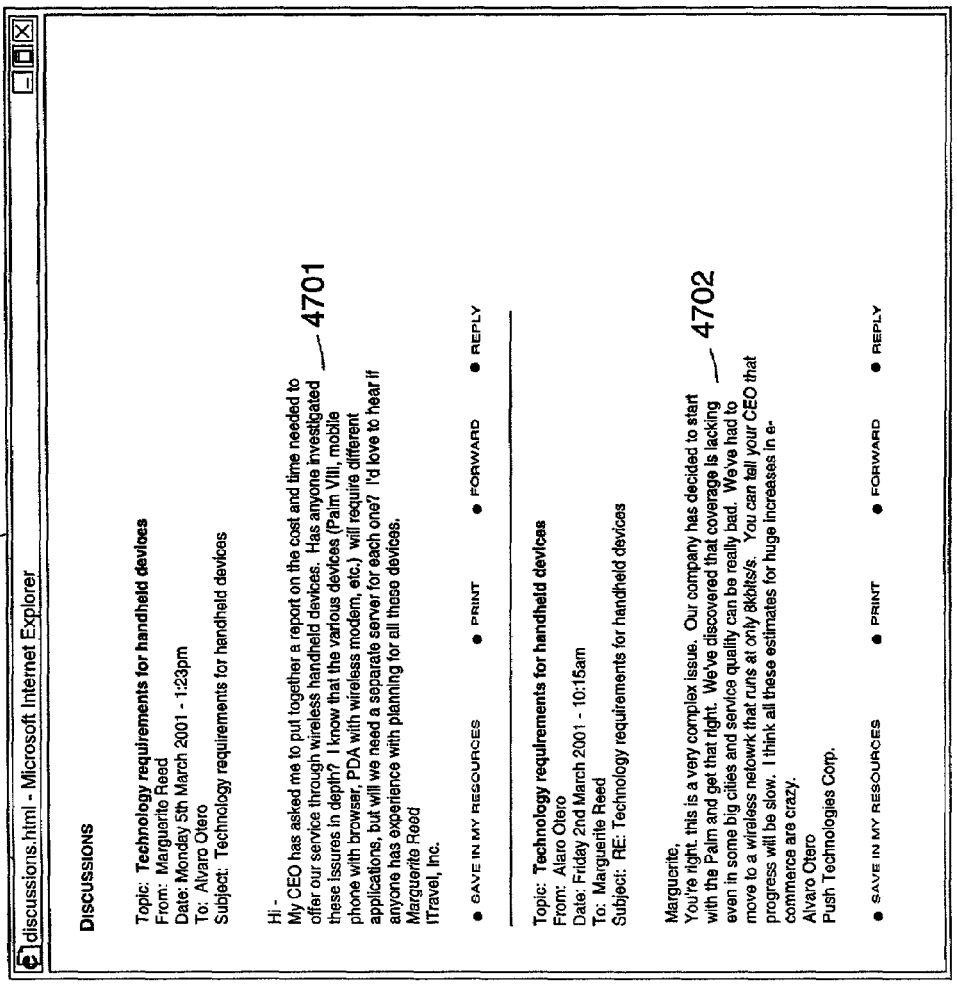
FIG. 47 is a screen shot of an interface by which the second user may view messages related to topics of discussion along the network in accordance with the embodiment of FIG. 28.

FIG. 46 is a screen shot 4600 showing how Brynna, looking for a discussion, chooses "Collaboration" via field 4601, then further chooses the discussion selector via link 4602. She is now presented with a list of the most recent discussions, shown at 4603. Brynna next decides to visit the discussion area to post a question about the vendor. While here, she notices an exchange on a technology trend into which she's done quite a bit of research, and decides to check it out. Screen shot 4700 of FIG. 47 shows that Brynna can read messages 4701 and that she may decide to reply 4702 to the question that started the thread, describing some of her key findings.

Figure 48:
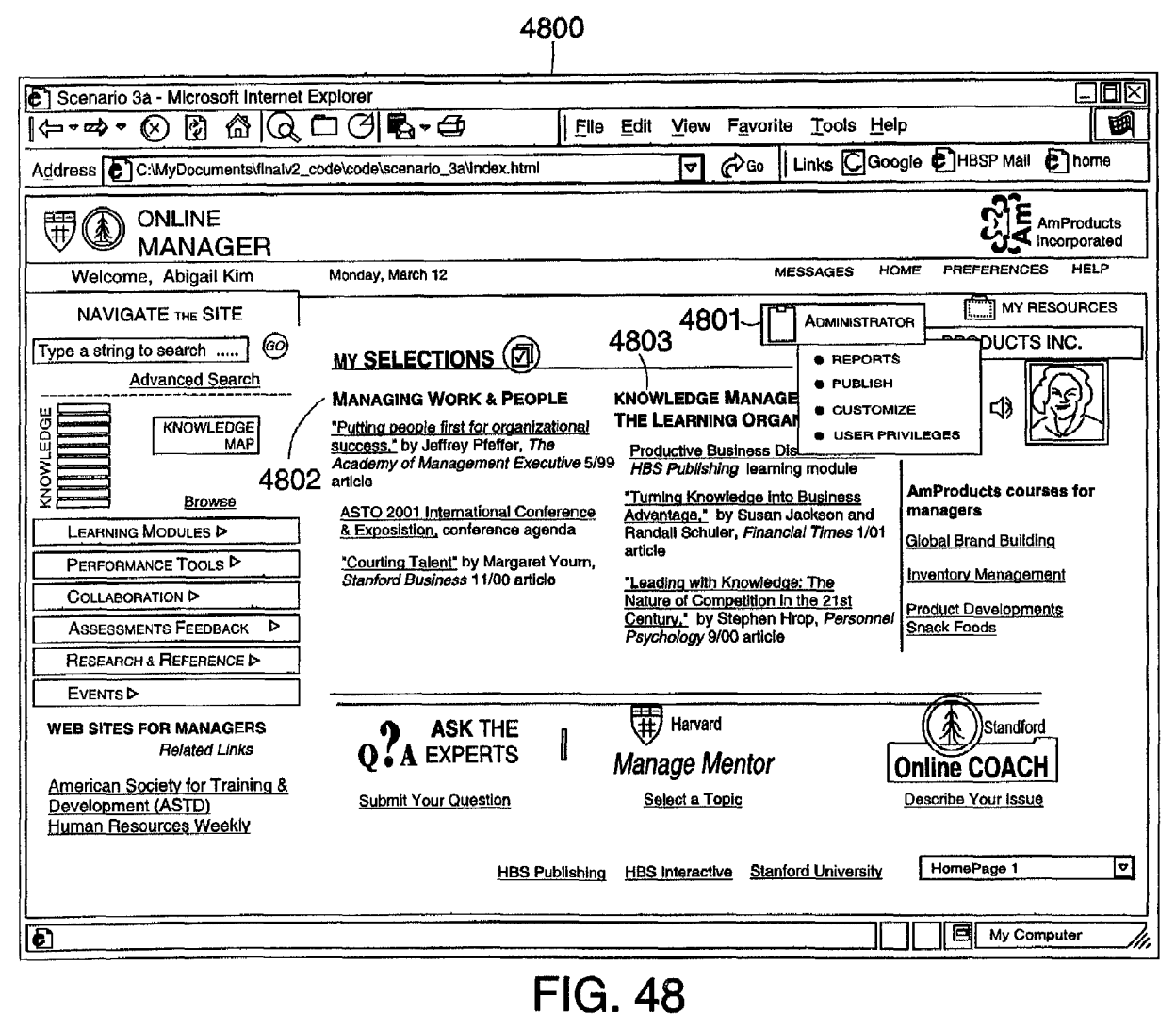
Figure 49:
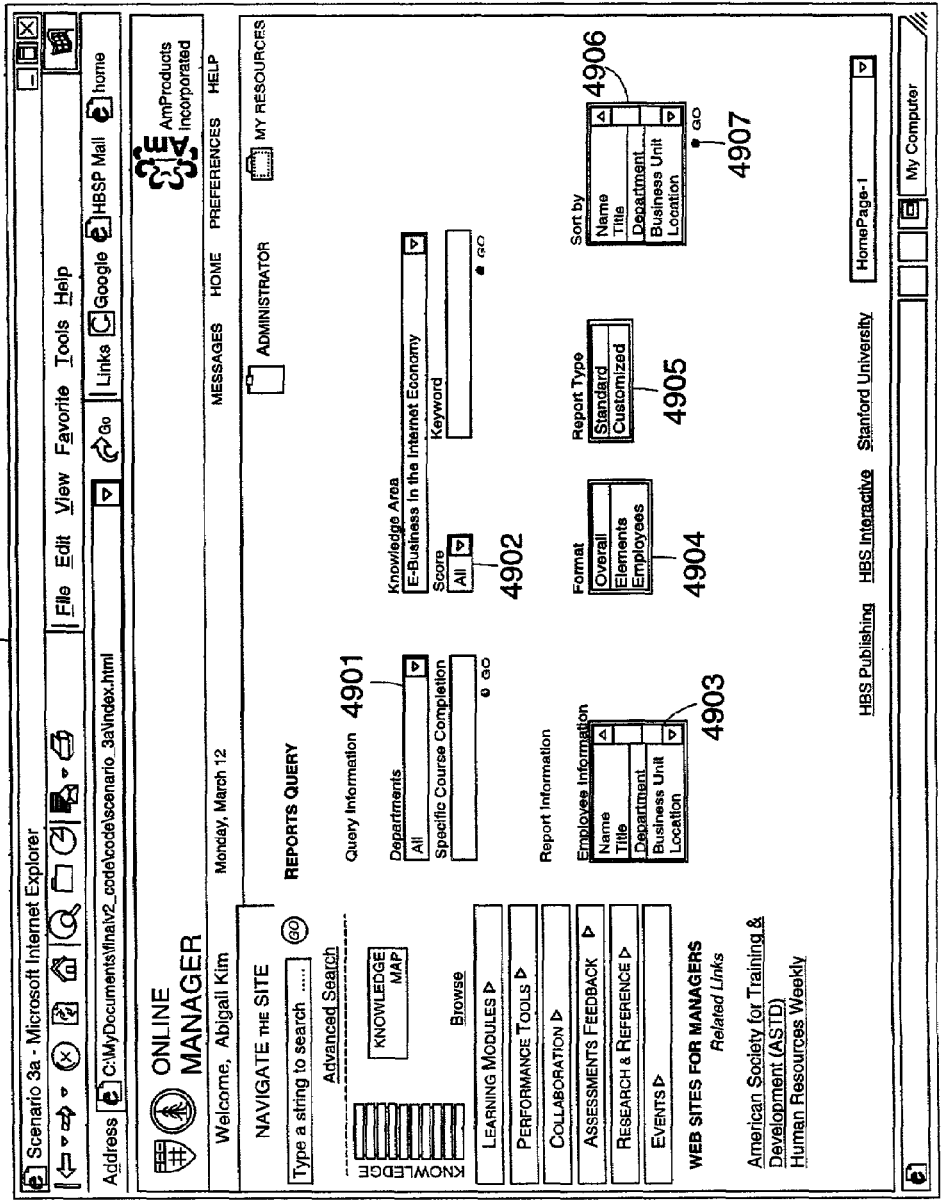
FIG. 49 is a screen shot of an interface by which the third user may access a report in accordance with the embodiment of FIG. 48.

FIG. 48 is an illustration of another graphical user interface provided in accordance with the embodiment of FIG. 12. In accordance with this third scenario, a third user, Abigail Kim, is in the Human Resources department at AmProducts, Joseph's company. She also has administrative privileges for AmProducts, meaning that she can track employee progress, produce department or company-wide reports, and also control and update the AmProducts corporate area on the Online Manager website home page. This scenario follows Abigail as she produces two different reports and an update of the home page. The interface of FIG. 48 includes a screen shot 4800 showing how her page is customized in much the same way as Joseph's page, with the exception that she has an administrative privileges link 4801. Also, her selected knowledge categories, shown at 4802 and 4803 are more relevant to her focus. She is an administrator as well as a learner. FIG. 49 is a screen shot screen shot 4900 showing how Abigail can obtain a desired report concerning use of Online Manager website within her company. She has been asked by a colleague which departments use the Online Manager website most for e-business learning opportunities, and also whether the IT department has taken advantage of the wide range of e-business learning opportunities.

Figure 50:
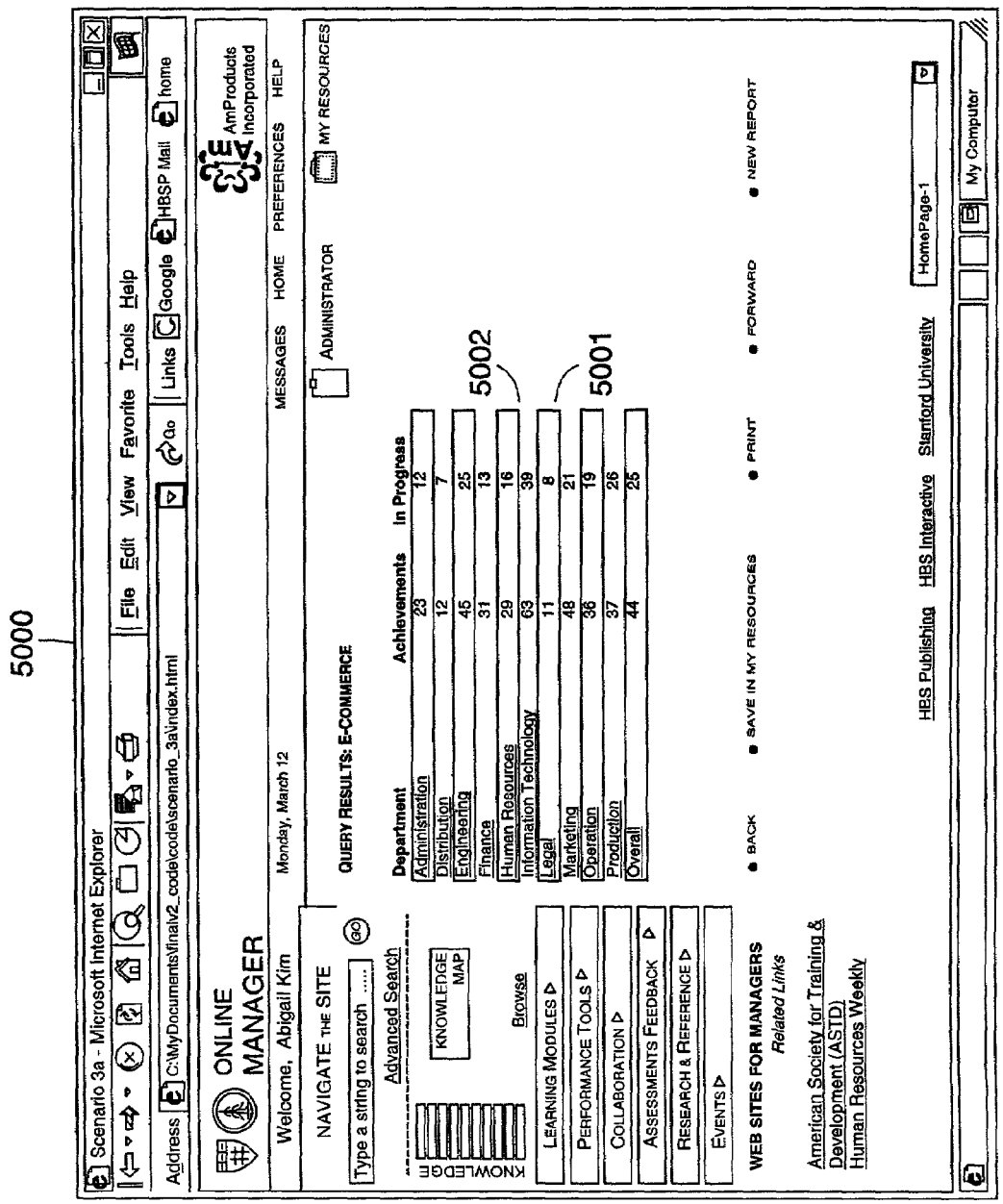
FIG. 50 is screen shot of an interface by which the third user may view a report accessed through the interface of FIG. 49.

First, Abigail chooses to report on all departments, via field 4901, in E-Business at all levels, as shown in field 4902. She decides the output she needs is the department name, designated in field 4903 and level, and an overall standard report sorted by department names designated in fields 4904, 4905 and 4906. Having set her report as desired, she clicks the Go button at 4907. Screen shot 5000 of FIG. 50 shows the report with the information Abigail requested. The extent to which departments capitalize on the Online Manager website's e-business learning opportunities varies. The legal department has taken advantage of only a small portion of offerings, as shown in area 5001. As expected, though, the IT department has taken advantage of much of the e-business content, as shown in area 5002. (The numbers are a percentage of employees who have taken advantage of any learning opportunity in the specific category. For example, if an employee has read an article on the Online Manager website about the internet, he or she has an achievement in E-Business.) To take a closer look at the habits in the IT department, Abigail may drill down to see what topics in e-business are most often utilized.

Figure 51:
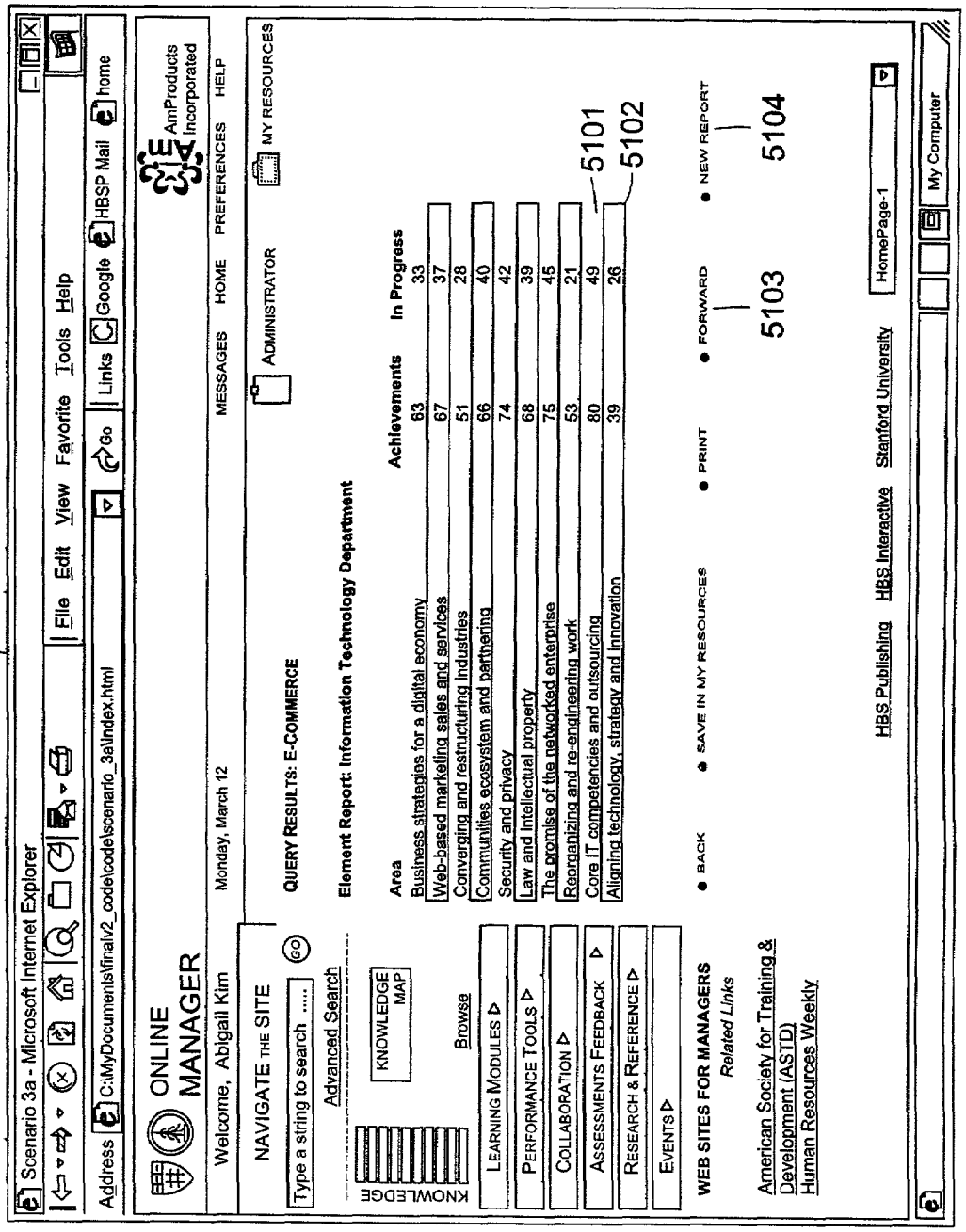
FIG. 51 shows the interface of FIG. 50 updated to reflect the utilization of the report accessed through the interfaces of FIG. 40 and 50.

FIG. 51 is screen shot 5100 showing that while the overall utilization of e-business topics was high, when drilling down it can be seen that the second-tier levels vary from the mean. Topics such as "Core IT competencies and outsourcing" are frequently accessed, as shown in area 5101. However, other topics including "Aligning technology, strategy and innovation" are much less frequently accessed, as shown in area 5102. By clicking on the Online Manager website's "Forward" feature 5103, Abigail may send along the results of both reports to her colleague. She may also click the new report button 5104 to generate a new report.

Figure 52:
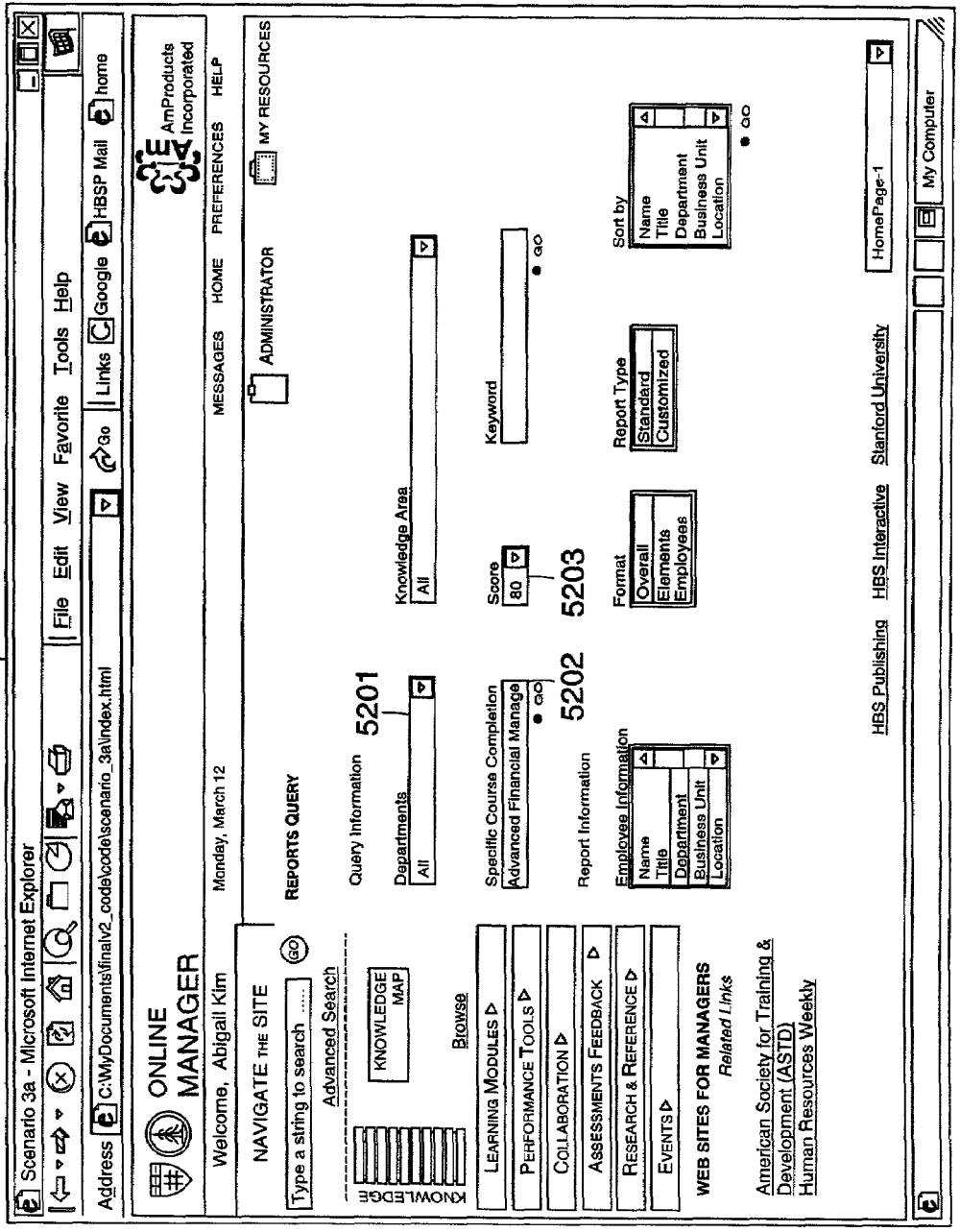
FIG. 52 shows the interface of FIG. 49 updated to reflect requests from corporate personnel associated with the third user.
Figure 53:
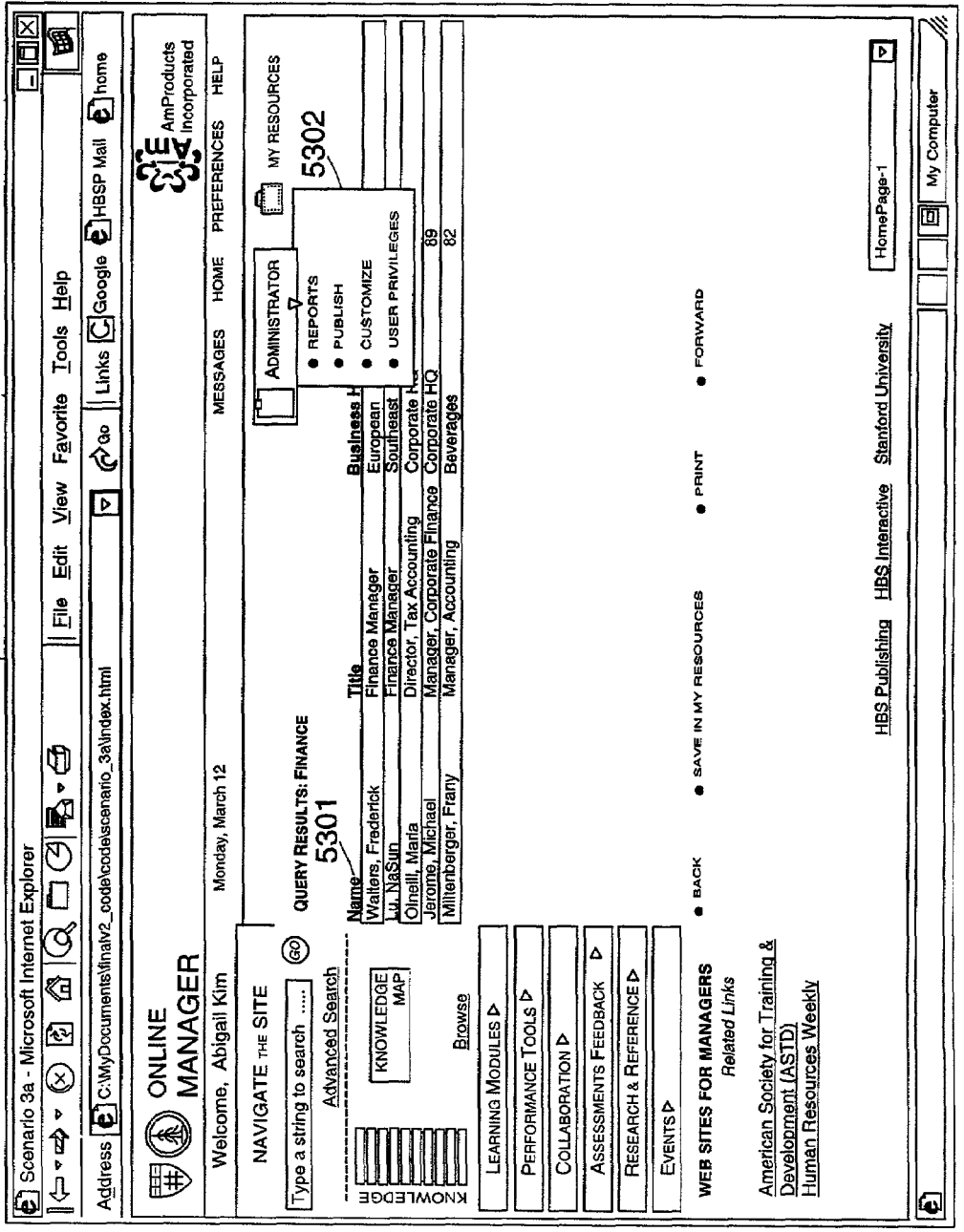
FIG. 53 shows the interface of FIG. 50 updated to reflect the names of corporate personnel meeting criteria associated with the requests of FIG. 52.

FIG. 52 is screen shot 5200 showing that in response to an email request from the CFO, Abigail needs to identify some experts to answer any questions that may come up at the annual budget meetings. To accomplish this, Abigail will search for employees in the Finance department that have taken AmProducts' new Advanced Financial Management learning module and received a score of 80% or higher on the post-assessment via fields 5201, 5202, and 5203. Screen shot 5300 of FIG. 53 shows that the query has found five employees who meet the criteria, shown in area 5301. Abigail, using the Online Manager website's email feature, sends a message to all five employees inviting them to serve as budget experts by selecting the "Publish" option in field 5302

Figure 54:
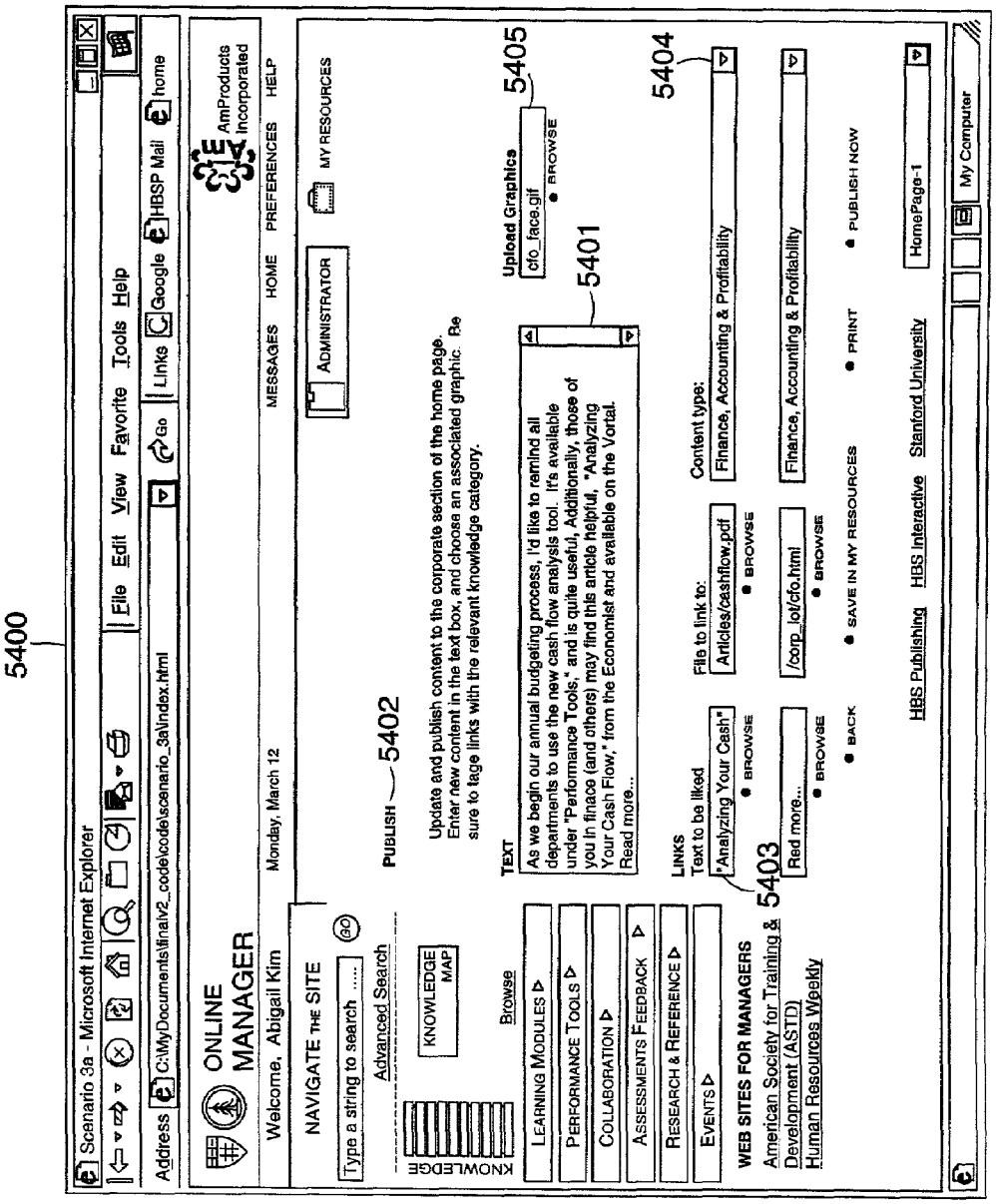
FIG. 54 is a screen shot of an interface by which the third user may view announcements from corporate personnel in accordance with the embodiment of FIG. 48.

FIG. 54 is screen shot 5400 showing how the CFO can make a company-wide announcement on the Online Manager website. He wants to remind all employees to use a new cash flow analysis tool, and also recommend a relevant article from The Economist, available on the Online Manager website. The CEO's message on the Online Manager website, shown at 5401 is a week old, so Abigail will post the CFO's message in that same area, the corporate space. Abigail takes the CFO's message and pastes it into the Publish form 5402. Also, she links to the Economist article through field 5403, and tags it as being in the "Finance, Accounting and Profitability" category in the knowledge map through field 5404. She also posts a recent picture of the CFO along with his message via field 5405.

Figure 55:
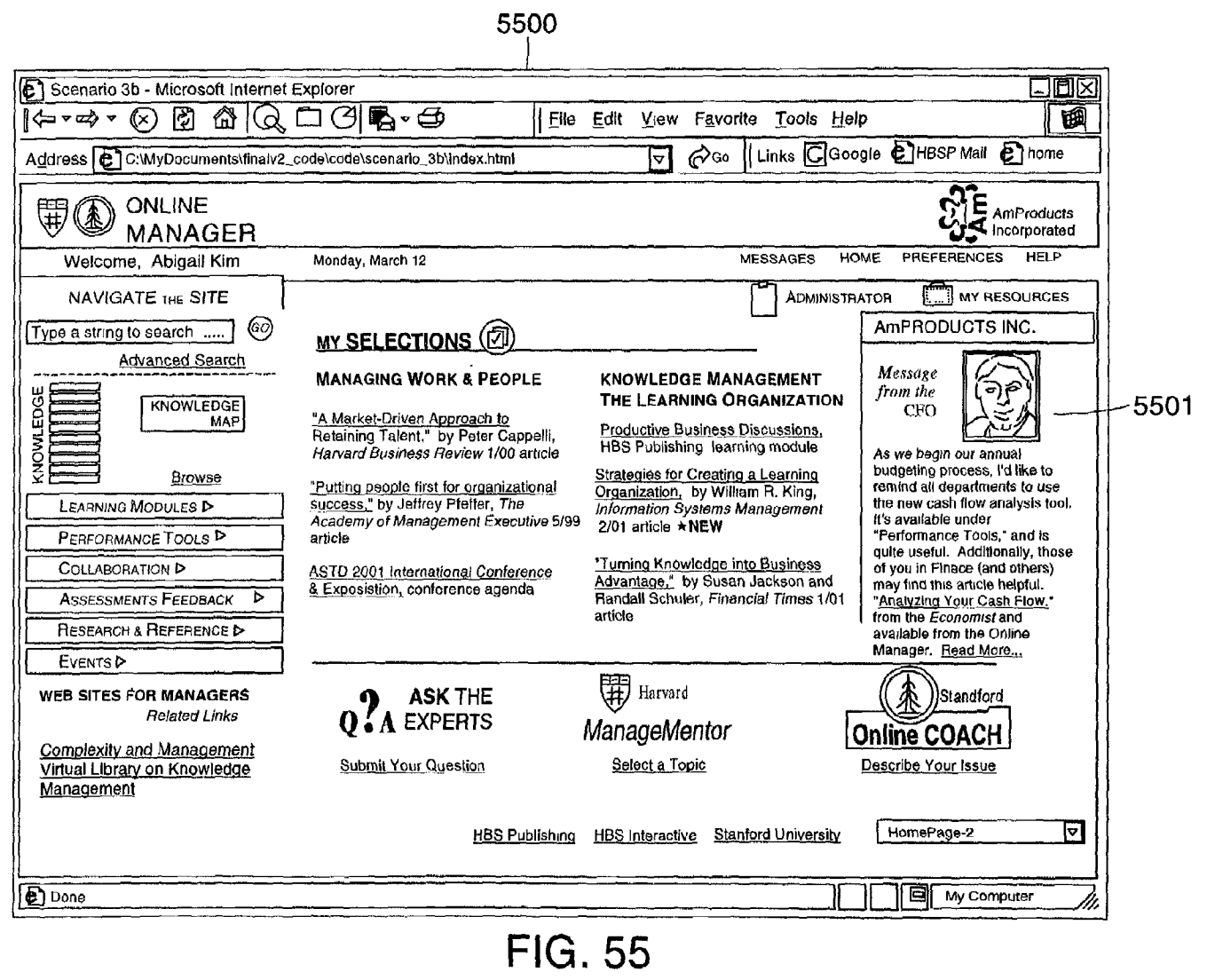

FIG. 55 is screen shot 5500 showing how Abigail's pages, and all other users' pages throughout AmProducts, have been updated with the new content. The next time AmProducts employees visit the Online Manager website, the CFO's message will greet them via area 5501.

Figure 56:
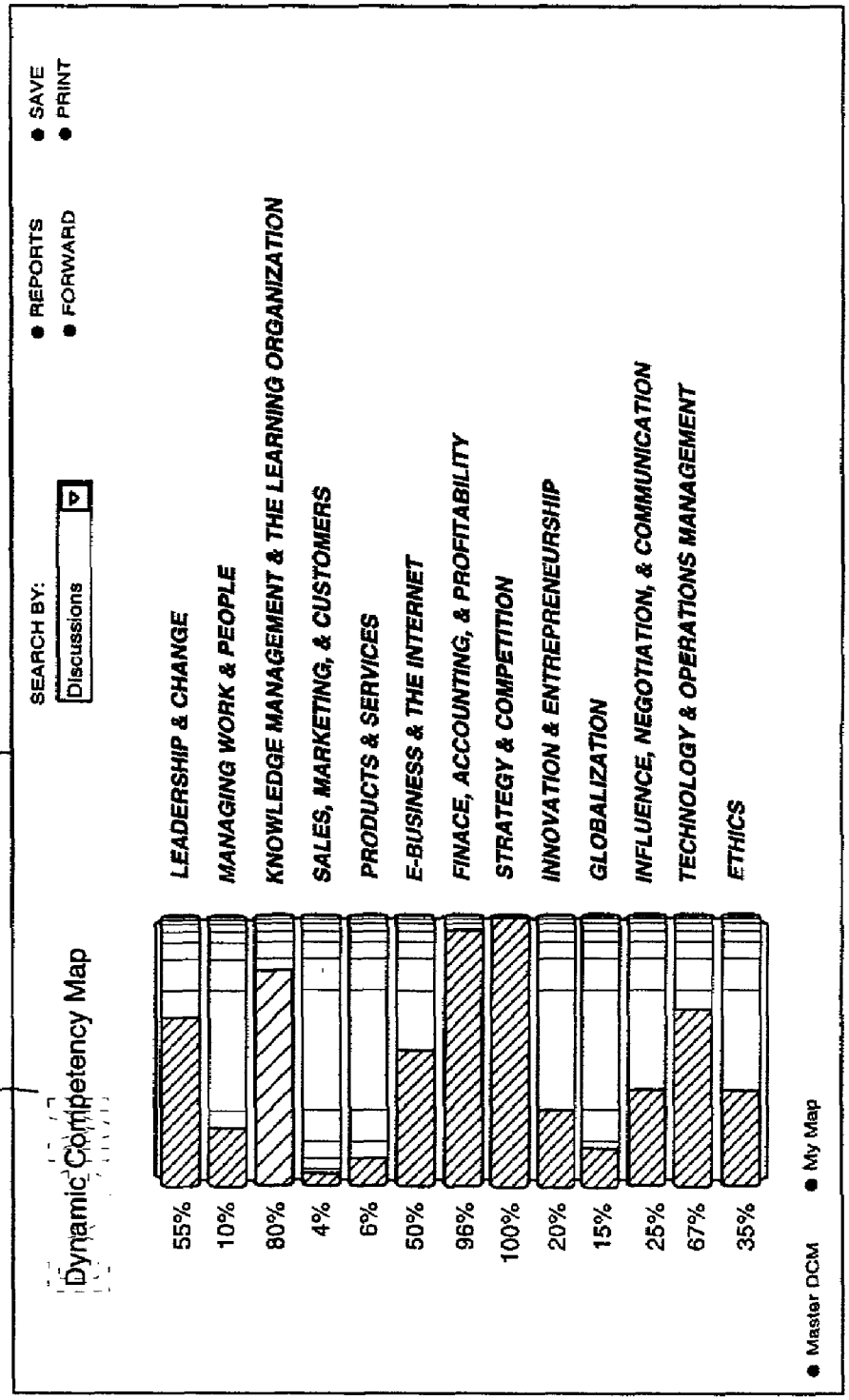
FIG. 56 is a screen shot of an interface by which the third user may access a competency profile in accordance with the embodiment of FIG. 48.
Figure 57:
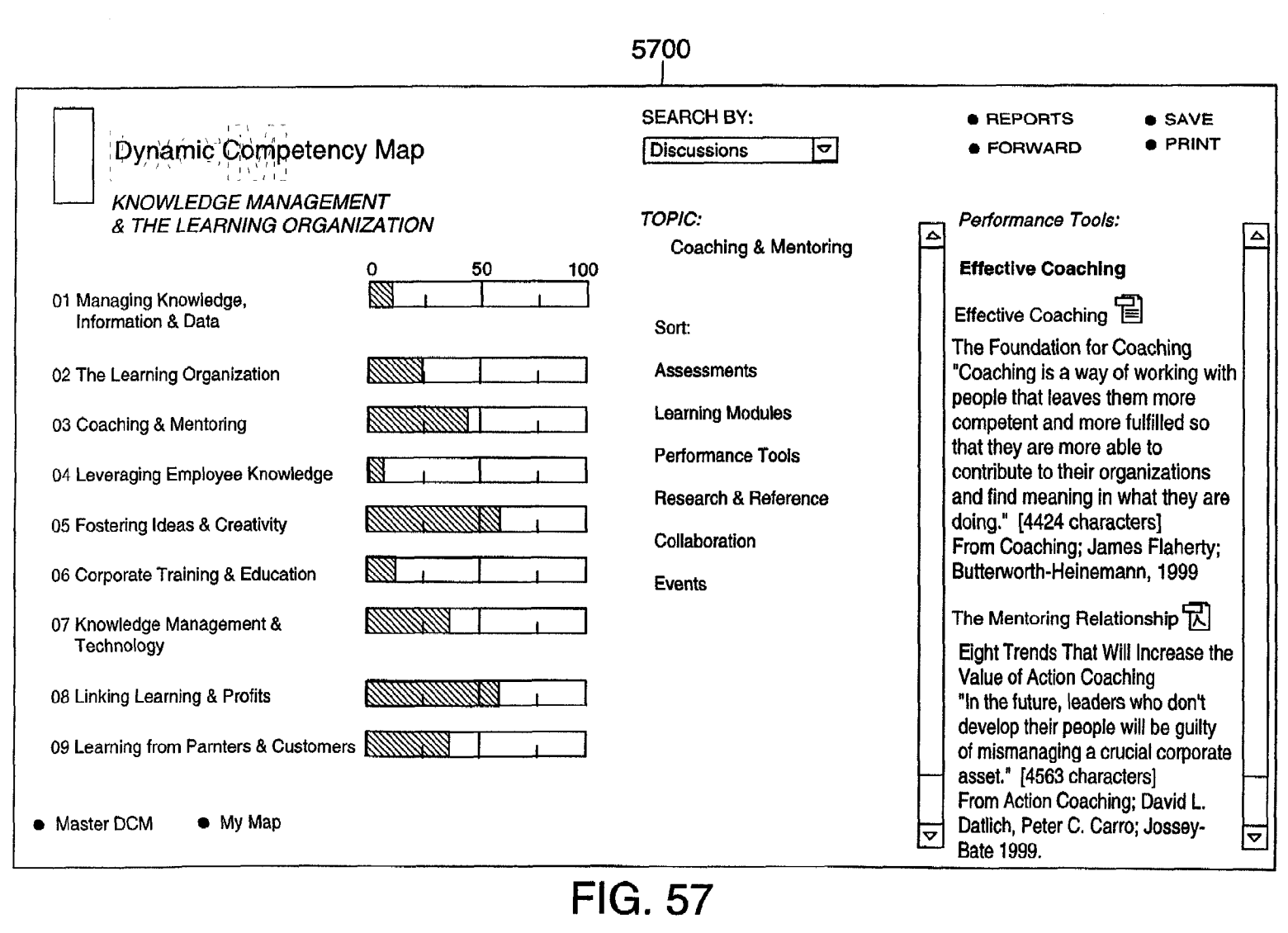

FIG. 56 is screen shot 5600 showing another embodiment of this invention replacing the knowledge map (as seen in FIGS. 23 and 44) with a "Dynamic Competency Map" 5601. This competency map allows a user to progress through a learning path recommended by the system to achieve success in a specific area of competency. Screen shot 5700 of FIG. 57 shows a second level view of the competency taxonomy, identifying the percent complete in the associated underlying areas.

It should be understood that various changes and modifications to the preferred embodiments described above will also be apparent to those skilled in the art. Modifications can be made without departing from the spirit and scope of the invention and without diminishing its attendant advantages. It is therefore intended that such changes and modifications be covered by the following claims.

What is claimed is:

1. A method of providing personalized education to an individual over a network, the method comprising:
   a. accessing a competency profile of the individual, such profile accessible to a server on a network;
   b. comparing the individual's competency profile with an education template accessible to the server, the template being derived from an education genome and defining a current desired standard for the individual's competencies, to identify target learning areas, the genome being a machine readable resource providing a dynamic centralized repository of knowledge to be offered over the network;
   c. offering, over the network, information content to the individual relevant to the target learning areas, such content being provided via user-selectable items of information content that collectively have a plurality of information product types.

2. A method according to claim 1, wherein deriving the template from the education genome includes utilizing competency data including testing results pertinent to the individual.

3. A method according to claim 1, wherein the network includes the internet.

4. A method according to claim 1, further comprising:
   identifying the occurrence of an influence event, wherein a user is determined to be impelled to develop competency in a target subject; and
   supplying information to the user over the network pertinent to the subject.

5. A method of screening for individuals having a desired knowledge set, the method comprising:
   a. storing a representation of a relevant education genome in a digital computer system, the genome being a machine readable resource providing a dynamic centralized repository of knowledge to be offered over the network;

b. storing in the computer system the desired knowledge set as a representation of a target subset of the education genome;

c. characterizing knowledge sets of individuals to be screened as candidate subsets of the education genome and storing representations of the candidate subsets in the computer system; and d. using the computer system to identify candidate subsets having a sufficient match with the target subset.

6. A method according to claim 5, wherein characterizing knowledge sets of individuals to be screened is performed in the course of providing personalized education to the individuals over a network.

7. A method according to claim 6, wherein characterizing knowledge sets includes determining an education template for each of the individuals to be screened.

8. An education knowledgebase resident on a digital computer system comprising;

a. a data warehouse that stores educational content data in a relational database format, the data also being tagged with object tags associated with attributes of object-formatted data;

b. a content management system for managing the data content; and c. an object index that accesses data in the data warehouse utilizing object tags;

wherein the knowledgebase is a machine readable resource providing a dynamic centralized repository of knowledge to be offered over the network.

9. An education knowledgebase according to claim 8, wherein the object formatted data is in an XML format.

10. A method of providing personalized education to an individual over a network, the method comprising:

a. granting, to the individual, access to information content over the network, such content being provided via user-selectable items of information content;

b. updating an influence profile of the individual; and c. using the influence profile to determine, at least in part, information content items to be offered over the network to the individual.

11. A method according to claim 10, wherein updating the influence profile includes identifying events that would be expected to affect selection of content to be offered to the individual.

12. A method according to claim 10, wherein the influence profile utilizes a taxonomy to define areas of information to be offered to the individual.

13. A method according to claim 11, wherein the influence profile utilizes a taxonomy to define areas of information to be offered to the individual and identifying events includes searching over the network for information associated with taxonomy terms in the influence profile.

14. A method according to claim 13, wherein searching over the network for information includes using as search terms those in a thesaurus corresponding to taxonomy terms in the influence profile.

15. A method according to claim 10, wherein the network includes the internet.

16. A method according to claim 14, wherein the network includes the internet and searching over the network includes searching a predetermined collection of web sites.

17. A method according to claim 14, wherein the network includes a path to an accessible content repository and searching over the network includes searching the content repository.

18. A method according to claim 10, wherein updating the user profile includes responding to at least one of current events, user preference, collaborative filtering, and assessment.

19. A method according to claim 10, further comprising:

using personal data of the individual, such data including the individual's job function, organization, and user preferences as to information content, to determine, at least in part, information content items to be offered over the network to the individual.

20. A method according to claim 11, wherein updating the influence profile includes analyzing of information content previously accessed using collaborative filtering to identify areas of taxonomy and information product type selected in relation to patterns of other persons situated similarly to the individual.

21. A method according to claim 11, wherein updating the influence profile includes analyzing information content previously accessed using rules-based personalization and in particular user preferences as to information content in relation to information content previously accessed by the individual over the network.

22. A method according to claim 10, wherein the user-selectable items of information content collectively have a plurality of information product types.

23. A method of providing personalized education to an individual over a network, the method comprising:

a. granting, to the individual, access to information content over the network, such content being provided via user-selectable items of information content that collectively have a plurality of information product types; and b. using personal data of the individual, such data including the individual's job function, organization, and user preferences as to information content, to determine, at least in part, information content items to be offered over the network to the individual.

* * * * *